US012640016B2

(12) United States Patent
Andler et al.

(10) Patent No.: US 12,640,016 B2
(45) Date of Patent: May 26, 2026

(54) AUTOMATIC ADJUSTMENT OF A POINT OF SALE DEVICE

(71) Applicant: Block, Inc., Oakland, CA (US)

(72) Inventors: Brett Andler, San Francisco, CA (US); Jade Fernandez, San Franciscoc, CA (US); Mani Razaghi, San Francisco, CA (US); Marvin Balaoro, San Francisco, CA (US); Rowan Schultz, San Francisco, CA (US); Nika Torab, San Francisco, CA (US); Yenliang Chen, San Francisco, CA (US); Nicholas Burrows, Brooklyn, NY (US); Michael Alan MacLennan, Oakland, CA (US)

(73) Assignee: BLOCK, INC., Oakland, CA (US)

( * ) Notice: Subject to any disclaimer, the term of this patent is extended or adjusted under 35 U.S.C. 154(b) by 0 days.

(21) Appl. No.: 18/655,815

(22) Filed: May 6, 2024

(65) Prior Publication Data

US 2024/0290183 A1 Aug. 29, 2024

Related U.S. Application Data

(63) Continuation of application No. 17/968,604, filed on Oct. 18, 2022, now Pat. No. 12,008,871.

(Continued)

(51) Int. Cl.
*G07G 1/00* (2006.01)

(52) U.S. Cl.
CPC .................................. *G07G 1/0018* (2013.01)

(58) Field of Classification Search
CPC ............................... G07G 1/00; G07G 1/0018
(Continued)

(56) References Cited

U.S. PATENT DOCUMENTS

| | | | | |
|---|---|---|---|---|
| 6,131,874 A * | 10/2000 | Vance | G06F 1/1601 248/550 |
| 2002/0126110 A1* | 9/2002 | Bowron | G06F 1/1601 345/204 |

(Continued)

FOREIGN PATENT DOCUMENTS

| | | |
|---|---|---|
| CN | 109631116 A | 4/2019 |
| KR | 2012096737 A * | 8/2012 |

(Continued)

OTHER PUBLICATIONS

Machine translation of KR 102249512, retrieved on May 29, 2025 (Year: 2025).*

(Continued)

*Primary Examiner* — Suezu Ellis
(74) *Attorney, Agent, or Firm* — Polsinelli PC-Block, Inc

(57) ABSTRACT

Point of sale (POS) systems and methods are described. The POS device detects, based on sensor data, a position of at least a portion of a user relative to a position of the POS device. The POS device includes a housing and a base. The POS device determines an adjustment to the position of the POS device applicable to the housing of the POS device. The adjustment causes the housing to rotate about an axis that is parallel to a surface of the housing and directs the POS device to face the position of at least the portion of the user. The POS device actuates at least one actuator to perform the adjustment.

19 Claims, 31 Drawing Sheets

Related U.S. Application Data

(60) Provisional application No. 63/257,046, filed on Oct. 18, 2021.

(58) Field of Classification Search
USPC .......................................................... 235/383
See application file for complete search history.

(56) References Cited

U.S. PATENT DOCUMENTS

| | | | | |
|---|---|---|---|---|
| 2014/0121838 | A1* | 5/2014 | Ahn | G05D 3/00 700/275 |
| 2017/0150812 | A1* | 6/2017 | Tomomatsu | H04M 1/04 |
| 2021/0064140 | A1* | 3/2021 | Egan | G06Q 20/204 |
| 2021/0182442 | A1 | 6/2021 | Slaney et al. | |
| 2021/0185802 | A1 | 6/2021 | Slaney et al. | |
| 2021/0201289 | A1 | 7/2021 | Martin et al. | |
| 2021/0375104 | A1* | 12/2021 | Handshaw | G06Q 20/204 |
| 2023/0121126 | A1 | 4/2023 | Andler et al. | |
| 2023/0195219 | A1* | 6/2023 | Kim | G06F 3/013 345/156 |

FOREIGN PATENT DOCUMENTS

| | | | |
|---|---|---|---|
| KR | 10-1753810 | B1 | 7/2017 |
| KR | 2249512 | B1 * | 5/2021 |
| WO | 2023/069438 | A1 | 4/2023 |

OTHER PUBLICATIONS

Machine translation of KR 20120096737 retrieved from Korean Patent Office on May 29, 2025 (Year: 2025).*

* cited by examiner

AUTOMATIC ADJUSTMENT OF A POINT OF SALE DEVICE

CROSS-REFERENCE TO RELATED APPLICATIONS

This application is a continuation of U.S. Non-Provisional patent application Ser. No. 17/968,604, entitled "POINT OF SALE DEVICE FOR MOBILE COMPUTING DEVICE", filed Oct. 18, 2022, which claims the benefit of U.S. Provisional Application No. 63/257,046, filed Oct. 18, 2021, and titled "POINT OF SALE DEVICE WITH CRADLE FOR MOBILE COMPUTING DEVICE," which are hereby incorporated by reference in their entireties and for all purposes.

TECHNICAL FIELD

Payment cards, such as credit cards and debit cards, are often used by customers during transactions with merchants. Merchants can read payment information from payment cards using payment card reader devices. Payment card reader devices include magnetic stripe reader devices that read payment card information from a magnetic stripe of a payment card that is swiped through a slot, Europay/Mastercard/Visa (EMV) chip reader devices that read payment card information from an EMV chip of a payment card that is inserted into a slot, or near field communication (NFC) reader devices that read payment card information wirelessly from an NFC-enabled payment card. Payment card reader devices read the payment card information from a payment card, then send that payment card information to a server associated with a financial entity, such as a bank or credit card institution, in order to process the transaction by transferring funds from a customer account to a merchant account.

Mobile computing devices, such as smartphones or tablet computers, are computing devices with a mobile and/or portable form factor. Form factor may be a size, configuration, or physical arrangement of the computing device. Mobile computing devices typically include a display screen and an input interface, such as a touchscreen touch interface of the display screen. Mobile computing devices are increasingly popular, but come in a wide range of different sizes and form factors.

DETAILED DESCRIPTION

Figure 1A:
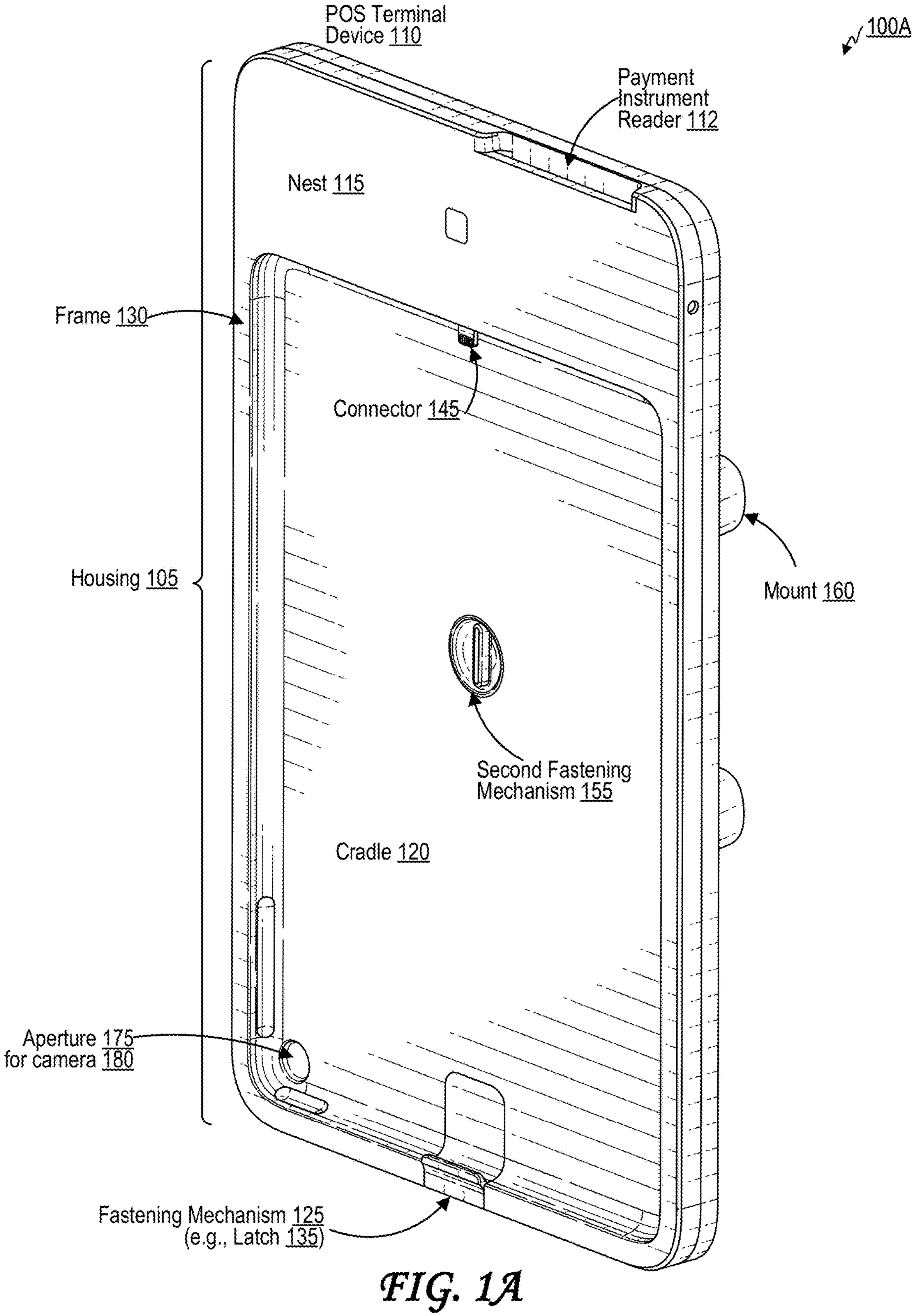
FIG. 1A is a front perspective view of an exemplary point of sale (POS) terminal device that is configured to hold and interface with an exemplary mobile computing device comprising a housing, a payment instrument reader, a cradle, a fastening mechanism, and connector, in accordance with some examples.

Payment cards, such as credit cards and debit cards, are often used by customers during transactions with merchants. Merchants can read payment information from payment cards using payment card reader devices. Payment card reader devices include magnetic stripe reader devices that read payment card information from a magnetic stripe of a payment card that is swiped through a slot, Europay/Mastercard/Visa (EMV) chip reader devices that read payment card information from an EMV chip of a payment card that is inserted into a slot, or near field communication (NFC) reader devices that read payment card information wirelessly from an NFC-enabled payment card. Payment card reader devices read the payment card information from a payment card, then send that payment card information to a server associated with a financial entity, such as a bank or credit card institution, in order to process the transaction by transferring funds from a customer account to a merchant account.

Mobile computing devices, such as smartphones or tablet computers, are computing devices with a mobile and/or portable form factor. Form factor may be a size, configuration, or physical arrangement of the computing device. Mobile computing devices typically include a display screen and an input interface, such as a touchscreen touch interface of the display screen. Mobile computing devices are increasingly popular, but come in a wide range of different sizes and form factors. As a result, interfacing a particular mobile computing device with another device can be difficult, because while a bracket or other elements made for holding or otherwise securing a mobile computing device might be compatible with some mobile computing device form factors and sizes, it might not be compatible with all mobile computing device form factors and sizes. For example, manufacturers often change device thickness, size, ports, port locations, or other form factor elements from one version of a mobile computing device to the next, often meaning that a newer model of a mobile computing device breaks compatibility with an interface that an older version of the same mobile computing device worked well with.

A point of sale (POS) terminal device includes a nest portion and a cradle portion. The nest portion includes one or more payment card or near field communication (NFC) readers. The cradle portion can couple to differently-sized interchangeable frames, which in turn helps secure a mobile computing device to the cradle portion of the POS terminal device and increases the compatibility of the POS terminal device with various models of mobile computing device. The mobile computing device is connected via a connector to the rest of the POS terminal device to reduce complexity by removing the need for additional connectors to draw power from, provide power to, or convey data to, the mobile computing device. This is possible as the connector has multiple functionalities. Payment card information read by the readers is conveyed to the mobile computing device over the connector for processing. The POS terminal device may also include tamper detection circuitry to improve security of the POS terminal device. The POS terminal device includes a fastening mechanism that secures the housing to a mount that is coupled to a surface of the environment. The POS terminal device also include a fastening mechanism that is configured to secure the mobile computing device within the cradle while the housing is secured to the mount using the other fastening mechanism.

FIGS. 1A-1J illustrate various exemplary orientations and configurations of an example of the POS terminal device.

FIG. 1A is a front perspective view 100A of an exemplary point of sale (POS) terminal device 110 that is configured to hold and interface with an exemplary mobile computing device comprising a housing 105, a payment instrument reader 112, a cradle 120, a fastening mechanism 125, and a connector 145. The POS terminal device 110 includes a cradle that is configured to receive the mobile computing device (not pictured). The mobile computing device can be a computing system 2100, such as a tablet device, a smart phone, a phone, a mobile handset, a portable gaming console, a wearable device, or a combination thereof. The cradle may include a surface at least partially surrounded by a frame 130 that prevents the mobile computing device from moving in direction(s) parallel to the surface of the cradle 120. A fastening mechanism 125, such as a latch 135, can secure the mobile computing device in the cradle 120. For example, the cradle 120 can receive the mobile computing device while the latch 135 is in an open state. The latch 135 can transition from the open state to a closed state after the cradle 120 receives the mobile computing device. The latch 135 can secure the mobile computing device in the cradle 120 while the latch 135 is in the closed state. The latch 135 can transition from the closed state to the open state to release the mobile computing device from the cradle 120.

The POS terminal device 110 includes a nest 115 that includes a payment instrument reader 112. The payment instrument reader 112 can read payment instrument information from a payment instrument, such as a payment card or a payment device. A connector 145 extends from the nest into the cradle 120. When the cradle 120 receives the mobile computing device, the connector 145 can couple to a connector (e.g., the connector 332) of the mobile computing device. In some examples, the connector 145 can convey the payment instrument information from the payment instrument reader 112 of the nest to the mobile computing device. In some examples, the connector 145 can convey power to the mobile computing device. In some examples, the connector 145 can draw power from the mobile computing device. In some examples, the connector 145 can provide power from the mobile computing device. In some examples, the connector 145 can convey data from the mobile computing device to the nest 115. These examples reduce the complexity of the POS terminal device 110 because additional connectors are not required to draw power from, provide power to, or convey data to, the mobile computing device.

An aperture 175 is illustrated in the cradle 120. The aperture 175 can be for a camera 180 or another sensor of the mobile computing device. The camera 180 of the mobile computing device can pass at least partially through the aperture 175. Light from an environment can pass through the aperture 175 to be received by the camera 180 of the mobile computing device. The camera 180 of the mobile computing device can be used to scan barcodes, quick response (QR) codes, or other optical glyphs that encode information. The camera 180 of the mobile computing device can be used to detect and/or recognize objects using object detection and/or object recognition. The camera 180 of the mobile computing device can be used for biometric scanning, such as facial detection and/or recognition, iris detection and/or recognition, person detection and/or recognition, fingerprint detection and/or recognition, handprint detection and/or recognition, or a combination thereof. Biometric scanning can be used to authorize a payment made using the POS terminal device 110. In this manner, the complexity of the POS terminal device 110 is reduced because further sensors and/or cameras are not required to authorize payment or use the mobile computing device.

A second fastening mechanism 155 is also illustrated in FIG. 1A. The second fastening mechanism 155 fastens the housing of the POS terminal device 110 to a mount 160. The mount 160 can be referred to as a bracket, as a bracket mount, or as a mount. Examples of the mount 160 include a non-angled mount 1110 and an angled mount 1120. The mount 160 can include a first end that couples to the housing 105 of the POS terminal device 110 (e.g., via the second fastening mechanism 155), and a second end that couples to a surface in an (external) environment (e.g., a wall, a floor, a ceiling, a countertop, a tabletop, a desk surface, or a combination thereof).

Figure 1B:
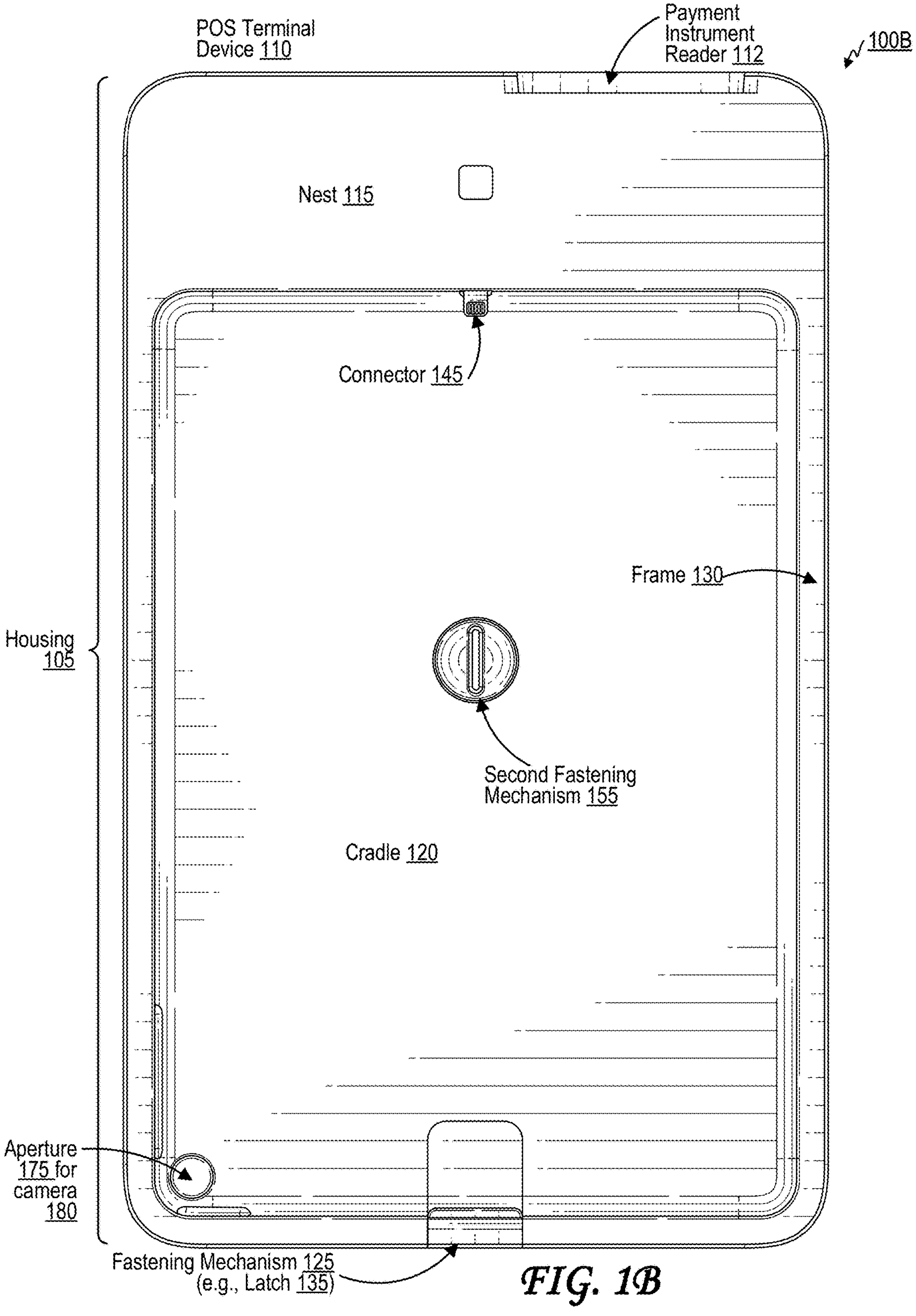
FIG. 1B illustrates a front view of the exemplary point of sale (POS) terminal device that is configured to hold and interface with the mobile computing device comprising a housing, a payment instrument reader, a cradle, a fastening mechanism, and connector, in accordance with some examples.

FIG. 1B illustrates a front view 100B of the exemplary point of sale (POS) terminal device 110 that is configured to hold and interface with the mobile computing device comprising a housing 105, a payment instrument reader 112, a cradle 120, a fastening mechanism 125, and a connector 145. The cradle 120, the frame 130, the connector 145, the nest 115, the payment instrument reader 112, the fastening mechanism 125, the latch 135, the second fastening mechanism 155, the aperture 175, and the housing 105 are illustrated.

Figure 1C:
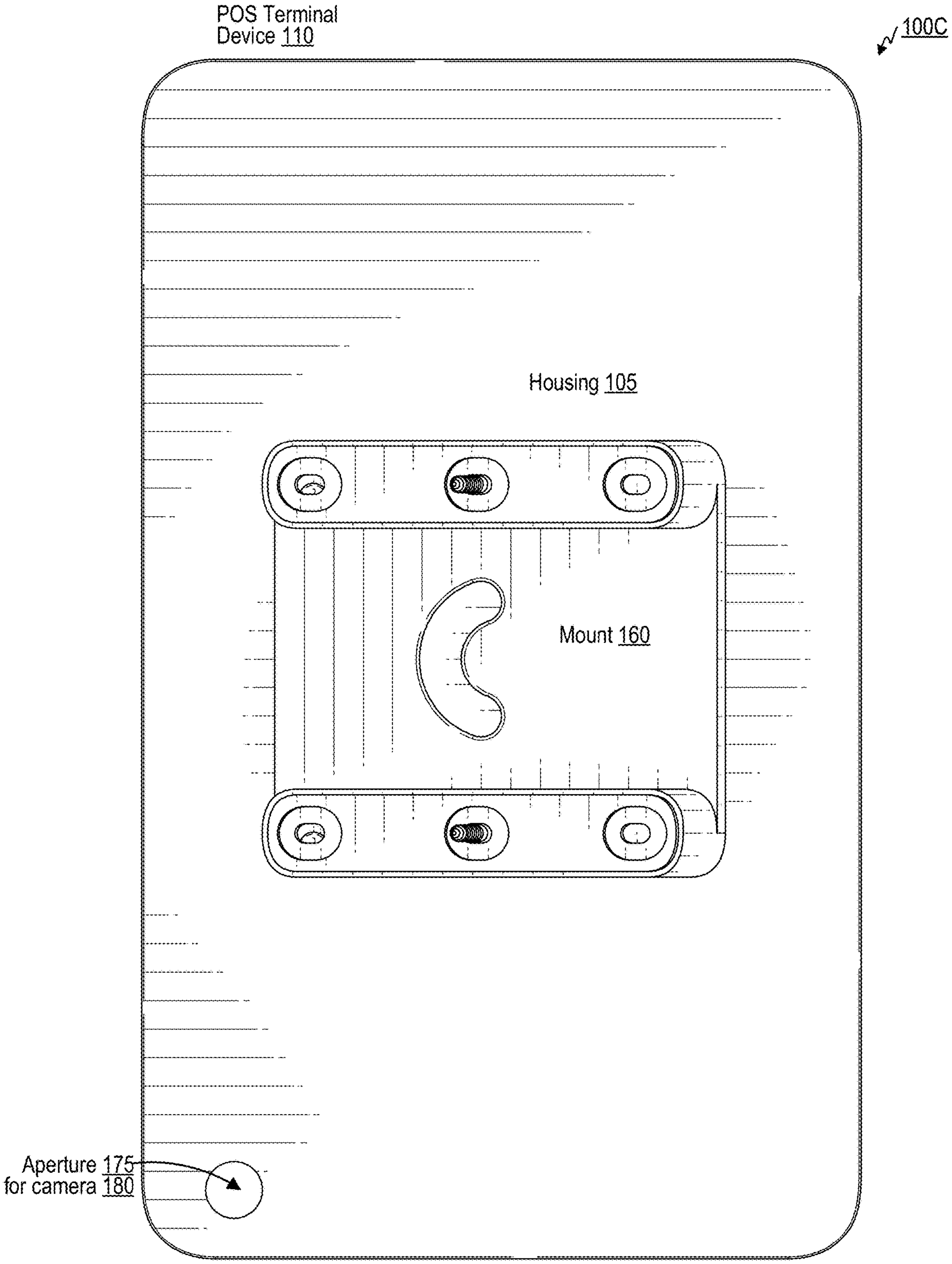
FIG. 1C illustrates a rear view of the exemplary point of sale (POS) terminal device that is configured to hold and interface with the mobile computing device, with a mount coupled to the POS terminal device, in accordance with some examples.

FIG. 1C illustrates a rear view 100C of the exemplary point of sale (POS) terminal device 110 that is configured to hold and interface with the mobile computing device, with a mount coupled to the POS terminal device. The housing 105, the aperture 175, and the mount 160 are illustrated.

Figure 1D:
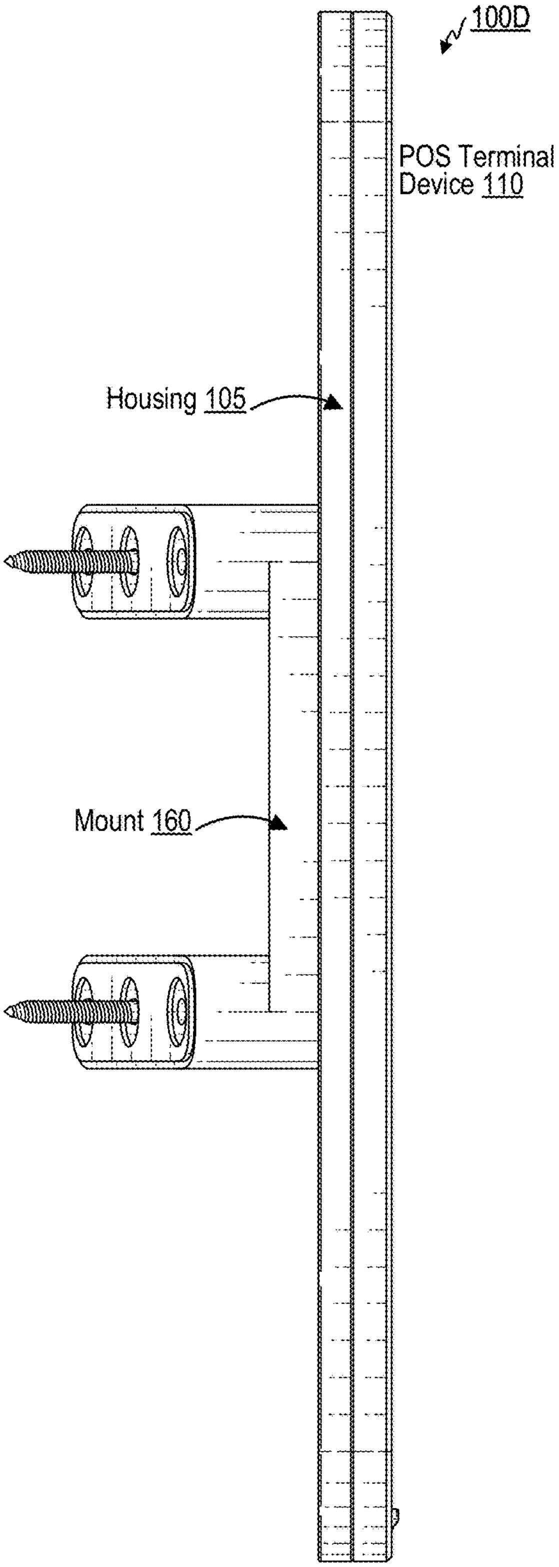
FIG. 1D illustrates a top view of the exemplary point of sale (POS) terminal device that is configured to hold and interface with the mobile computing device, with the mount coupled to the housing of the POS terminal device, in accordance with some examples.

FIG. 1D illustrates a top view 100D of the exemplary point of sale (POS) terminal device 110 that is configured to hold and interface with the mobile computing device, with the mount 160 coupled to the housing 105 of the POS terminal device 110. The housing 105 and the mount 160 are illustrated.

Figure 1E:
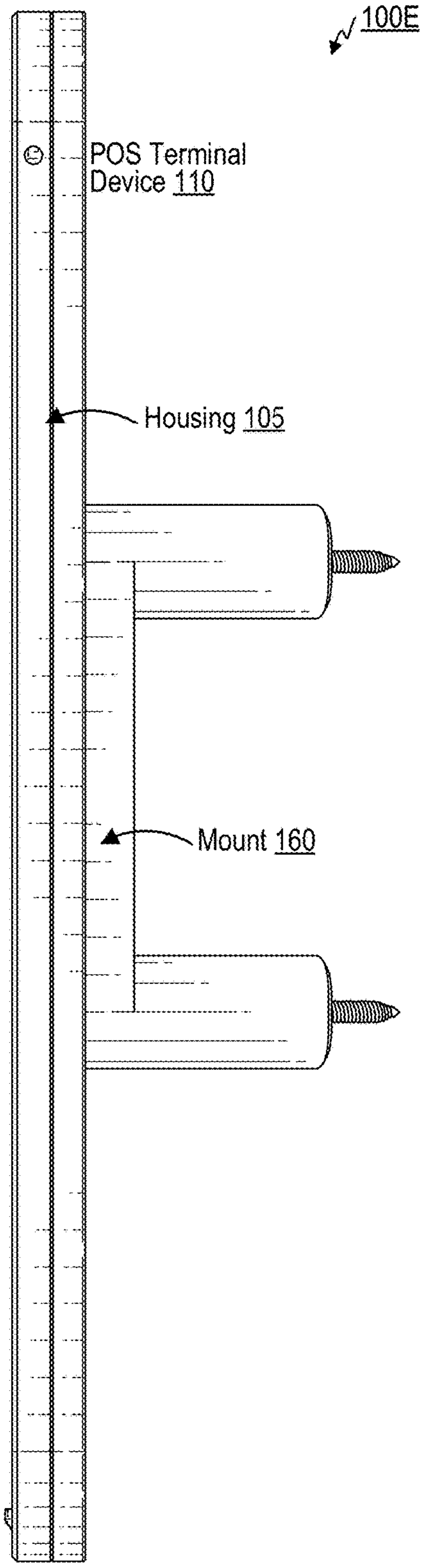
FIG. 1E illustrates a bottom view of the exemplary point of sale (POS) terminal device that is configured to hold and interface with the mobile computing device, with the mount coupled to the housing of the POS terminal device, in accordance with some examples.

FIG. 1E illustrates a bottom view 100E of the exemplary point of sale (POS) terminal device 110 that is configured to hold and interface with the mobile computing device, with the mount 160 coupled to the housing 105 of the POS terminal device 110. The housing 105 and the mount 160 are illustrated.

Figure 1F:
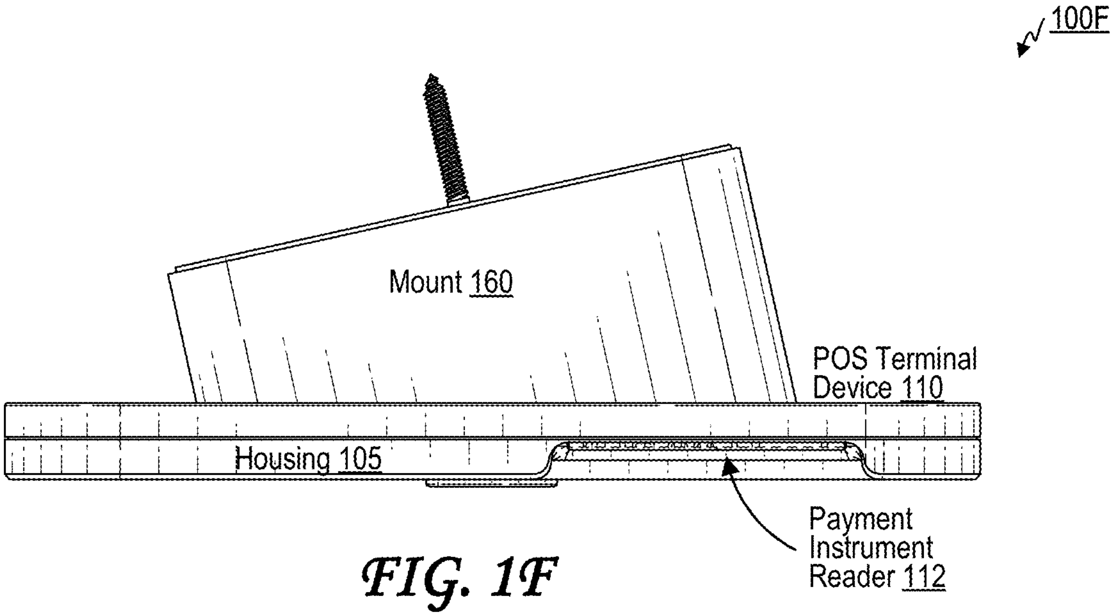
FIG. 1F illustrates a right side view of the exemplary point of sale (POS) terminal device comprising a payment instrument reader that is configured to hold and interface with the mobile computing device, with the mount coupled to the housing of the POS terminal device, in accordance with some examples.

FIG. 1F illustrates a right side view 100F of the exemplary point of sale (POS) terminal device 110 comprising a payment instrument reader 112 that is configured to hold and interface with the mobile computing device, with the mount 160 coupled to the housing 105 of the POS terminal device 110. The housing 105, the payment instrument reader 112, and the mount 160 are illustrated.

Figure 1G:
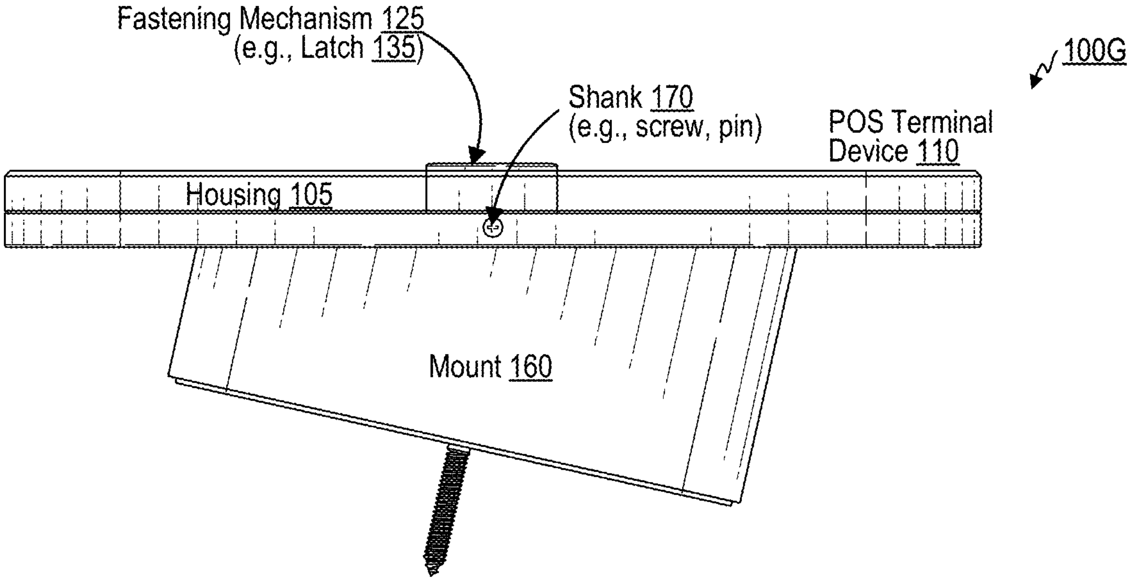
FIG. 1G illustrates a left side view of the of the exemplary point of sale (POS) terminal device that is configured to hold and interface with the mobile computing device, with the mount coupled to the housing of the POS terminal device further comprising a fastening mechanism with a shank, in accordance with some examples.
Figure 4A:
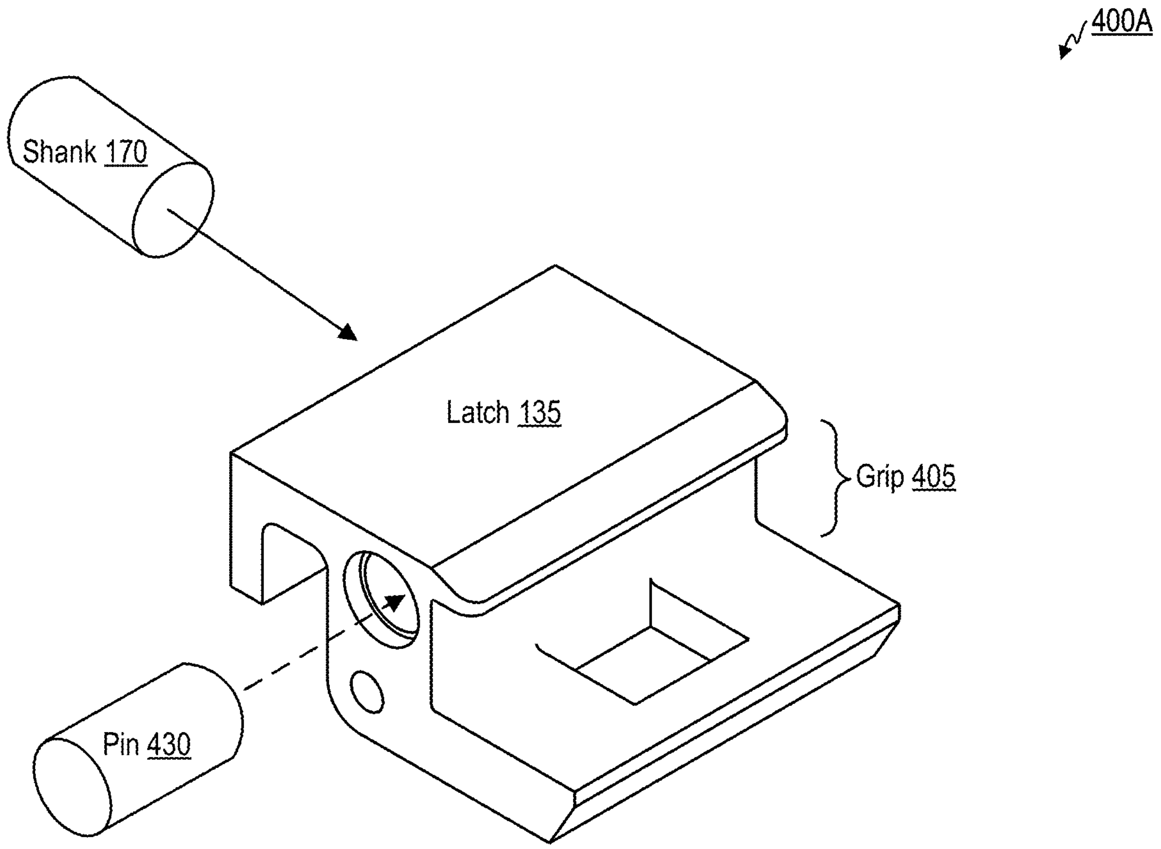
FIG. 4A is an exploded-view diagram illustrating an exemplary latch of a frame of an exemplary point of sale (POS) terminal device from a perspective view, in accordance with some examples.

FIG. 1G illustrates a left side view 100G of the of the point of sale (POS) terminal device 110 that is configured to hold and interface with the mobile computing device, with the mount 160 coupled to the housing 105 of the POS terminal device 110 further comprising a fastening mechanism 125 with a shank 170. The housing 105, the fastening mechanism 125, the latch 135, a shank 170, and the mount 160 are illustrated. The shank 170 may include, for example, a screw, a pin, and/or a bolt. The shank 170 may be received into an aperture in the POS terminal device 110, the frame 130, the fastening mechanism 125, the latch 135, or a combination thereof. The shank 170 may be received into the aperture to secure the mobile computing device 302 in place within the cradle 120 of the POS terminal device 110. In some examples, the shank 170 may be received into the aperture to secure the latch 135 into a closed position as illustrated in FIGS. 4A and 4C.

Figure 1H:
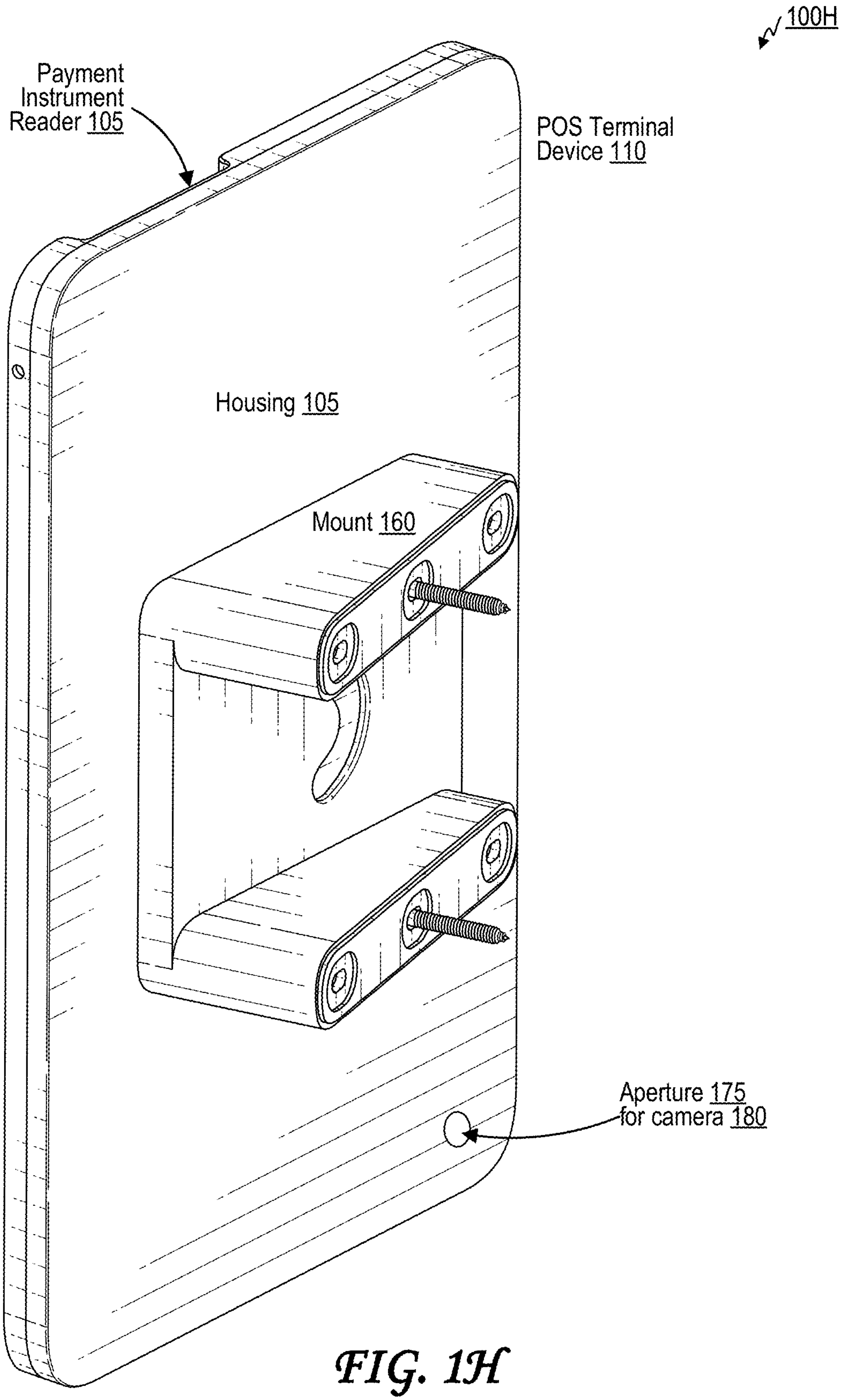
FIG. 1H illustrates a rear perspective view of the of the exemplary point of sale (POS) terminal device that is configured to hold and interface with the mobile computing device, with the mount coupled to the housing of the POS terminal device, in accordance with some examples.

FIG. 1H illustrates a rear perspective view 100H of the of the exemplary point of sale (POS) terminal device 110 that is configured to hold and interface with the mobile computing device, with the mount 160 coupled to the housing 105 of the POS terminal device 110. The housing 105, the payment instrument reader 112, the aperture 175, and the mount 160 are illustrated.

Figure 1I:
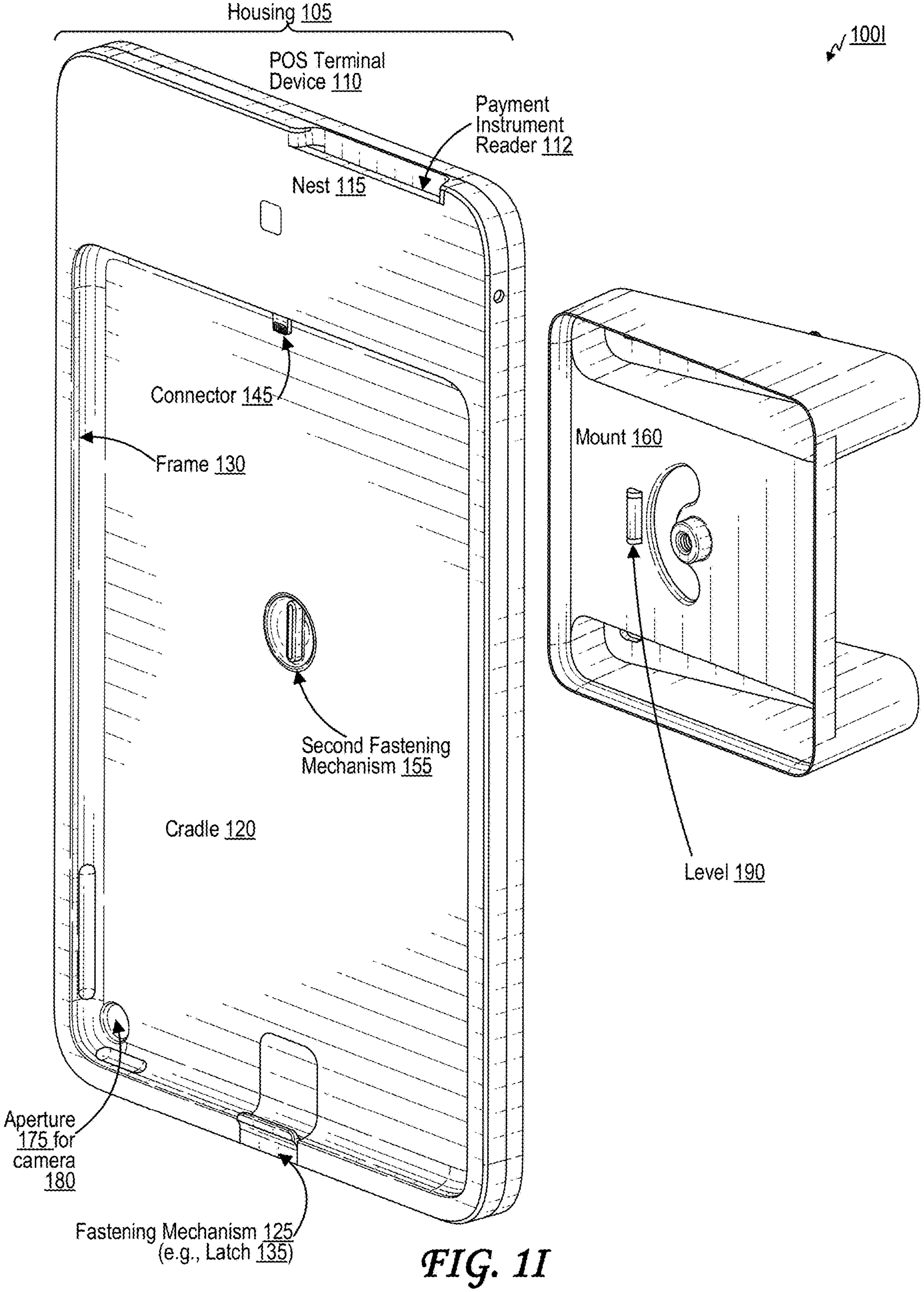
FIG. 1I illustrates a front perspective view of the exemplary point of sale (POS) terminal device that is configured to hold and interface with the mobile computing device, with the mount separate from the POS terminal device, in accordance with some examples.

FIG. 1I illustrates a front perspective view 100I of the exemplary point of sale (POS) terminal device 110 that is configured to hold and interface with the mobile computing device, with the mount 160 separate from the POS terminal device. The cradle 120, the frame 130, the connector 145, the nest 115, the payment instrument reader 112, the fastening mechanism 125, the latch 135, the second fastening mechanism 155, the mount 160, the aperture 175, and the housing 105 are illustrated. A level 190 is illustrated as part of the mount 160. The level 190 can be used to ensure that the mount 160 is mounted to a surface of the external environment (e.g., a wall, a floor, a ceiling, a countertop, a tabletop, a desk surface, or a combination thereof) in a level orientation.

Figure 1J:
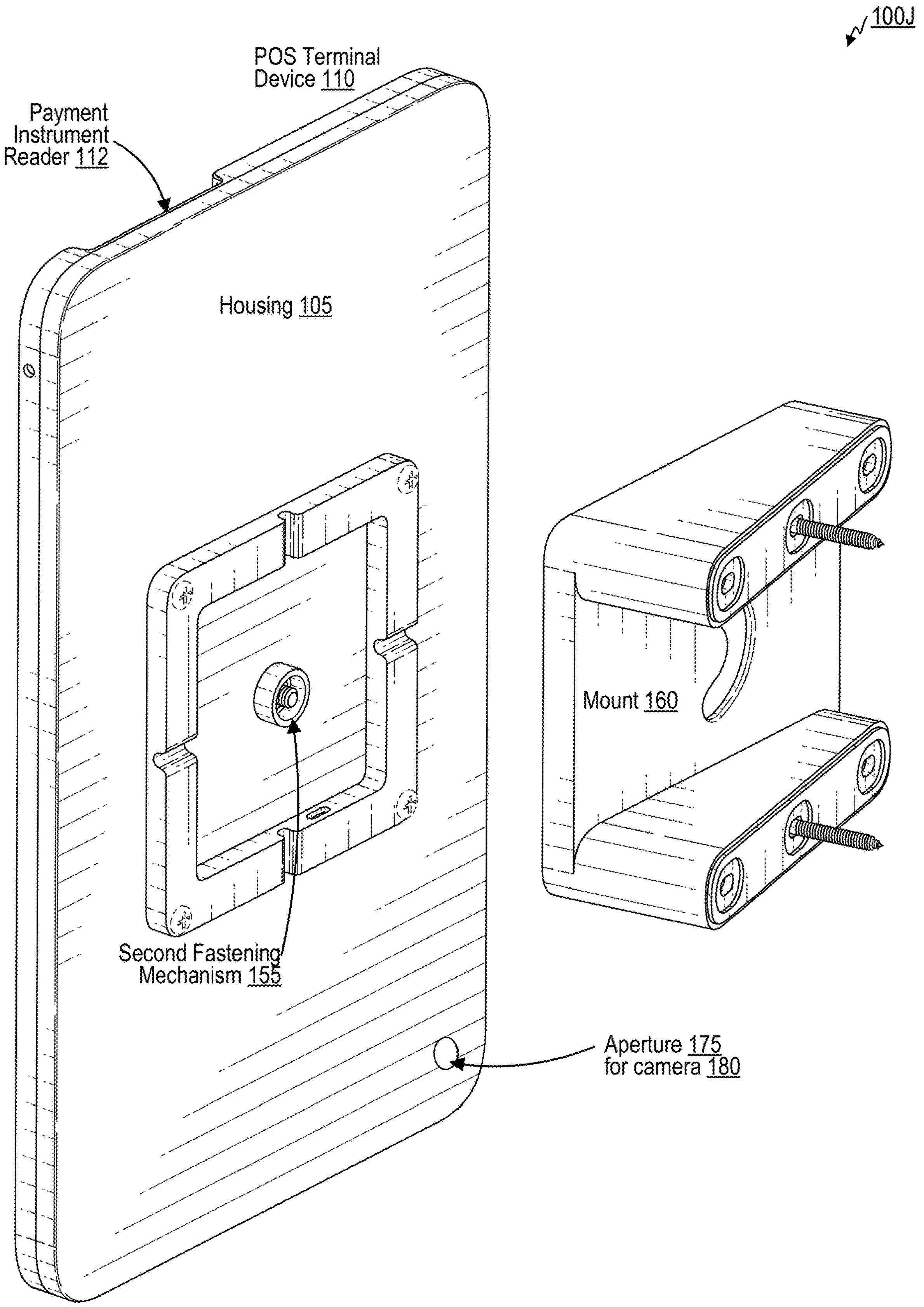
FIG. 1J illustrates a rear perspective view of the exemplary point of sale (POS) terminal device that is configured to hold and interface with the mobile computing device, with the mount separate from the POS terminal device, in accordance with some examples.

FIG. 1J illustrates a rear perspective view 100J of the exemplary point of sale (POS) terminal device 110 that is configured to hold and interface with the mobile computing device, with the mount 160 separate from the POS terminal device. The housing 105, the second fastening mechanism 155, the aperture 175, and the mount 160 are illustrated.

Figure 2A:
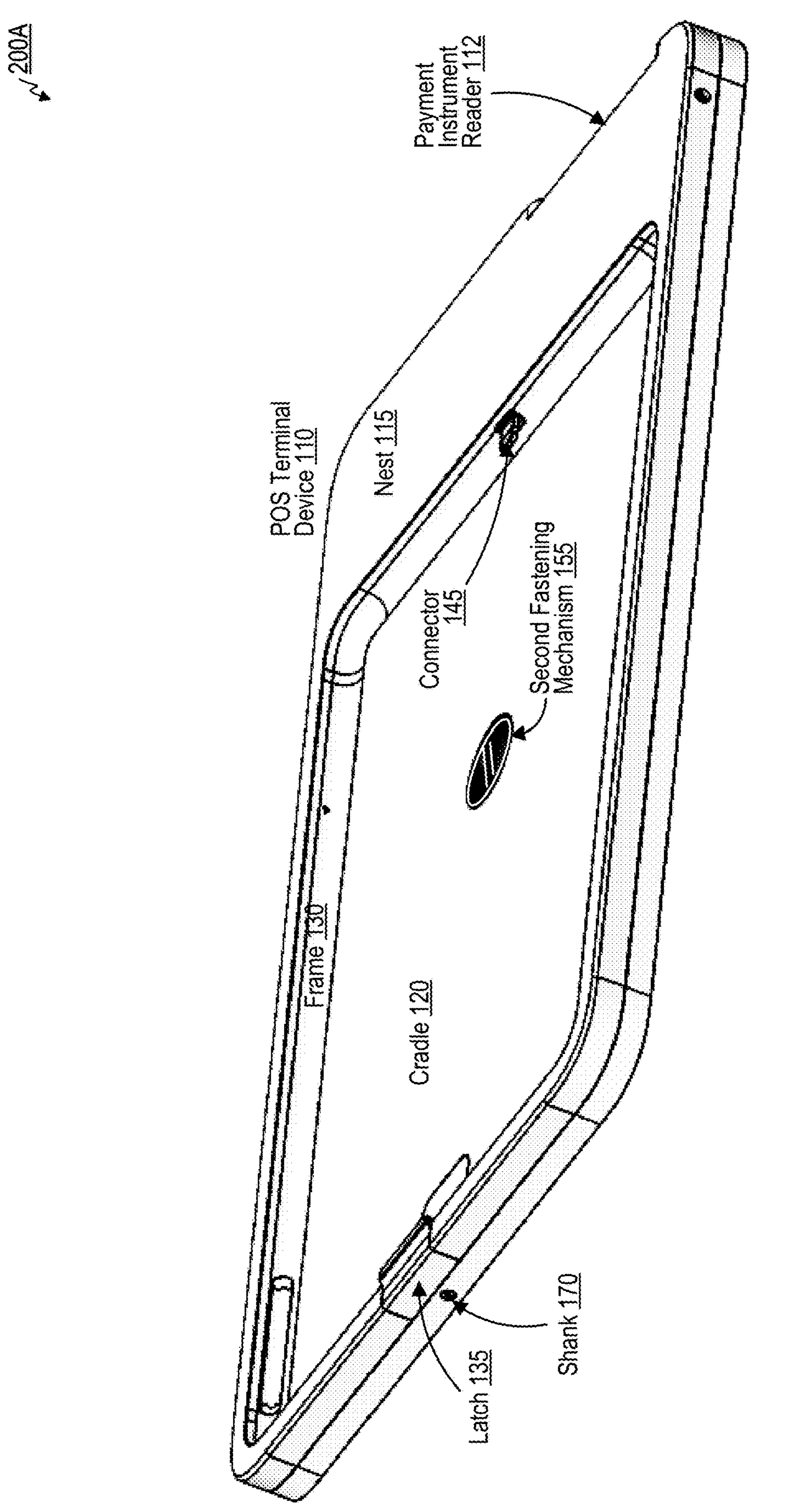
FIG. 2A is a perspective diagram illustrating an exemplary point of sale (POS) terminal device in which a shank received into an aperture in a latch, in accordance with some examples.

FIG. 2A is a perspective diagram 200A illustrating an exemplary point of sale (POS) terminal device in which a shank received into an aperture in a latch. The perspective diagram 200A illustrates a shank 170 (illustrated in FIG. 2A as a screw) inserted into an aperture adjacent to the latch 135. The shank 170, when received into the aperture, prevents the latch 135 from transitioning from a closed state to an open state, thus preventing the mobile computing device from being removed from the cradle 120. When the shank 170 is removed from the aperture, the latch 135 transitions from the closed state to the open state, thus allowing the mobile computing device from being removed from the cradle 120.

Figure 2B:
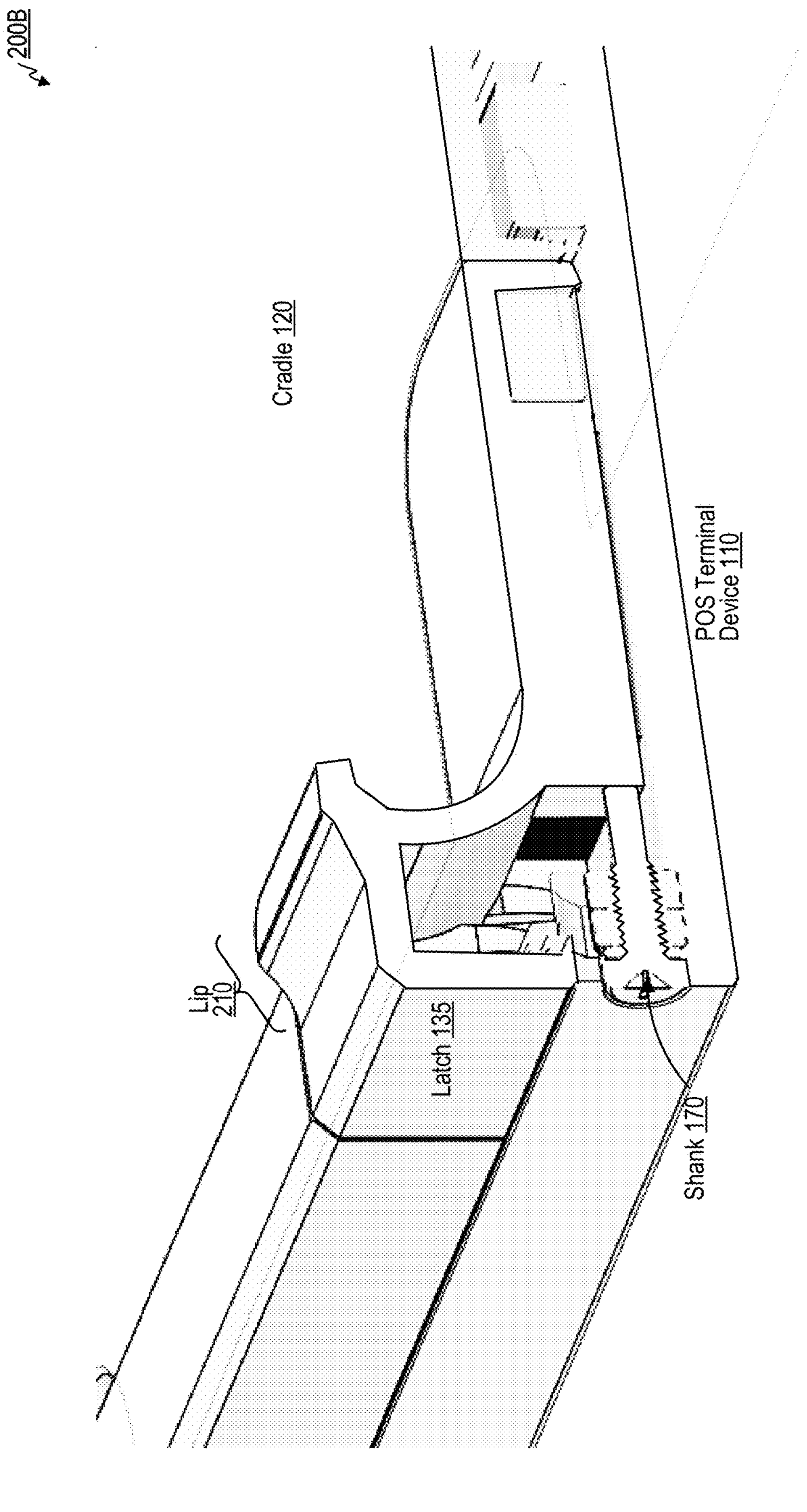
FIG. 2B is a cutaway diagram illustrating an exemplary latch of the exemplary point of sale (POS) terminal device receiving a shank into the aperture of the latch, in accordance with some examples.

FIG. 2B is a cutaway diagram 200B illustrating an exemplary latch of the exemplary point of sale (POS) terminal device receiving a shank into the aperture of the latch. The cutaway diagram 200B is a closeup of how the shank 170 (illustrated in FIG. 2B as a screw) prevents the latch 135 from transitioning from a closed state to an open state, thus preventing the mobile computing device from being removed from the cradle 120. The shank 170 can physically block the latch 135 from moving when it is received into the aperture. When the shank 170 is removed from the aperture, the latch 135 transition from the closed state to the open state, thus allowing the mobile computing device from being removed from the cradle 120.

In some examples, the latch 135 can include a lip 210 that is configured to, and can, cover at least a portion of a front surface of the mobile computing device when the mobile computing device is in the cradle 120 and the latch 135 is in the closed state. The lip can help to secure the mobile computing device in the cradle 120 while the latch 135 is in the closed state. At least a portion of the lip 210 can be parallel to a surface (e.g., a front surface) of the mobile computing device. In some examples, the lip 210 is configured to, and can, cover one or more sensors (e.g., one or more cameras, IR sensors, depth sensors, ambient light sensors, biometric sensors (e.g., face scanners), and/or other sensors described herein) of the mobile computing device when the mobile computing device is in the cradle 120 and the latch 135 is in the closed state. For instance, the sensor(s) of the mobile computing device being covered by the lip 210 (and/or another part of the latch 135 can provide a security benefit. For instance, if a malicious party were to gain access to those sensors of the mobile computing device, the sensor data captured by those sensors would not be useful to the malicious party due to those sensors being covered by the lip 210 and/or another portion of the latch 135.

Figure 3:
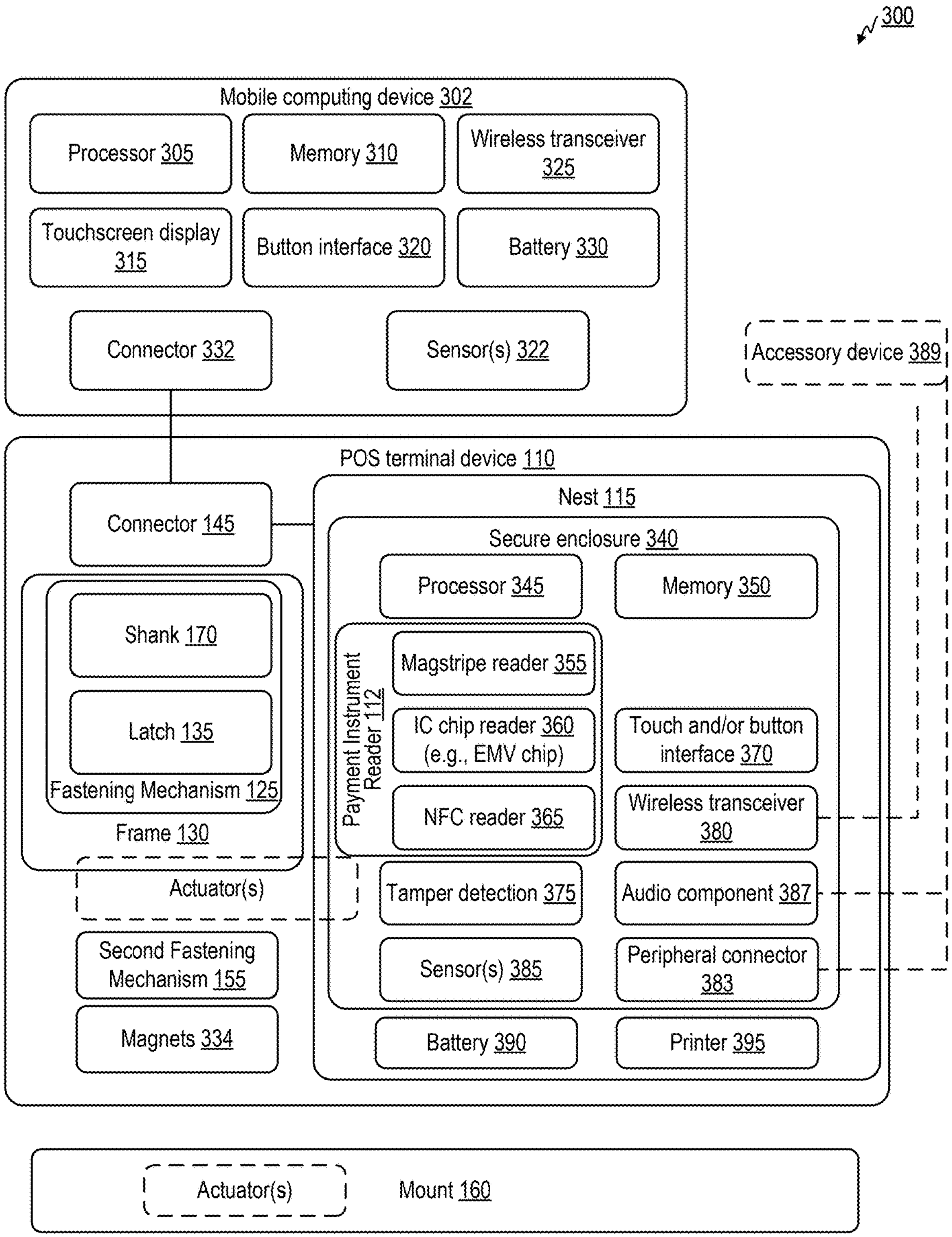
FIG. 3 is a block diagram illustrating an architecture of an exemplary point of sale (POS) terminal device configured to hold and interface with the mobile computing device, in accordance with some examples.

FIG. 3 is a block diagram 300 illustrating an exemplary architecture of an exemplary point of sale (POS) terminal device configured to hold and interface with the mobile computing device. In particular, the point of sale (POS) terminal device 110 includes a housing 105 with the cradle 120 and the nest 115.

In some examples, a surface of the cradle 120 can include one or more magnets 334. The magnets 334 may be used to secure the mobile computing device 302 to the cradle 120. The magnets 334 may be used to secure additional frames to the cradle (e.g., within the frame 130) (e.g., see FIG. 19 and/or FIG. 20). For instance, the mobile computing device 302 and/or additional frame may also have magnets, ferromagnetic (e.g., metallic) surfaces, or both. The magnets 334 may be subsurface magnets just underneath the surface 205 (and therefore not visible) or may be visible. The magnets 334 may be permanent magnets that sustain a permanent magnetic field (e.g., ferromagnets), electromagnets in which a magnetic field can be turned on or off by turning a flow of current on or off, or a combination thereof.

The connector 145 is also illustrated as a rigid plug extending from the nest 115 into the cradle 120 as illustrated in FIGS. 1A-1J. In some cases, the connector 145 may pass through a portion of a frame 130 through a passage in the frame 130 and partially extend into the cradle 120 (e.g., enough to plug into the connector 332 of the mobile computing device 302 if the connector 332 is a port). In other cases, the connector 145 may connect to a flexible or rigid extension cable or extension adapter within the frame 130 and/or in the nest 115. In some cases, the extension cable of the frame 130 may even include circuitry to change the format of the connector 145, for example from a universal serial bus (USB) standard plug to a proprietary plug such as Apple Lightning cable plug. In some cases, the connector 145 that extends from the nest 115 may be a flexible cable rather than a rigid connector, allowing the connector 145 to extend from whichever side of the frame 130 works best (e.g., top, left, bottom, right, or diagonal).

The block diagram 300 includes the mobile computing device 302 and the POS terminal device 110. The mobile computing device 302 refers to a mobile computing device 302 of any form factor, such as a tablet device, a smartphone, a phone, a mobile handset, a wearable device, a portable gaming console, or a combination thereof.

Figure 21:
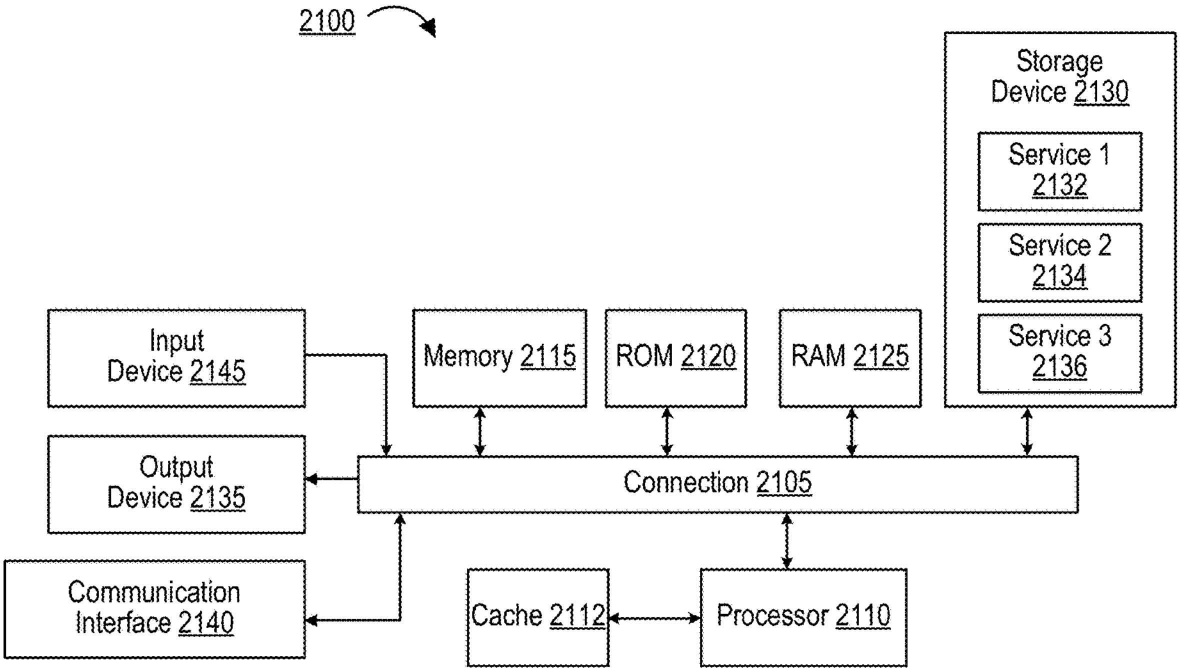
FIG. 21 is a block diagram of an exemplary computing device that may be used to implement some aspects of the technology, in accordance with some examples.

The mobile computing device 302 includes a processor 305, which may be any type of processor 2110 discussed with respect to FIG. 21 or any type of processor otherwise discussed herein. The mobile computing device 302 includes a memory 310, which may be any type of memory 2115 discussed with respect to FIG. 21, any type of storage device 2130 discussed with respect to FIG. 21, any type of RAM 2125 discussed with respect to FIG. 21, any type of ROM 2120 discussed with respect to FIG. 21, any type of memory or storage otherwise discussed herein, or some combination thereof.

The mobile computing device 302 may include a touchscreen display 315, which may be any type of display screen or output device 2135 discussed with respect to FIG. 21 or otherwise discussed herein, and which may optionally include a touch-sensitive surface touchscreen interface such as a capacitive touch-sensitive interface or a resistive touch-sensitive interface. The mobile computing device 302 may include a button interface 320, which may include, for example a keyboard, keypad, mouse, selection buttons aligned with GUI elements displayed on the display 315, any other input device 2145 discussed with respect to FIG. 21, or some combination thereof.

The mobile computing device 302 may include one or more wireless transceivers 325, which may include one or more 802.11 wi-fi transceivers, wireless local area network (WLAN) transceivers, 3G/4G/LTE/5G cellular network transceivers, Bluetooth transceivers, NFC transceivers, RFID transceivers, any type of wireless transceivers discussed with respect to the input devices 2145 of FIG. 21, any type of wireless transceivers discussed with respect to the output devices 2135 of FIG. 21, any other type of wireless transceivers discussed herein, or some combination thereof. The mobile computing device 302 may include one or more batteries 330.

The mobile computing device 302 may include at least one connector 332 that can connect with a connector 145 of the POS terminal device 110. Likewise, the POS terminal device 110 may include the connector 145, which connects to the connector 332 of the mobile computing device 302. The connectors 145 and 332 may be wired connectors that form an electrical connections when joined together. For example, the connector 332 may be a female port while the connector 145 is a male plug. Alternately, the connector 332 may be a male plug while the connector 145 is a female port. Alternately, both connectors 145 and 332 may be female, or both may be male, and they may be connected together by a female-to-female or male-to-male adapter or cable, which may in some cases be located in the frame 130 and may be referred to as the extender/adapter. The extender/adapter of the frame 130 may also change connection types or formats, for example by including an adapter from a Universal Serial Bus (USB) standard port or plug (such as USB-C) to another type of port or plug such as an Apple Lightning port or plug, or vice versa. The extender/adapter of the frame 130 may in some cases include some components that modify a signal being conveyed between the connector 145 and the connector 332 (in either direction), such as an analog to digital converter (ADC), a digital to analog converter (DAC), an amplifier, a high-pass filter, a low-pass filter, a band-pass filter, or some combination thereof. The extender/adapter of the frame 130 may in some cases include some components, such as a memory and processor (not pictured), that may be used to modify a format of data being conveyed between the connector 145 and the connector 332 (in either direction), for example by changing a file format and/or adding an extra layer of encryption based on an encryption key stored in a memory of the frame 130. In some example, the connector 332 can be coupled to a spring and/or a flexible cable within the POS terminal device 110 that allows the connector 332 to move and/or rotate slightly (e.g., to prevent damage) while remaining secure.

In some cases, the connectors 145 and 332 may be, or may include, one or more wireless receivers, transmitters, or transceivers that may connect wirelessly to one another rather than through electrical contact. In such cases, the connectors 145 and 332 may be or may include 802.11 wi-fi wireless receivers/transmitters/transceivers, wireless local area network (WLAN) receivers/transmitters/transceivers, Bluetooth receivers/transmitters/transceivers, personal area network (PAN) receivers/transmitters/transceivers, 3G/4G/LTE/5G cellular network receivers/transmitters/transceivers, NFC receivers/transmitters/transceivers, RFID receivers/transmitters/transceivers, any type of wireless receivers/transmitters/transceivers discussed with respect to the input devices 2145 of FIG. 21, any type of wireless receivers/transmitters/transceivers discussed with respect to the output devices 2135 of FIG. 21, any other type of wireless receivers/transmitters/transceivers discussed herein, or some combination thereof. Thus, data may be conveyed between the mobile computing device 302 and the POS terminal device 110 (e.g., the nest 115) wirelessly via the wireless receivers, transmitters, and/or transceivers of the connectors 145 and 332. The connectors 145 and 332 may also include wireless charging elements, such as inductive coils, in order to wirelessly provide power from the POS terminal device 110 (e.g., from the nest 115) to the mobile computing device 302 and/or to wirelessly provide power from the mobile computing device 302 to the POS terminal device 110 (e.g., to the nest 115). Thus, power may be conveyed between the mobile computing device 302 and the POS terminal device 110 (e.g., the nest 115) wirelessly via the wireless charging elements of the connectors 145 and 332.

The frame 130 refers to a frame 130 of any form factor, such as the frame 130A with thin borders (to accommodate a large mobile computing device 302A in large cradle 120A) of FIG. 1A or the frame 130B with thick borders (to accommodate a small mobile computing device 302B in small cradle 120B) of FIG. 1B. As noted above, the frame 130 may include an extender or adapter for bridging the connector 145 to the connector 332. In some cases, the extender/adapter may be used to modify which side of the cradle 120 the mobile computing device 302's connector 332 connects to the connector 145 through. For example, while FIGS. 1A, 1B, 1G, 1I, 2A-2B, 4A-4E, 5A-5B, 16, 18, 19, and 20, show the connector 145 opposite the latch 135, the extender/adapter could be used so that a connector instead extends from the bottom border of the cradle 120, from the left border of the cradle 120, from the top border of the cradle 120, or from a diagonal corner of the cavity (or cradle 120).

The frame 130 may include a fastening mechanism 125 that secures the mobile computing device 302 in place within the cradle 120 of the POS terminal device 110. The fastening mechanism 125 can include a latch 135, which may be used to secure the mobile computing device 302 to the POS terminal device 110, in particular within the cradle 120 that the frame 130 borders. Examples of the latch 135 are illustrated in, and discussed with respect to, at least FIGS. 1A, 1B, 1G, 1I, 2A-2B, 4A-4E, 5A-5B, 16, 18, 19, and 20. The fastening mechanism 125 can include a shank 170. The shank 170 may include, for example, a screw, a pin, and/or a bolt. The shank 170 may be received into an aperture in the POS terminal device 110, the frame 130, the fastening mechanism 125, the latch 135, or a combination thereof. The shank 170 may be received into the aperture to secure the mobile computing device 302 in place within the cradle 120 of the POS terminal device 110. In some examples, the shank 170 may be received into the aperture to secure the latch 135 into a closed position as illustrated in FIGS. 4A and 4C.

The POS terminal device 110 may include the magnets 334. In some cases, magnets 334 for securing the mobile computing device 302 within the cradle 120 may alternately or additionally be located at one or more of the borders of the frame 130. Alternately or additionally, the POS terminal device 110 may include other physical coupling mechanisms that couple the frame 130 and/or the mobile computing device 302 to the cradle 120 of the POS terminal device 110.

The POS terminal device 110 may include the nest 115. The nest 115 may include a secure enclosure 340. The secure enclosure 340 may be used to house components that might read, store, convey, or manipulate sensitive information, such as encryption keys, payment instrument information, customer identifying information, personal identification numbers (PIN) or codes, customer signatures, merchant identifying information, or other sensitive information.

The secure enclosure 340 is secure in that it may include tamper detection circuitry 375 that can detect attempts to damage, drill into, modify, spill conductive liquid into/onto, or remove the secure enclosure 340 or any component within the secure enclosure 340. The tamper detection circuitry 375 may include one or more voltage sensors positioned at various points along conductive circuitry that, if untampered with, should conduct a known voltage, but if tampered with, are expected to conduct no current at all (e.g., due to a broken/open circuit) or to conduct a different voltage (e.g., due to a short circuit or other unwanted connection). If a tamper attempt is detected based on detection of one or more a voltage changes greater than a predetermined tolerance in one or more voltages by the one or more voltage sensors of the tamper detection circuitry 375, then the POS terminal device 110 may be at least partially disabled or deactivated, and data stored in its memory 350 may optionally be modified, erased, deleted, destroyed, and/or overwritten to prevent a malicious party from gaining access to sensitive information. Each of these features improves the security of the POS device.

The secure enclosure 340 of the nest 115 may include one or more payment instrument readers 112 that read payment instrument information from one or more payment instruments. Payment instruments can include payment cards, transit passes, gift cards, near field communication (NFC) devices (e.g., smart phones, phones, wearable devices, payment cards with NFC capabilities), or combinations thereof. The one or more payment instrument readers 112 can include a magnetic stripe reader 355, which reads payment instrument information from a magnetic stripe of a payment instrument, such as a payment card, in response to receipt of the magnetic stripe through a slot of the nest 115.

The one or more payment instrument readers 112 in the secure enclosure 340 of the nest 115 may include a IC chip reader 360 such as an EMV chip reader, which reads payment instrument information from an IC chip of a payment instrument, such as a payment card, in response to receipt of the IC chip into a slot of the nest 115. The one or more payment instrument readers 112 in the secure enclosure 340 of the nest 115 may include a NFC reader 365, which reads payment instrument information wirelessly from a wireless signal received from an NFC transmitter or NFC transceiver of a payment instrument. The NFC transmitter or NFC transceiver of the payment instrument may be an active NFC transmitter/transceiver or passive NFC transmitter/transceiver.

The secure enclosure 340 of the nest 115 may include one or more processors 345, each of which may be any type of processor 2110 discussed with respect to FIG. 21 or any type of processor otherwise discussed herein. The secure enclosure 340 of the nest 115 includes one or more memory components 350, each of which may be any type of memory 2120 discussed with respect to FIG. 21, any type of mass storage 2130 discussed with respect to FIG. 21, any type of portable storage, any type of memory or storage otherwise discussed herein, or some combination thereof. While the processors 345 and memory 350 are illustrated inside the secure enclosure 340 of the nest 115 in FIG. 3, in some cases the nest 115 may include one or more processors 345 and memory components 350 inside the secure enclosure as well as one or more processors 345 and memory components 350 outside of the secure enclosure. In such cases, the processors 345 and memory 350 within the secure enclosure 340 can handle tasks concerning tamper detection or sensitive information, such as tamper detection, storage of encryption keys, encryption of payment instrument information, receipt of signatures or PIN codes or biometric data or other sensitive information via interfaces 370 or sensors 385, output of sensitive data through audio components 387, and the like. The processors 345 and memory 350 outside of the secure enclosure 340 can handle tasks not dealing with unencrypted sensitive information, such as receipt generation, activation of magnets 334 (e.g., electromagnets), managing the connection between the connector 145 and the connector 332, and the like. Sensitive information is dealt with inside the secure enclosure 340 to improve security, and other tasks are dealt with outside of the secure enclosure 340. The processors 345 and memory 350 not dealing with sensitive information are outside of the secure enclosure 340. This is advantageous because, for example, in the case where tampering occurs, only the memory inside the secure enclosure 340 would be modified, erased, deleted, destroyed, and/or overwritten to prevent a malicious party from gaining access to sensitive information. This leaves the memory outside of the secure enclosure unchanged, resulting in no requirement for restoring the contents of the memory outside the secure enclosure. Another advantage of this is that the complexity and cost of the POS device can be reduced as less tamper detection circuitry is required because only the hardware directly dealing with sensitive information needs to be protected with the secure enclosure, rather than the whole POS device being within the secure enclosure.

In some cases, the processor 345 may execute instructions stored in the memory 350 to encrypt the payment instrument information once it is read by one or more of the payment instrument reader(s) 112 (e.g., magstripe reader 355, integrated circuit (IC) chip reader 360, and/or near field communication (NFC) reader 365) but before the payment instrument information is sent to the mobile computing device 302 and/or to the payment processing server. That is, once encrypted, the payment instrument information may be sent to the payment processing server via the wireless transceiver 380 of the nest 115, or the payment instrument information may be sent to the mobile computing device 302 over the connectors 145 and 332, and the mobile computing device 302 may then send the payment instrument information to the payment processing server via the wireless transceiver 325 of the mobile computing device 302. In some cases, the one or more wireless transceivers 325 or 380 may receive a confirmation from the payment processing server once the payment transaction is processed, for instance once the funds (in the payment amount) are transferred from the account associated with the customer to the account associated with the merchant. If the confirmation is received at the one or more wireless transceivers 325, the mobile computing device 302 may also notify the POS terminal device 110 that the confirmation has been received, for example by forwarding the confirmation to the POS terminal device 110.

The secure enclosure 340 of the nest 115 may include a touch and/or button interface 370, which may include, for example, a touchscreen, a touchpad, a keyboard, keypad, mouse, selection buttons aligned with GUI elements displayed on the display 315, any other input device 2160 discussed with respect to FIG. 21, or some combination thereof. The touch and/or button interface 370 of the nest 115 may be used to input sensitive information such as PIN codes, customer identifying information, merchant identifying information, or customer signatures. The secure enclosure 340 of the nest 115 may include one or more sensors 385. The sensors 385 can include biometric sensors, such as fingerprint scanners, iris scanners, face scanners, palmprint scanners, microphones for voice recognition, cameras for facial recognition, or combination thereof. The sensors 385 can be used to authenticate customer identity, for example to for the customer to authorize a transaction (e.g., a purchase, a return, a rental, etc.). In some examples, sensors 385 may be used to authenticate customer identity instead of or in addition to receipt of a signature or PIN from the customer. The sensors 385 can be used to authenticate merchant identity, for example for the merchant to authorize a transaction (e.g., a purchase, a return, a rental, etc.). In some examples, sensors 385 may be used to authenticate merchant identity instead of or in addition to receipt of a signature or PIN from the merchant. The mobile computing device 302 also use sensor(s) 322, such as any of the types of sensors discussed above. In some examples the POS terminal device 110 can use the sensors 322 of the mobile computing device 302 to authenticate customer identity and/or to authenticate merchant identity, for example to authorize a transaction (e.g., a purchase, a return, a rental, etc.).

The secure enclosure 340 of the nest 115 may include one or more wireless transceivers 380, which may include one or more 802.11 wi-fi transceivers, wireless local area network (WLAN) transceivers, 3G/4G/LTE/5G cellular network transceivers, Bluetooth transceivers, NFC transceivers, RFID transceivers, any type of wireless transceivers discussed with respect to the input devices 2160 of FIG. 21, any type of wireless transceivers discussed with respect to the output devices 2150 of FIG. 21, any other type of wireless transceivers discussed herein, or some combination thereof. In some cases, the one or more wireless transceivers 380 may be used to transmit the payment instrument information to the payment processing server, optionally along with a payment amount, customer identifying information allowing the payment processing server to identify the account associated with the customer, and merchant identifying information allowing the payment processing server to identify the account associated with the merchant. In some cases, the one or more wireless transceivers 380 may then receive a confirmation from the payment processing server once the payment transaction is processed, for instance once the funds (in the payment amount) are transferred from the account associated with the customer to the account associated with the merchant.

The nest 115 may also include one or more batteries 390 that may supply power to the other components of the POS terminal device 110, and optionally to the mobile computing device 302 through the connectors 145 and 332. Alternately or additionally, the mobile computing device 302 may supply power to the one or more batteries 390 and/or to the other components of the POS terminal device 110 through the connectors 332 and 145. In some cases, the nest 115 may have no battery 390, and its components may be powered exclusively by the mobile computing device 302 through the connectors 332 and 145. For example, the mobile computing device 302 may supply power to the POS terminal device 110 when the payment instrument readers 112 should be activated. In some cases, the nest 115 may use a battery 390 to keep the tamper detection circuitry 375 active, while the payment instrument readers 112 are only activated when the mobile computing device 302 is connected and/or supplying power via connectors 145/332. In some cases, the nest 115 may use a battery 390 to stabilize supply of power to the payment instrument readers 112 and prevent issues related to blackouts or brownouts. While the one or more batteries 390 are illustrated outside the secure enclosure 340 within the nest 115 in FIG. 3, in some cases at least one battery 390 of the one or more batteries 390 may be located within the secure enclosure 340, for example to prevent a malicious party from disconnecting the tamper detection circuitry 375 from power as a means of tampering, thereby improving security.

The nest 115 may also include one or more audio components 387, such as a 3.5 mm headphone jack, a 2.5 mm headphone jack, a USB audio connector, an Apple Lightning audio connector, a Bluetooth® wireless audio connector, another type of wired and/or wireless audio connector, a speaker, or some combination thereof. The audio components 387 may be used to read information out loud through a speaker of the audio components 387 or through headphones connected in a wired and/or wireless fashion to the audio components 387 to customers or merchants with disabilities such as blindness or other visual impairments. The information read aloud may include, for example, instructions for interacting with a user interface of the POS terminal device 110 for the customer portion or a merchant portion of the transaction. In some cases, at least some of the circuitry associated with the one or more audio components 387 may be located within the secure enclosure 340 because some of the information that is read to customers through the audio components 387 may be sensitive information, such as a payment card number, customer identifying information, a PIN code, or the like. An optional accessory device 389 is illustrated as being connected to the audio components 387 in FIG. 3. The accessory device 389 may include a set of headphones as discussed above.

The accessory device 389 may alternately or additionally include a peripheral device other than a set of headphones, such as a card reader or other type of payment instrument reader, a barcode scanner, a weight scale, a cash drawer, a keyboard, a keypad, a mouse, a printer, or some combination thereof. While the accessory device 389 may be connected to the POS terminal device 110 by being connected to the audio component 387, the accessory device 389 may alternately or additionally be connected to the POS terminal device 110 through a peripheral connector 383 separate from the audio component 387, and/or a wireless transceiver 380 separate from the audio component 387. The peripheral connector 383 may include one or more ports, one or more plugs, one or more wired or wireless receivers, one or more wired or wireless transmitters, one or more wired or wireless transceivers, or some combination thereof, such as in a hub. The peripheral connector 383 may include one or more of any wired or wireless connector of any type discussed with respect to the output device 2150, input devices 2160, or otherwise mentioned herein, which the accessory device 389 may connect to. For example, the peripheral connector 383 may include one or more USB ports, which the accessory device 389 may connect to via a USB plug or USB cable. While only one accessory device 389 is illustrated in FIG. 3, multiple accessory devices 389 may be connected to the POS terminal device 110-in some cases, one or more accessory devices 389 may be connected to the wireless transceiver 380 of the POS terminal device 110, one or more accessory devices 389 may be connected to the audio component 387 of the POS terminal device 110, and/or one or more accessory devices 389 may be connected to the peripheral connector 383 of the POS terminal device 110. While the audio component 387, peripheral connector 383, and wireless transceiver 380 are all illustrated as being positioned within the secure enclosure 340, in some cases, one or more of these may be outside of the secure enclosure 340. In fact, in some cases, other components illustrated within the secure enclosure 340 may be outside of the secure enclosure 340, and/or components illustrated as outside of the secure enclosure 340 may be within the secure enclosure 340.

The nest 115 may also include a printer 395, which may be used to print a receipt during the transaction or after the transaction has been processed. The receipt may identify prices for each individual item or service purchased by the customer from the merchant, subtotal, the total, any taxes and/or fees and/or tips and/or gratuities, any coupons or discounts or other promotions applied, and the like. The receipt may be generated by the processor(s) 305 of the mobile computing device 302, the processor(s) 345 of the nest 115 of the POS terminal device 110, or some combination thereof. The receipt may in some cases be emailed, texted, and/or sent via an electronic messaging service to an account and/or device associated with the customer instead of or in addition to being sent to the printer 395 to be printed.

The sensors 322 of the mobile computing device 302, and/or the sensors 385 of the POS terminal device 110, may include one or more accelerometers, gyroscopes, IMUs, cameras, or combinations thereof, which the mobile computing device 302 may use to determine its orientation and automatically rotate or resize or otherwise adjust any merchant or customer POS GUI displayed by the display screen of the mobile computing device 302 accordingly, as well as any touchscreen touch interface "soft" button positions corresponding to the GUI.

The sensors 322 of the mobile computing device 302, and/or the sensors 385 of the POS terminal device 110, can be employed for a variety of uses such as, for example, help in diagnosing the reason that a POS terminal device 110 connected to the mobile computing device 302 has broken. Diagnosing the reason that a POS terminal device 110 is broken is important because it aids engineers in determining if there is a design flaw or manufacturing defect in the POS terminal device 110 that can be addressed or fixed. This can allow an engineer to repair the POS terminal device 110, and/or the coupling between the mobile computing device 302 and the POS terminal device 110, quickly, without playing a guessing game to attempt to figure out what caused the POS terminal device 110 to break (e.g., without having to disassemble the POS terminal device 110 to analyze its internal components). The mobile computing device 302's accelerometer and other sensors may provide clues to understanding the cause of a particular failure of the POS terminal device 110. For example, the mobile computing device 302's accelerometer may indicate that the POS terminal device 110 was dropped, even if there are no visibly cracked components. Using the mobile computing device 302's sensors 322, the engineers (or the POS terminal device 110 itself) are able to identify that the POS terminal device 110 was dropped around the same time that the POS terminal device 110 stopped working properly. The same principle can also be used to detect tamper attempts and/or to avoid false tamper detection alerts. For instance, if POS terminal device 110 detects a tamper at the exact same time that a fall is identified using the mobile computing device 302's accelerometer data, the tamper detection circuitry 375 can determine that the detected tamper attempt merely occurred as a result of the device falling, not because a malicious party attempted to tamper with the POS terminal device 110. On the other hand, the tamper detection circuitry 375 can use the mobile computing device 302's accelerometer data to support detection of a tamper attempt, for example based on detection of unusual movements of the mobile computing device 302 (while received in the cradle 120 of the POS terminal device 110) that suggest an attempt to tamper with the POS terminal device 110.

The mobile computing device 302's sensors may also be used to detect both how much force a user pushes their credit card into the POS terminal device with, and if that force varies between different users. This information can valuable for trying to determine the internal specifications of the POS terminal device 110, and can also aid in testing by determining how hard to push the test cards during testing to ensure the tests accurately reflect how users use the product in the real world. The mobile computing device 302's sensors may also be used to determine how many users of the POS terminal device 110 use the angled mount 1120, how many users of the POS terminal device 110 use only the non-angled mount 1110, how many users of the POS terminal device 110 use the stand 1610, and how many user of the POS terminal device 110 use some combination thereof. This information regarding frequency of use of different mounts or stands can impact whether the various mounts and stands are continued to be manufactured and/or provided to users by a manufacturer of the POS terminal device 110. This can save costs and avoid waste.

Using the mobile computing device 302's built-in sensors 322, the POS terminal device 110 can determine the proportion of users that use one or more POS terminal devices 110 in landscape orientation 1210 and the proportion of users that use the one or more POS terminal devices 110 in portrait orientation 1220, and can compare the proportions. Using the mobile computing device 302's built-in sensors, the POS terminal device 110 can determine the proportion of time that a POS terminal device 110 spends in landscape orientation 1210 and the proportion of time that the POS terminal device 110 spends in portrait orientation 1220, and can compare the proportions. Using the mobile computing device 302's built-in sensors, the POS terminal device 110 can determine the proportion of users that mount their respective POS terminal devices 110 to one type of surface 515 (e.g., wall) via the mount 160, and the proportion of users that mount their respective POS terminal devices 110 to another type of surface 515 (e.g., countertop or tabletop)

via the mount 160, and can compare the proportions. Using the mobile computing device 302's built-in sensors, the POS terminal device 110 can determine the proportion of time that a POS terminal device 110 spends mounted to one type of surface 515 (e.g., wall) via the mount 160, and the proportion of time that the POS terminal device 110 spends mounted to another type of surface 515 (e.g., countertop or tabletop) via the mount 160, and can compare the proportions.

The mobile computing device 302's ambient light sensor can also be used to intelligently adjust the brightness or dimness of the lights on the POS terminal device 110 (e.g., one or more LEDs, display screens, or other illuminated elements of the nest 115). The POS terminal device itself can, in some examples, lack a sensor to determine whether the device is located in a bright environment or a dark environment (e.g., bar or outdoor farmers market). It is important that in a dark environment such as a bar, the POS terminal device 110 lights up enough to permit the users to know where to insert or tap their payment card. Sometimes, it is advantageous to be dim in dark environments to avoid blinding users with a bright light in a dark room. Therefore, the mobile computing device 302's ambient light sensor can used by the POS terminal device 110 to determine the proper level of brightness based on the environment. In some examples, the sensos 385 of the POS terminal device 110 can include such an ambient light sensor.

In some examples, the sensors 322 of the mobile computing device 302 include one or more cameras. In some examples, the sensors 322 of the mobile computing device 302 include at least one front-facing camera along a front surface of the mobile computing device 302 and/or at least one rear-facing camera (e.g., camera 180) along a rear surface of the mobile computing device 302. Light from an environment around the mobile computing device 302 and/or the POS terminal device 110 can be received by the camera(s) of the mobile computing device. Any of the camera(s) of the mobile computing device 302 can be used to scan barcodes, quick response (QR) codes, or other optical glyphs that encode information. Any of the camera(s) of the mobile computing device 302 can be used to detect and/or recognize objects using object detection and/or object recognition. Any of the camera(s) of the mobile computing device 302 can be used for biometric scanning, such as facial detection and/or recognition, iris detection and/or recognition, person detection and/or recognition, fingerprint detection and/or recognition, handprint detection and/or recognition, or a combination thereof. Biometric scanning can be used to authorize a transaction made using the POS terminal device 110.

The POS terminal device 110 may include sensors 385 itself, which may include any type of sensors 322 discussed above with respect to the mobile computing device 302's sensors 322. The sensors 385 of the POS terminal device 110 may capture any type of sensor data discussed above with respect to the mobile computing device 302's sensors 322. The POS terminal device 110 may use sensor data captured by its sensors in any way, and/or for any purpose, discussed above with respect to the mobile computing device 302's sensors 322.

FIG. 4A is an exploded-view diagram 400A illustrating an exemplary latch 135 of a frame of an exemplary point of sale (POS) terminal device from a perspective view.

The latch 135 illustrated in FIG. 4A includes two circular holes on either side, into which cylindrical pins 430 may be inserted that enable movement of the latch 135 as illustrated in FIG. 4C. The pins may include a ball spring plunger, like a pogo pin. The pins 430 may also be inserted into walls of the frame 130 that surround the latch 135, for example into pin grooves 425 within the walls of the frame 130 as illustrated in FIG. 4C. Two smaller circular holes are also illustrated on either side of the latch 135—these may interface with convex bumps in the walls of the frame that fit into the holes and may encourage the latches to remain in certain positions, such as the locked position of FIG. 4C.

The latch 135 may include a grip 405 configured to hold a portion of a mobile computing device. The grip 405 may include two parallel surfaces (a "top" and "bottom" surface in FIG. 4A) between which the thickness of the mobile computing device 302 can fit, and a wall surface (the "left" surface in FIG. 4A) perpendicular to the two parallel surfaces against which the mobile computing device 302 can abut. The latch 135 may be customized for a particular mobile computing device 302 so that the thickness that the grip 405—that is, the distance between the parallel surfaces of the grip 405, or the length of the perpendicular surface of the grip 405—corresponds to the thickness of the mobile computing device 302, the thickness of the mobile computing device 302 determined either with or without a case depending on how the mobile computing device 302 is intended to be used by the merchant.

In some cases, a shank 170 (e.g., a screw or pin) may be inserted into an aperture in the latch 136 where illustrated by the solid arrow in FIG. 4A. This screw may help secure the latch 136 in a particular position, such as the locked position of FIG. 4C. The shank 170 may, in some examples, be inserted into a port or other aperture or recess in the mobile computing device, to help secure the mobile computing device 302 in place in the cradle 120.

Figure 4B:
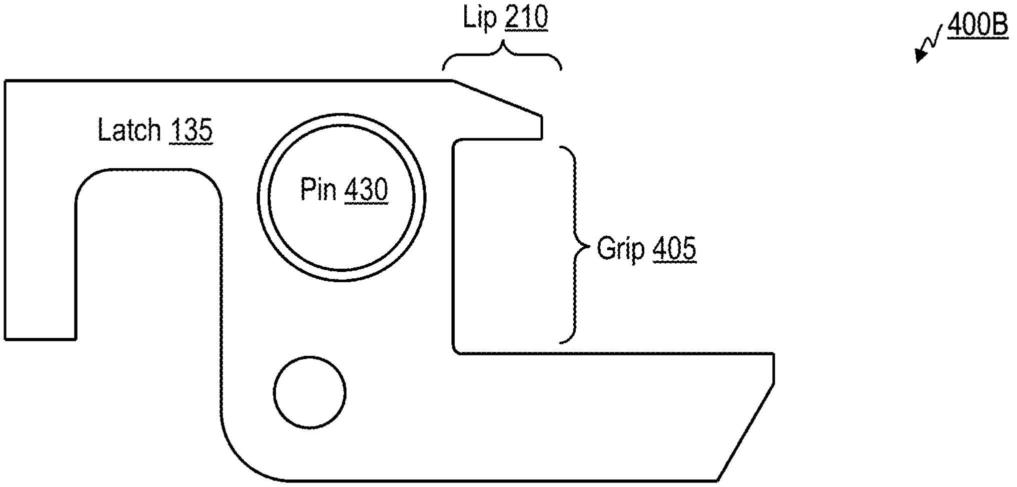
FIG. 4B is a diagram illustrating the latch of the frame of the exemplary point of sale (POS) terminal device from a side view, in accordance with some examples.
Figure 4C:
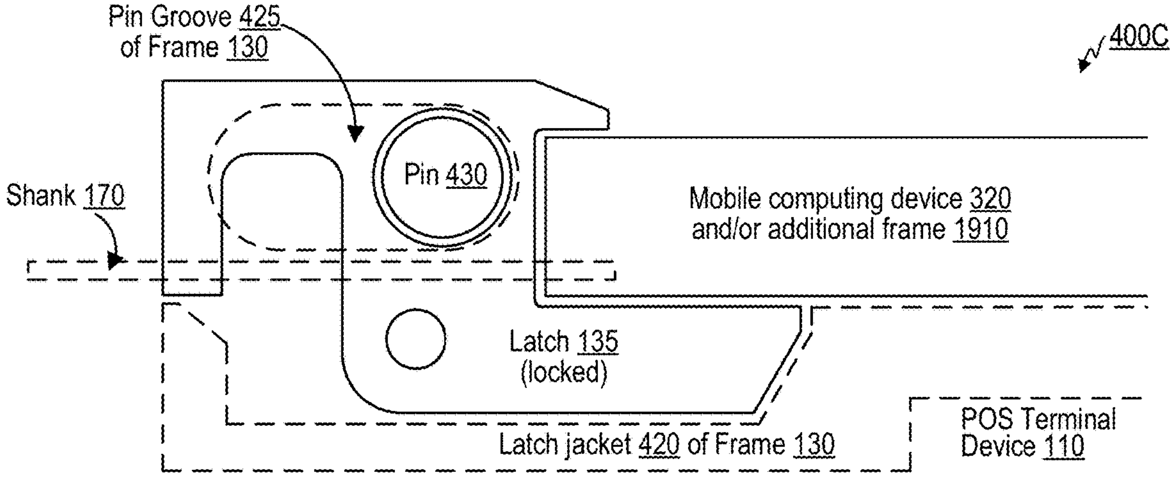
FIG. 4C is a diagram illustrating the latch of the frame of the exemplary point of sale (POS) terminal device in a locked position securing a mobile computing device from a side view, in accordance with some examples.

FIG. 4B is a diagram 400B illustrating the latch of the frame of point of sale (POS) terminal device from a side view. From the side view of FIG. 4B, the pin 430 is visible having been inserted into the circular hole in the latch 135 as shown in FIG. 4A and partially extending from the side of the latch 135. The grip 405 is again visible in FIG. 4B. The smaller circular holes in the side of the latch 135 are also visible in FIG. 4B below the pin 430.

FIG. 4C is a diagram 400C illustrating the latch 135 of the frame of the point of sale (POS) terminal device in a locked position securing a mobile computing device from a side view. The pin 430 of the latch 135 is inserted into a pin groove 425 within a wall of the frame 130 that abuts the side of the latch 135. The pin groove 425 is wide enough (in the vertical direction in FIGS. 4C, 4D, and 4E) to fit the diameter of the pin 430 and therefore allows the latch 135 to rotate about the pin 430 as seen in the receive/eject position of the latch 135 in FIG. 4E. Because the pin groove 425 is also longer (in the horizontal direction in FIGS. 4C, 4D, and 4E) than the diameter of the pin 430, the pin 430 is able to slide laterally along the length of the pin groove 425, enabling the entire latch 135 to slide laterally within a latch jacket 420 of the frame 130. The pin 430 of the latch 135 is positioned laterally as far forward (toward the mobile computing device 302) within the pin groove 425 as possible when the latch 135 is in the locked position illustrated in FIG. 4C.

The latch jacket 420 is a structure that is part of the frame 130 that forms a "base" or "platform" on which the bottom of the latch 135 may rest and along which the bottom of the latch 135 may slide during translational movements or rotations, and in some cases limits the range of movement that the latch 135 is capable of. For example, the structure of the latch jacket 420 allows the latch 135 to slide laterally (left and right in FIGS. 4C, 4D, and 4E) translationally within a defined movement range as visible in FIGS. 4C, 4D, and 4E, and allows the latch 135 to rotate within a defined range of rotation and only when the latch 135 is positioned laterally at certain positions as visible in FIG. 4C. While the latch jacket 420 is referred to as part of the frame 130, it may in some cases actually be part of the surface of the cradle 120 instead. In some cases, the latch jacket 420 may be comprised of both a portion of the frame 130 and a portion of the surface.

The grip 405 of the latch 135 is shown holding a mobile computing device 302 by the thickness of the mobile computing device 302. Because of this, the mobile computing device 302 is secured to the cradle 120 and frame 130 while the latch 135 is in the locked position as in FIG. 4C. The mobile computing device 302 cannot be easily separated from the cradle 120 and frame 130 while the latch 135 is in the locked position as in FIG. 4C. In some cases, the connectors 332 and 145 are connected at another side of the mobile computing device 302 than the side gripped and secured by the latch 135. The connection between the connectors 145 and 332 may additionally secure that side of the mobile computing device 302 to the frame 130 (or to the connector 145). In some cases, the connectors 145 and 332 may be at the same side of the mobile computing device 302 that is gripped and secured by the latch 135, and in some cases the connector 145 may even pass through a portion of the latch 135, such as through the rectangular hole at the bottom of the latch 135 that is visible in FIG. 4A.

The shank 170 is also illustrated in FIG. 4C as a skinny rod that is inserted into the latch 135 while the latch 135 is in the locked position, and that passes into a port or recess within the mobile computing device 302 as well. The shank 170 may prevent rotational and/or lateral movement of the latch 135 while it is inserted or screwed in. In some cases, the shank 170 may also pass through at least a portion of the latch jacket 420 of the frame 130 and/or cradle 120 when it is inserted.

Figure 4D:
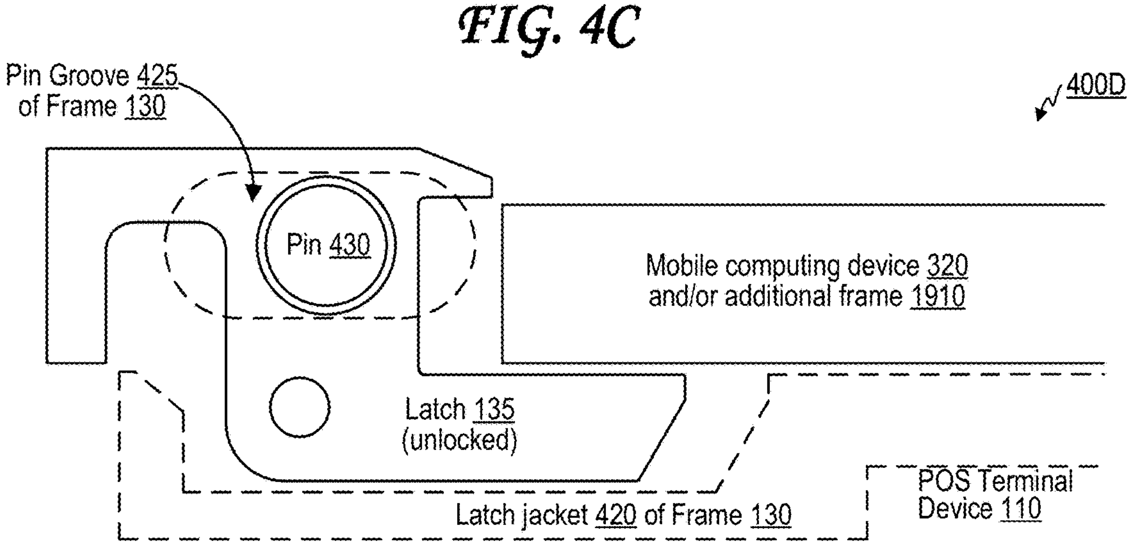
FIG. 4D is a diagram illustrating the latch of the frame of the exemplary point of sale (POS) terminal device in an unlocked position cradling a mobile computing device from a side view, in accordance with some examples.

FIG. 4D is a diagram 400D illustrating the latch 135 of the frame of the exemplary point of sale (POS) terminal device in an unlocked position cradling a mobile computing device from a side view. The pin 430 of the latch 135 is positioned laterally approximately midway within the pin groove 425 when the latch 135 is in the unlocked position illustrated in FIG. 4D. In the unlocked position, the latch 135 as a whole is moved laterally away from the mobile computing device 302 relative to the locked position, and no longer grips the mobile computing device 302. Thus, the mobile computing device 302 is not as strongly secured to the cradle 120 and frame 130 when the latch 135 is in the unlocked position. However, in some cases it may still be difficult to insert the mobile computing device 302 into the cradle 120 when the latch 135 is in the unlocked position, as there still might not be much space to connect the connectors 145 and 332. Likewise, in some cases it may still be difficult to eject the mobile computing device 302 from the cradle 120 when the latch 135 is in the unlocked position, as there still might not be much space to disconnect the connectors 145 and 332.

Figure 4E:
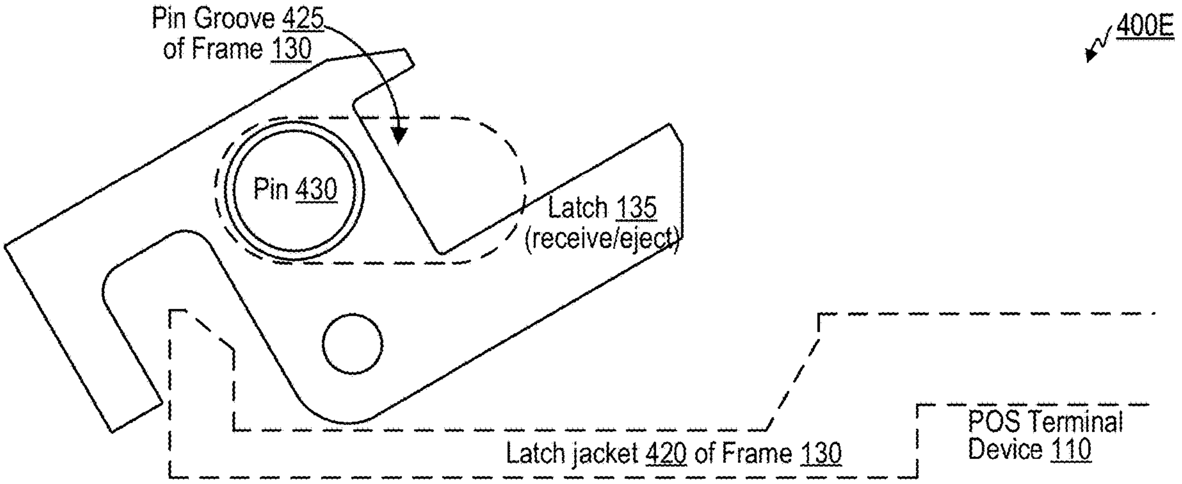
FIG. 4E is a diagram illustrating the latch of the frame of the exemplary point of sale (POS) terminal device in a receive/eject position from a side view, in accordance with some examples.

FIG. 4E is a diagram 400E illustrating the latch 135 of the frame of the exemplary point of sale (POS) terminal device in a receive/eject position from a side view. The pin 430 of the latch 135 is positioned laterally as far backward (away from the mobile computing device 302) within the pin groove 425 as possible when the latch 135 is in the receive/eject position illustrated in FIG. 4E. The latch 135 is also rotated about the pin 430 in the receive/eject position illustrated in FIG. 4E, from approximately zero degrees to approximately 45 degrees. The combination of translational movement away from the mobile computing device 302 and rotation away from the surface of the cradle 120 can aid a user in inserting the mobile computing device 302 into the cradle 120 and/or can aid the user in ejecting the mobile computing device 302 from the cradle 120.

In some POS terminal devices 110, the latch 135 might not rotate at all, or may only rotate without any translational movement. In some POS terminal devices 110, the latch 135 might have a larger or smaller defined range of rotation, for example from zero degrees to 10 degrees, 20, degrees, 30 degrees, 40 degrees, 50 degrees, 60 degrees, 70 degrees, 80 degrees, 90 degrees, 100 degrees, 110 degrees, 120 degrees, 130 degrees, 140 degrees, 150 degrees, 160 degrees, 170 degrees, 180 degrees, 225 degrees, 270 degrees, 315 degrees, or 360 degrees. While the latch 135 within the latch jacket 420 illustrated in FIGS. 4C, 4D, and 4E can only rotate when the latch 135 is in or near the receive/eject position due to a barrier near the rear of the jacket 420, some latch jackets 420 may lack such a barrier and allow rotation at any lateral position, or may limit rotation to other lateral positions than the receive/eject position.

Figure 5A:
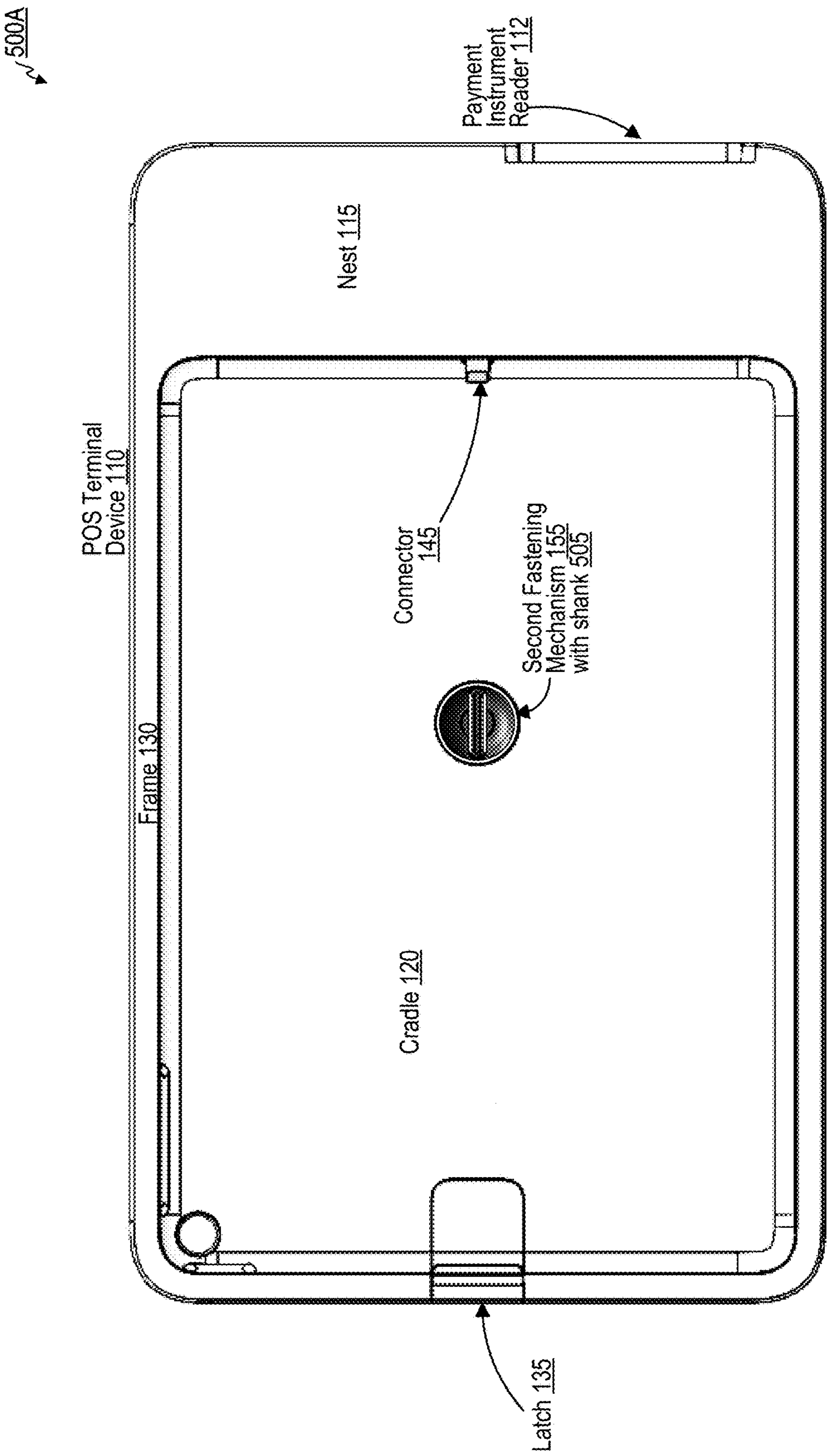
FIG. 5A illustrates a front view of an exemplary second fastening mechanism with a shank located in the cradle of the exemplary point of sale (POS) terminal device that couples the POS terminal device to a mount, in accordance with some examples.

FIG. 5A illustrates a front view 500A of an exemplary second fastening mechanism 155 with a shank 505 located in the cradle 120 of the exemplary point of sale (POS) terminal device 110 that couples the POS terminal device 110 to a mount 160. The shank 505 can be a screw, a pin, a bolt, or a combination thereof. The second fastening mechanism 155 can aid with anti-theft protection. fastening mechanism. While the mobile computing device 302 is received in the cradle 120 of the POS terminal device, the mobile computing device 302 blocks access to the center screw that couples the POS terminal device 110 to the mount 160. This ensures that the POS terminal device 110 cannot be removed from the mount 160 (and thus from the surface that the mount 160 is coupled to) without first removing the mobile computing device 302 from the POS terminal device 110. The mobile computing device 302 be removed from the POS terminal device 110 without removing the shank 170 from the fastening mechanism 125, adding an additional layer of protection. Therefore, the fastening mechanism 125 and the second fastening mechanism 155 work together to ensure that a potential thief cannot steal the POS terminal device 110 and/or the mobile computing device 302 within it.

Figure 5B:
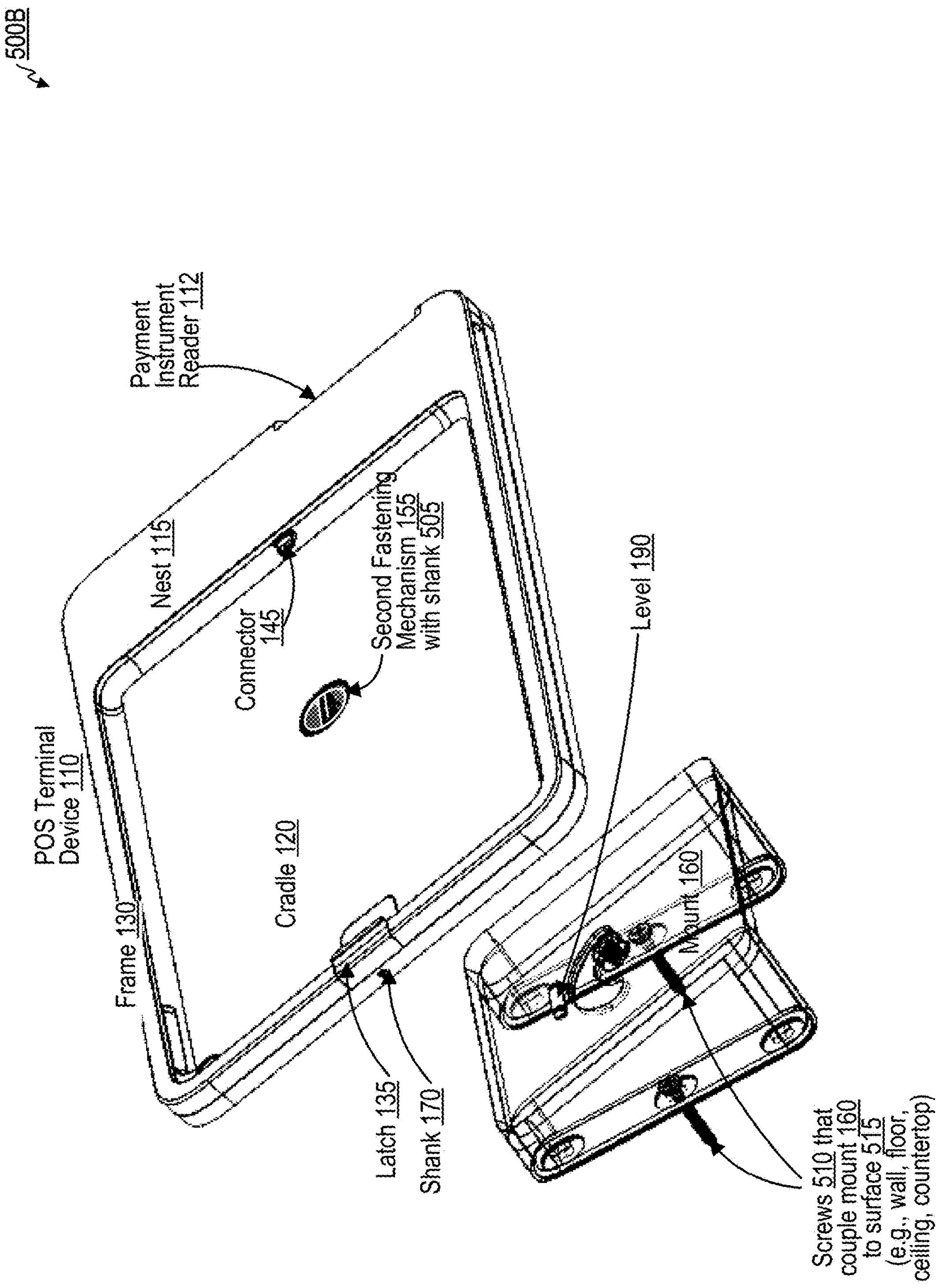
FIG. 5B illustrates a perspective view of the second fastening mechanism with a shank located in the cradle of the exemplary point of sale (POS) terminal device that couples the POS terminal device to a mount, in accordance with some examples.

FIG. 5B illustrates a perspective view 500B of the exemplary second fastening mechanism 155 with the shank 505 located in the cradle of the point of sale (POS) terminal device that couples the exemplary POS terminal device to a mount. In FIG. 5B, additional screws 510 are also visible that couple the mount 160 to a surface 515 (e.g. a wall, a floor, a ceiling, a countertop, a tabletop, a desk surface, or a combination thereof).Access to the screws 510 that couple the mount 160 to the surface 515 are also blocked by the POS terminal device 110, once mounted onto the surface 515 using the mount 160. Therefore, since the POS terminal device 110 is coupled to the mount 160, access to the screws 510 that attach the mount 160 to the surface 515 can be prevented. As such, a potential thief can neither steal the mobile computing device 302, nor the POS terminal device 110, nor the mount 160, nor any combination thereof. The level 190 of the mount 160 is also illustrated in FIG. 5B.

Figure 6A:
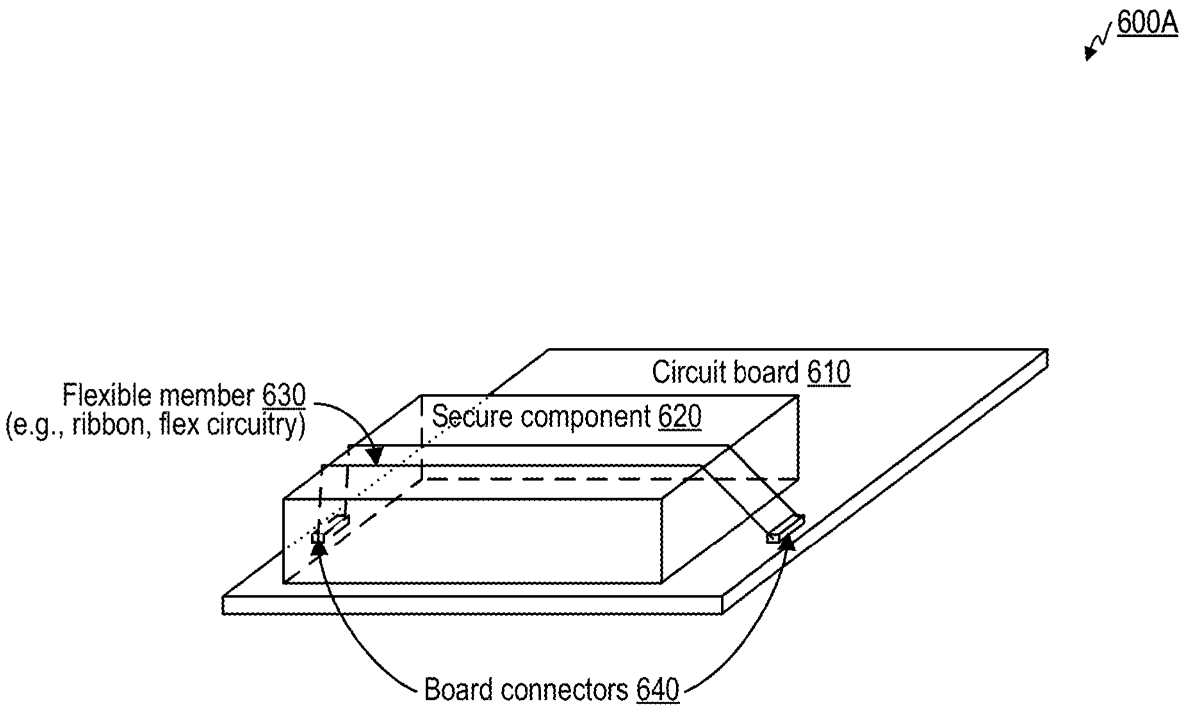
FIG. 6A illustrates a perspective view of an exemplary tamper detection system in which a flexible member with conductive traces is tightly wrapped around a secure component, in accordance with some examples.
Figure 6B:
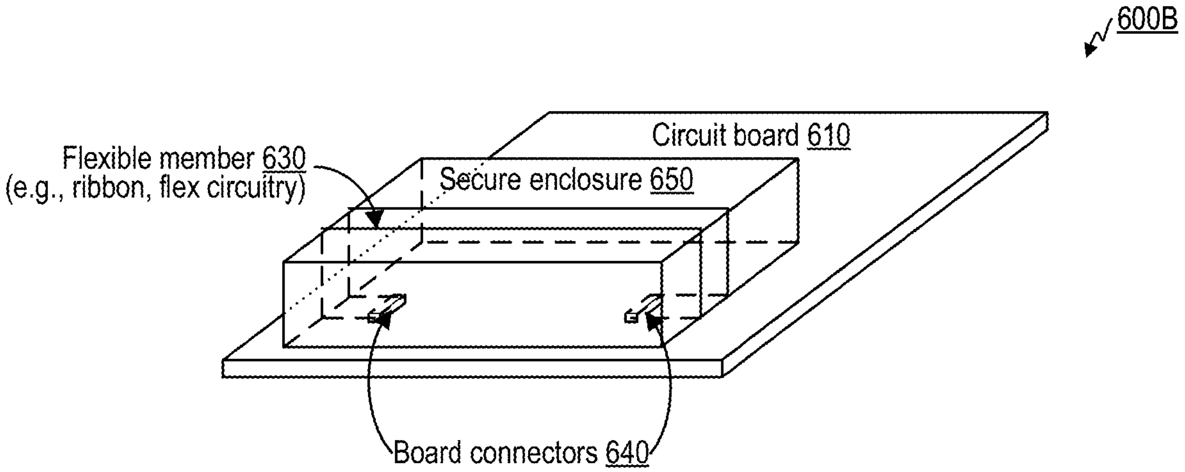
FIG. 6B illustrates a perspective view of an exemplary tamper detection system in which a flexible member with conductive traces is tightly wrapped around a secure enclosure, in accordance with some examples.

FIG. 6A illustrates a perspective view 600A of an exemplary tamper detection system in which a flexible member with conductive traces is tightly wrapped around a secure component. FIG. 6B illustrates a perspective view 600B of an exemplary tamper detection system in which a flexible member with conductive traces is tightly wrapped around a secure enclosure.

In particular, a circuit board 610 with a secure component 620, over a portion of the circuit board 610 is illustrated in FIG. 6A. The secure component 620 may be a secure enclosure or may be a different sensitive component, such as a memory element. A flexible member 630, which may be a ribbon cable or other flexible circuitry such as flexible printed circuitry (FPC), may include tamper traces within it, optionally with neighboring tamper traces in the flexible member 630 having alternating voltages, or otherwise having different voltages from one another. The flexible member 630 is wrapped tightly around the secure component 620 and connects back to the circuit board at two board connectors 640. The circuit board 610 may check voltages coming from the board connectors 640 to identify if the flexible member 630 has been at least partially removed from either of the board connectors 640, whether the flexible member 630 has been torn, whether any of the tamper traces in the flexible member 630 have been connected to one another unexpectedly to form a short circuit or other unexpected connection resulting in an unexpected voltage at the voltage sensor.

The flexible member 630 is used similarly in FIG. 6B as in FIG. 6A, though in this case the secure component 620 is a secure enclosure 650. Because a secure enclosure is used, the board connectors 640 can be placed inside the secure enclosure 650, further increasing the difficultly of tampering with the flexible member 630 or its connections. If the flexible member 630 in FIG. 6A or FIG. 6B is wrapped tightly specifically over areas of a secure enclosure 650 where the connector pieces 715 connect the circuit board 610 to the tamper traces of the secure enclosure 650, then the potential attacker no longer has unimpeded access to the secure enclosure 650, and therefore has more obstacles to overcome without detection if they still wish to attempt to tamper with the device, thereby improving security.

In some case, the flexible member 630 with tamper traces that is wrapped around at least a portion of a secure component 620 and/or enclosure 650 as in FIG. 6A and FIG. 6B may be referred to as a tamper belt. In some cases, tamper detection circuitry 375 only includes limited number of tamper lines, and thus tamper detection features (e.g., the flexible member 630, the traces of a secure enclosure) may be daisy chained together in series and/or in parallel. In such a case, a benefit in detecting the specific component being tampered with can be gained if both upstream lines that live on the same tamper detection feature are not coupled to two downstream elements that also live on a shared element.

Figure 7:
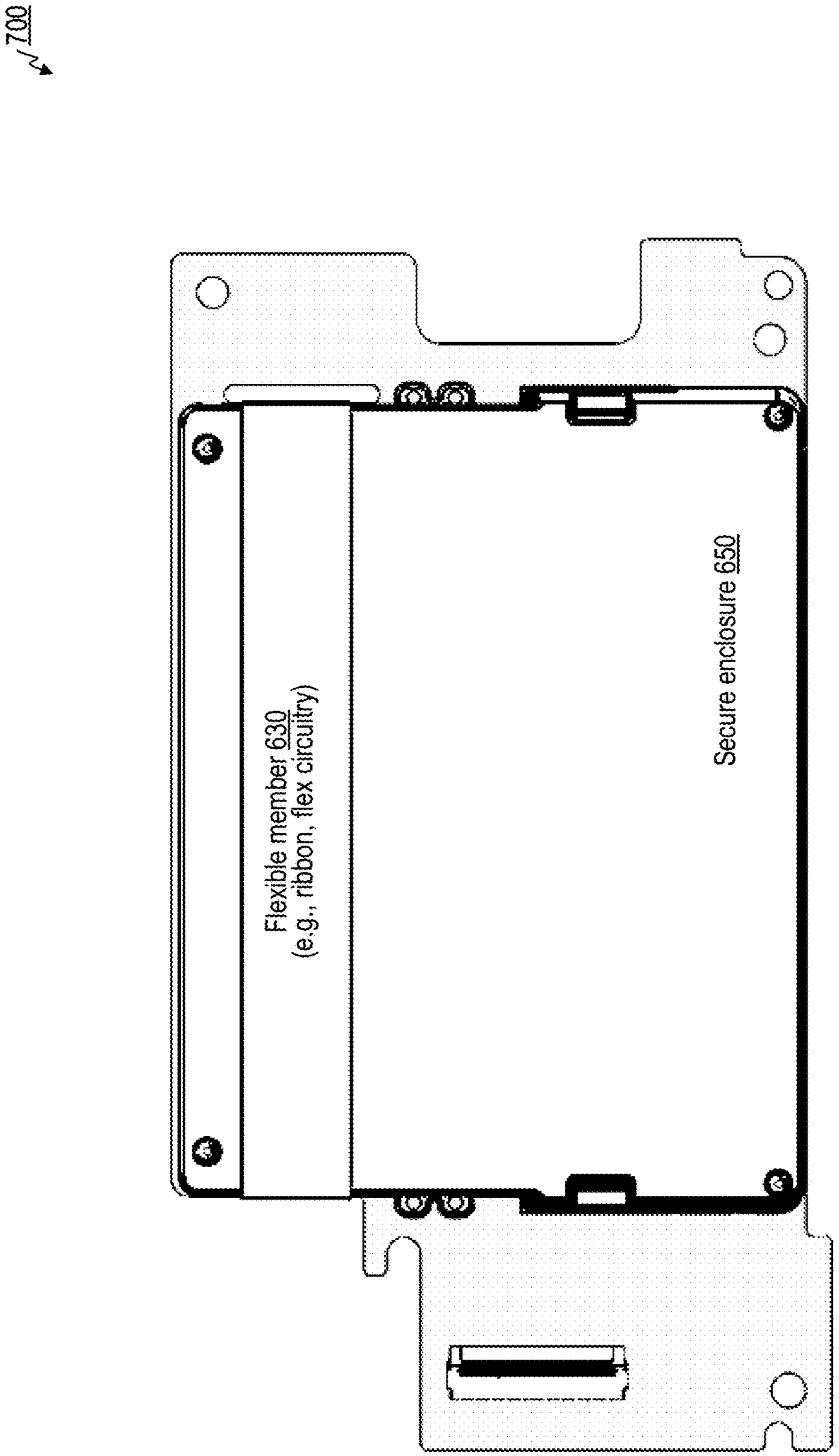
FIG. 7 illustrates a top-down view of exemplary circuitry with a flexible member wrapped around a secure enclosure, in accordance with some examples.
Figure 8:
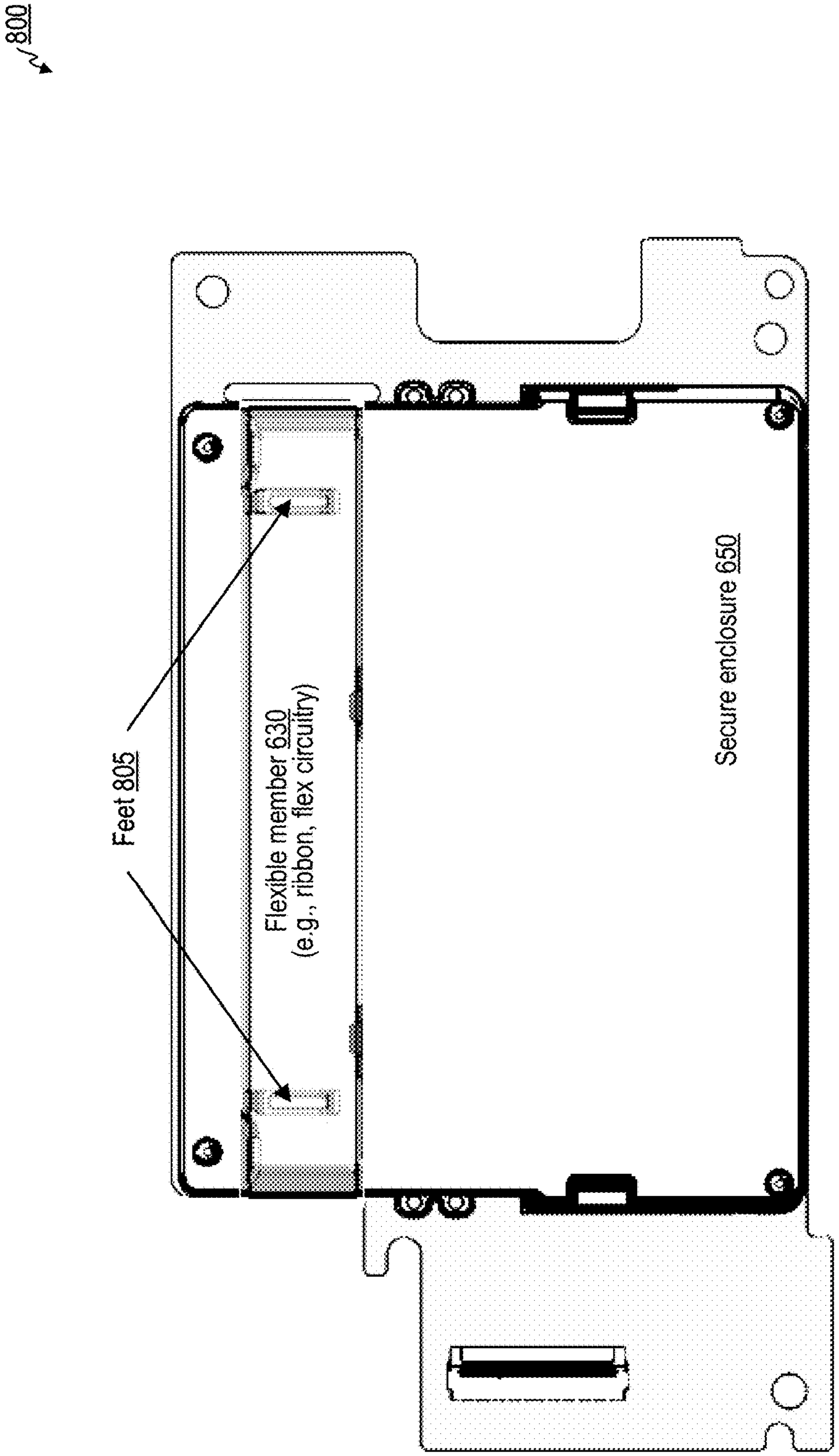
FIG. 8 illustrates a top-down view of exemplary circuitry with the flexible member wrapped around the secure component, where a portion of the flexible member and the secure enclosure are translucent so that feet on the underside of the circuitry are visible through the flexible member and the secure enclosure, in accordance with some examples.

FIG. 7 illustrates a top-down view 700 of exemplary circuitry with a flexible member 630 wrapped around a secure enclosure 650. FIG. 8 illustrates a top-down view 800 of circuitry with the flexible member 630 wrapped around the secure enclosure 650, where a portion of the flexible member 630 and the secure enclosure 650 are translucent so that feet 805 on the underside of the circuitry are visible through the flexible member 630 and the secure enclosure 650. The circuity includes a circuit board, such as a printed circuit board (PCB). The secure enclosure 650 is on the top surface of the circuit board. The flexible member 630 is wrapped around at the least the top and two sides of the secure enclosure 650. In some examples, the circuitry (e.g., the circuit board, the PCB) with the secure enclosure 650 and the flexible member 630 can be part of the POS terminal device 110, the nest 115, the payment instrument reader 112, the mobile computing device 302, or a combination thereof.

Figure 9:
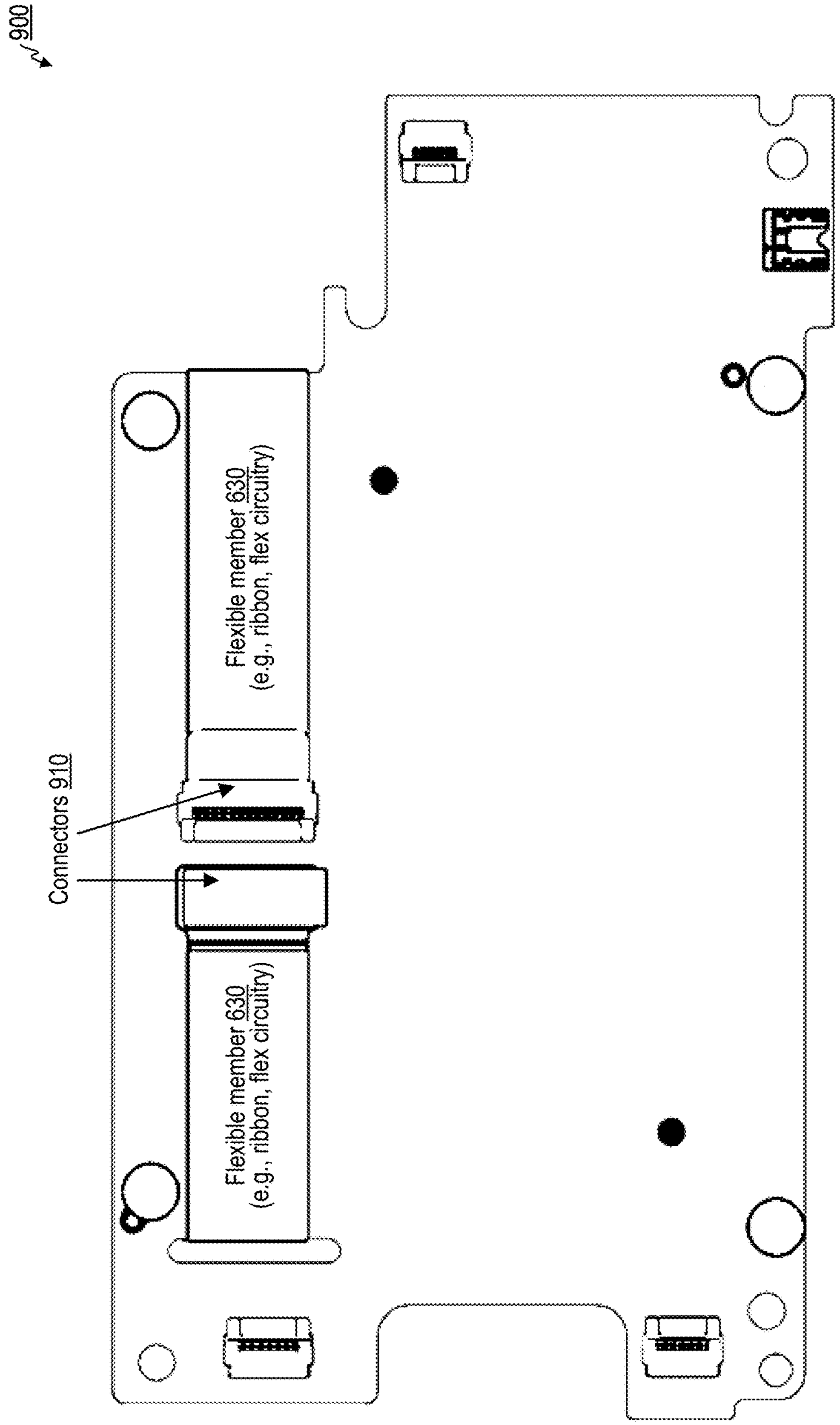
FIG. 9 illustrates a bottom side view of the circuitry of FIGS. 7-8, with the flexible member coupling to the bottom side to the circuit board using connectors, in accordance with some examples.

FIG. 9 illustrates a bottom side view 900 of the circuitry of FIGS. 7-8, with the flexible member 630 coupling to the bottom side to the circuit board using connectors 910. Because the connectors 910 are close to one another on the bottom side of the circuitry, the flexible member 630 is also wrapped around, and covers, much of the bottom side of the circuitry. The flexible member 630 being wrapped around, and covering, portions of the bottom side of the circuitry can protect the portions of the bottom side of the circuitry from tamper attempts. In some examples, the feet 805 of FIG. 8 can be covered by the flexible member 630. In some examples, the flexible member 630 can wrap around at least portion(s) of one or both of the feet 805.

Figure 10:
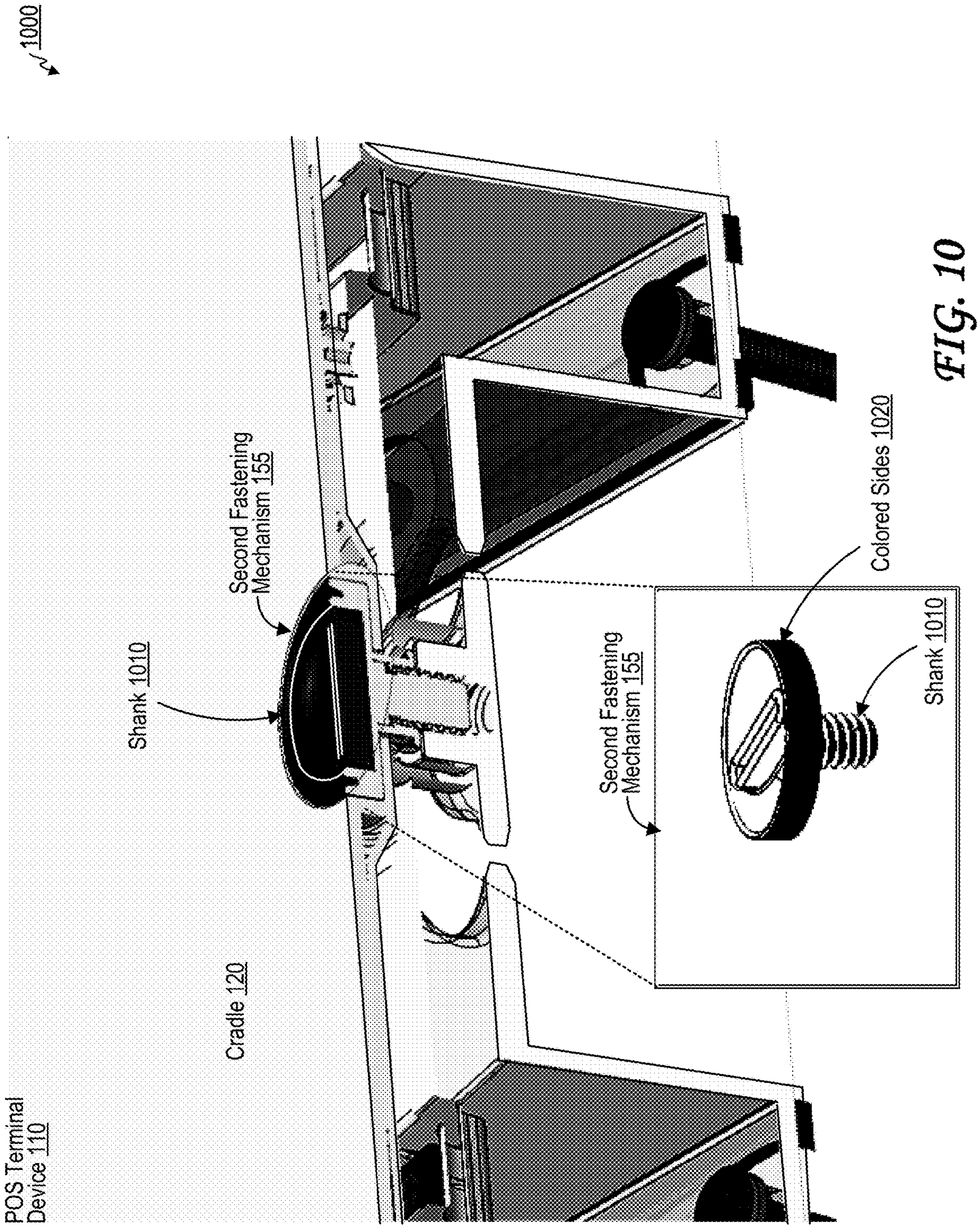
FIG. 10 illustrates an exemplary shank with colored sides for the second fastening mechanism, for additional security of a point of sale (POS) terminal device that holds and interfaces with a mobile computing device, in accordance with some examples.

FIG. 10 illustrates an exemplary shank 1010 with colored sides 1020 for second fastening mechanism 155, for additional security of a point of sale (POS) terminal device 110 that holds and interfaces with a mobile computing device 302. The shank 1010 can be an example of the shank 505. Specifically, as shown in FIG. 10, the shank 1010 is a screw, and the side of the head of the screw is a colored side 1020 (e.g., painted red, orange, green, blue, or another visible color). The second fastening mechanism 155 includes an aperture in the cradle 120 that the shank 1010 is received into. For example, if the shank 1010 is a screw, the screw can be screwed into the aperture, and the aperture can be threaded to securely receive and secure the shank 1010 in place in the aperture. The colored side 1020 of the shank 1010 can be hidden by the aperture after the aperture has received the shank (e.g., once the screw is fully screwed into the aperture). The colored side 1020 of the shank 1010 can be discernable (e.g., visible) when the shank 1010 is at least partially outside of the aperture, for instance before the aperture has fully received the shank 1010 (e.g., before the screw is fully screwed into the aperture) or after the shank 1010 has at least partially been removed from the aperture (e.g., after the screw is at least partially unscrewed from the aperture). The colored side 1020 being discernable serves as a warning to a user that the POS terminal device 110 is not securely coupled to the mount 160 using the second fastening mechanism 155 while the colored side 1020 is discernable. Thus, the colored side 1020 allows a user to determine whether the shank 1010 has been fully received by the aperture of the second fastening mechanism 155 (e.g., where the shank 1010 is a screw, whether the screw is screwed tightly into the aperture of the second fastening mechanism 155). For example is, if a user is able to see the colored side(s) 1020 of the shank 1010, the user will know that the shank 1010 is not fully received into the aperture. A shank 1010 not fully or property received into the aperture may be unsafe, and may allow the POS terminal device 110 to disconnect from the mount 160 and/or fall from the surface 515. If a user cannot see the colored side(s) 1020 of the shank 1010 because the aperture hides the colored sides 1020, the user can be confident that the POS terminal device 110 is safely and properly attached to the mount 160. If a user can see the colored sides 1020 on the side of the shank 1010, this can serve as a warning that the shank 1010 might not be fully received into the aperture (e.g., fully screwed into the aperture) and disconnect from the mount 160 and/or the surface 515.

In some examples, the shank 1010 is a screw, and the screw can be screwed in using a flat head screwdriver, a Philips screwdriver, a coin, and/or a user's hand (e.g., the screw can include a handle to be rotated using the user's hand). In some examples, threading in an aperture of the second fastening mechanism 155 stops the screw (the shank 1010) at a defined angle. In some examples, the threading may be heatstaked. In some examples, the threading includes multistart threads, thus reducing the number of rotations of the screw (the shank 1010) required to secure the screw into the aperture of the second fastening mechanism 155 and thereby reducing the complexity of the system. The second fastening mechanism 155 may include a ball detent or another detent mechanism to stop the screw (the shank 1010) from further tightening after it is fully tightened. In some examples, the second fastening mechanism 155 includes a click-in coupling system for coupling the POS terminal device 110 and the mount 160 together instead of, or in addition to, the fastening system involving a shank 1010 received into an aperture. In some examples, the second fastening mechanism 155 includes 45 degree rotation key-in fastening system for coupling the POS terminal device 110 and the mount 160 together instead of, or in addition to, the fastening system involving a shank 1010 received into an aperture. In some examples, the second fastening mechanism 155 includes a toe-in coupling system for coupling the POS terminal device 110 and the mount 160 together instead of, or in addition to, the fastening system involving a shank 1010 received into an aperture. In some examples, the second fastening mechanism 155 includes a magnet-based coupling system for coupling the POS terminal device 110 and the mount 160 together instead of, or in addition to, the fastening system involving a shank 1010 received into an aperture.

In some examples, a shape of the shank 1010 can match a shape of an aperture or cavity in the cradle 120 and/or in the POS terminal device 110 and/or mount 160 that the shank 1010 fits into. For instance, in an illustrative example, the shank 1010 include a cylindrical portion that fits into a cylindrical aperture or cavity in the cradle 120 and/or in the POS terminal device 110 and/or mount 160. This match between the shape of the shank 1010 and the shape of the aperture or cavity in the cradle 120 and/or in the POS terminal device 110 and/or mount 160 can improve security, as it prevents the shank 1010 from bending, rotating, or wiggling out of the aperture or cavity. The shank 1010 and the aperture or cavity can include screw threading or other fasteners, which can further lock the shank 1010 into the aperture or cavity.

Figure 11:
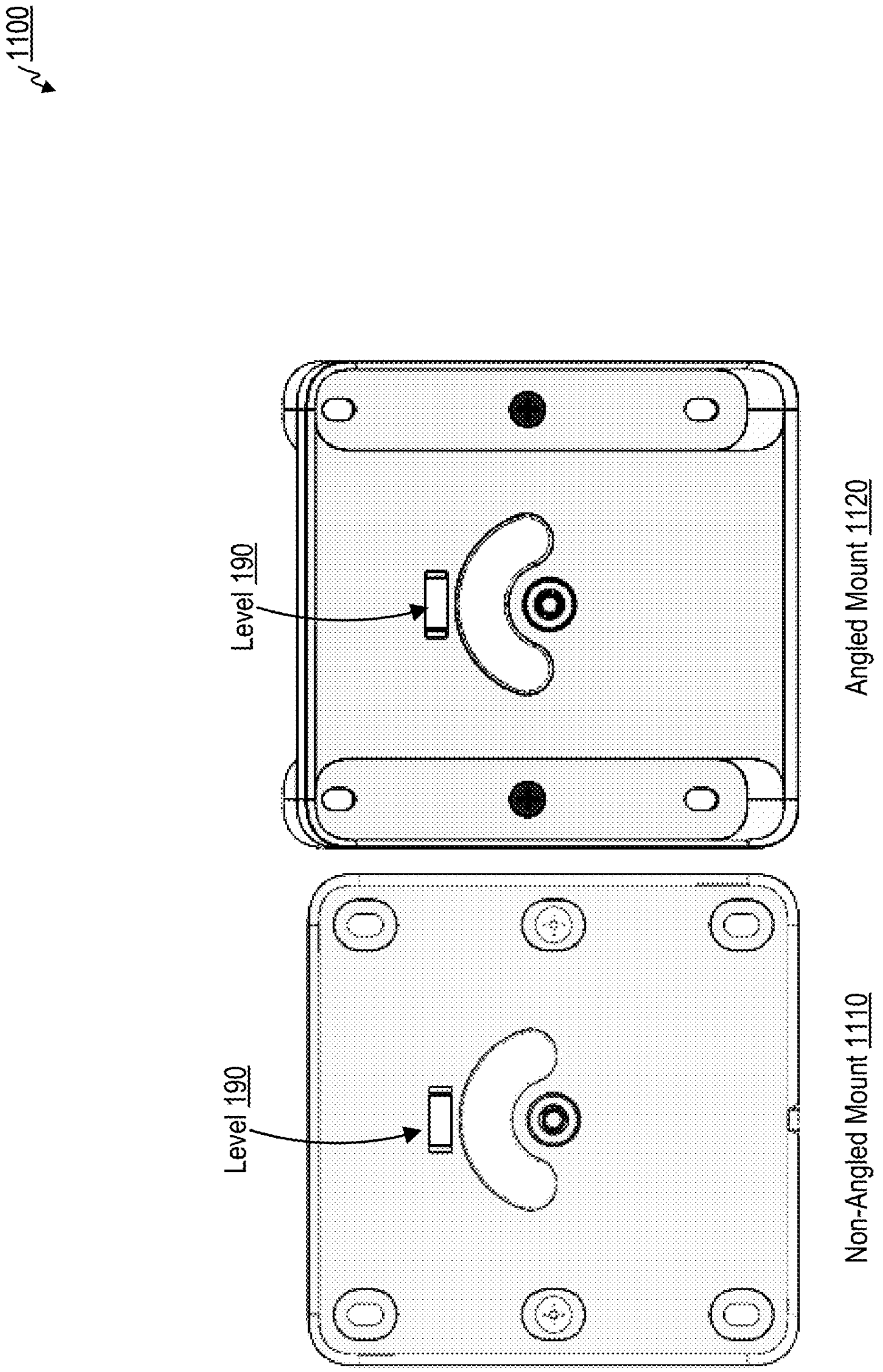
FIG. 11 illustrates an exemplary non-angled mount and an exemplary angled mount that can be used to mount an exemplary point of sale (POS) terminal device to a surface, in accordance with some examples.

FIG. 11 illustrates an exemplary non-angled mount 1110 and an exemplary angled mount 1120 that can be used to mount an exemplary point of sale (POS) terminal device 110 to a surface 515. The surface 515 (e.g. a wall, a floor, a ceiling, a countertop, a tabletop, a desk surface, or a combination thereof). The angled mount 1120 includes an angled shape associated with an angle, so that the POS terminal device 110 is arranged at the angle compared to the surface 515 while the POS terminal device 110 is coupled to the angled mount 1120 using the second fastening mechanism 155 and while the angled mount 1120 is coupled to the surface 515. In an illustrative example, the angle is a 12.5 degree angle. In some examples, the angle may be any angle, such as an angle of 0 degrees, 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, 90 degrees, more than 90 degrees, or an angle between any two previously-listed angles. The non-angled mount 1110 includes an straight shape, so that the POS terminal device 110 is oriented parallel to the surface 515 while the POS terminal device 110 is coupled to the non-angled mount 1110 using the second fastening mechanism 155 and while the non-angled mount 1110 is coupled to the surface 515.

The non-angled mount 1110 and an angled mount 1120 are both examples of the mount 160. In order to couple the mount 160 to the surface 515, a user may, for example, drill holes into the surface 515 and/or insert screws and/or wall anchors into the surface 515 through the mount 160. This may aid the mount 160 in maintaining secure coupling to the surface 515 to support the weight of the POS terminal device 110 and/or the mount 160 without decoupling from the surface 515. In some circumstances, a user may mount one mount 160 to the surface 515 and then subsequently decide that another mount 160 is preferred instead. The screw holes for one mount 160 (e.g., the non-angled mount 1110) and another mount 160 (e.g., the angled mount 1120), are located the same distance apart, in the same arrangement, as illustrated in FIG. 11. Thus, the non-angled mount 1110 and the angled mount 1120, and/or another type of mount 160, can be interchangeable, allowing a user to swap from one style of mount 160 to another style of mount 160 without requiring the user to make additional holes in the surface 515.

The bracket is also 360 degrees symmetrical permitting it to be used in portrait mode or landscape mode and can be quickly swapped from one mode to the other. The same bracket can also be used in "countertop" mode or on the wall in any of the orientations illustrated in FIG. 12.

Figure 12:
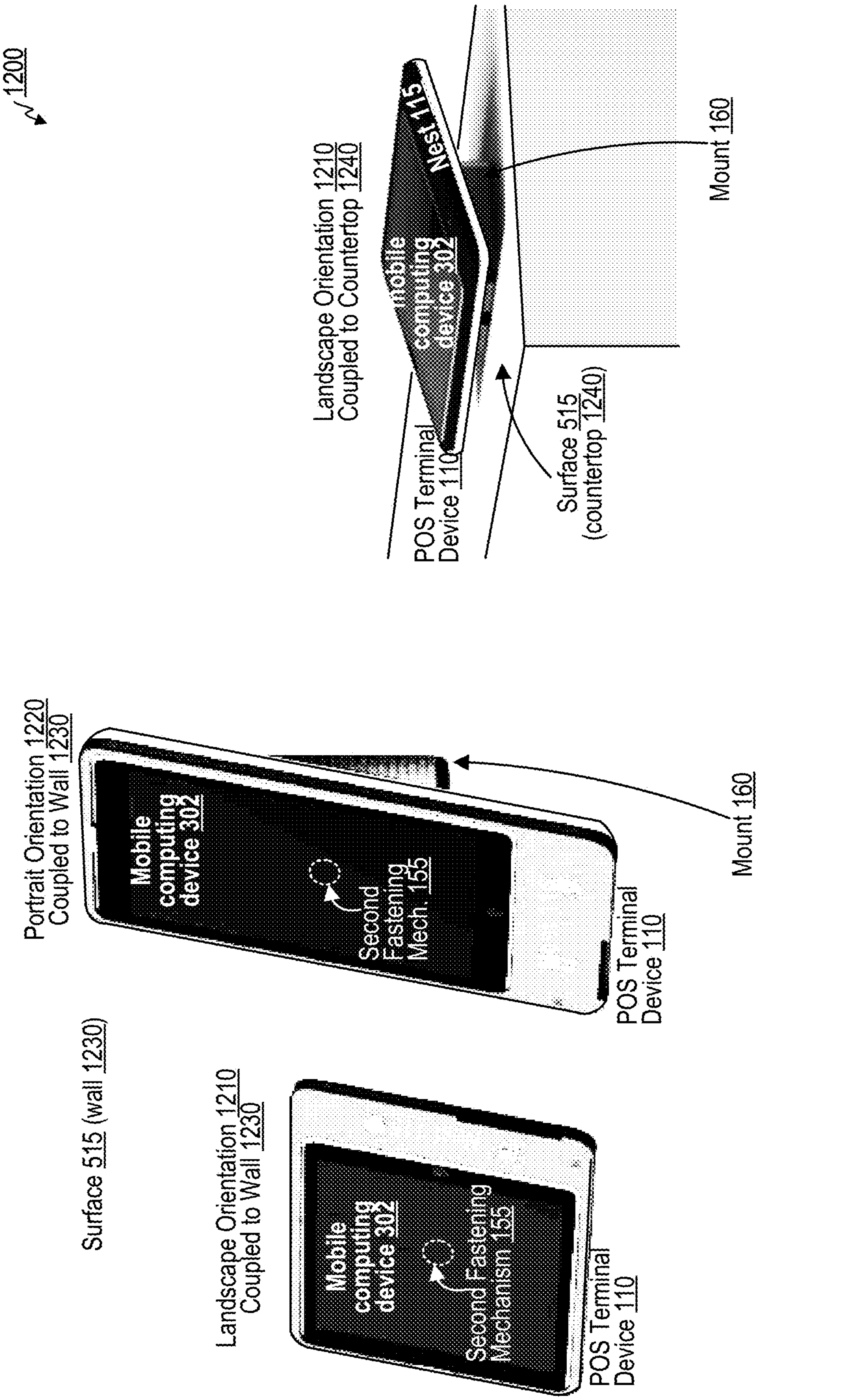
FIG. 12 is a diagram illustrating two different orientations and two different mounting surfaces for an exemplary point of sale (POS) terminal device that holds and interfaces with an exemplary mobile computing device and is coupled to the surface using the mount, in accordance with some examples.

FIG. 12 is a diagram 1200 illustrating two different exemplary orientations and two different mounting surfaces 515 for an exemplary point of sale (POS) terminal device 110 that holds and interfaces with a mobile computing device 302 and is coupled to the surface 515 using the mount 160. The two different orientations and two different mounting surfaces 515 are illustrated using three examples in FIG. 12. The first example is illustrated on the left of FIG. 12, where the POS terminal device 110 and the mobile computing device 302 therein are oriented in a landscape orientation 1210, and the surface 515 to which the POS terminal device 110 is mounted (via the mount 160) is a wall 1230. The second example is illustrated in the center of FIG. 12, where the POS terminal device 110 and the mobile computing device 302 therein are oriented in a portrait orientation 1220, and the surface 515 to which the POS terminal device 110 is mounted (via the mount 160) is the wall 1230. The third example is illustrated on the right of FIG. 12, where the POS terminal device 110 and the mobile computing device 302 therein are oriented in the landscape orientation 1210, and the surface 515 to which the POS terminal device 110 is mounted (via the mount 160) is a countertop 1240. The mount 160 in the three examples in FIG. 12 is illustrated as an angled mount 1120, but can be a non-angled mount 1110 in some examples. In all three examples, the mobile computing device 302 and the nest 115 are prominently visible and labeled. In the second and third examples, the mount 160 is visible and labeled. In some examples, the mount 160 can be switched from one surface 515 to another surface 515 as needed, for example from a wall to a countertop or vice versa, to relocate and/or reorient the POS terminal device 110.

This design of the mount 160 can allow the landscape orientation 1210, the portrait orientation 1220, any orientation in between, and/or switching between orientations. For example, a user can change their mind about which orientation the POS terminal device 110 should be mounted and/or used in, since the bracket can permits any orientation desired by the user. For example, FIG. 12 illustrates a POS terminal device 110 that is oriented in a landscape orientation 1210 and that is coupled to a surface of a wall 1230, a POS terminal device that is oriented in a portrait orientation 1220 and that is coupled to the surface of the wall 1230, and a POS terminal device that is oriented in the landscape orientation 1210 and that is coupled to a surface of a countertop 1240.

A position of the second fastening mechanism 155 under the mobile computing device 302 is illustrated using white dotted lines. In some examples, the rotation of the POS terminal device 110 about the mount 160 between the landscape orientation 1210 and the portrait orientation 1220 is a rotation about an axis that is perpendicular and/or orthogonal to a surface of the POS terminal 110, to a surface of the mobile computing device 302 (e.g., the front surface and/or the rear surface), to a surface of the cradle 120, to a surface of the mount 160, or a combination thereof. In some examples, the axis includes, passes through, and/or extends from the second fastening mechanism 155.

In some examples, the mobile computing device 302, the nest 115, the mount 160, the fastening mechanism 125, the second fastening mechanism 155, and/or another portion of the POS terminal device 110 can include sensors (sensors 322 and/or sensors 385) that can identify a shake, a wobble, a sway, a vibration, and/or another type of movement. For instance, such sensors can include an accelerometer, a gyroscope, a gyrometer, an inertial measurement unit (IMU), a hall effect sensor, another type of sensor described herein, or a combination thereof. If such sensors in the POS terminal device 110 (e.g., in the mobile computing device 302, the nest 115, the fastening mechanism 125, the second fastening mechanism 155, and/or the mount 160) detect a movement (e.g., a shake, a wobble, a sway, a vibration, and/or another type of movement), the POS terminal device 110 can determine based on the movement that the second fastening mechanism 155 is likely to not be fully secured, and/or that the fastening mechanism 125 (e.g., with the latch 135) is likely to not be fully secured. The POS terminal device 110 can cause the mobile computing device 302 to display an alert, play an audio alert, buzz or vibrate, light up in a particular color (e.g., red), disable certain functionalities of the POS terminal device 110 (e.g., reading payment information), disable certain functionalities of the mobile computing device 302 (e.g., facilitate transactions), and/or transmit an alert to a recipient device. The alert can warn a user or administrator of the POS terminal device 110 that the fastening mechanism 125 and/or the second fastening mechanism 155 is/are likely to not be fully secured, and to suggest correction of this.

In some examples, if the sensors described above detect an attempt to remove the computing device 302 from the cradle 120 of the POS terminal device 110 while the second fastening mechanism 155 is fastened (e.g., based on detected movement of the mobile computing device 302 and/or the latch 135 of the fastening mechanism 125), the POS terminal device 110 can cause the mobile computing device 302 to display an alert, play an audio alert, buzz or vibrate, light up in a particular color (e.g., red), disable certain functionalities of the POS terminal device 110 (e.g., to read payment information), disable certain functionalities of the mobile computing device 302 (e.g., to facilitate transactions), and/or transmit an alert to a recipient device. The alert can warn a user or administrator of the attempt to remove the computing device 302 from the cradle 120 of the POS terminal device 110 while the second fastening mechanism 155 is fastened.

In a first illustrative example, one or more of these sensors of the fastening mechanism 125, the latch 135, the mobile computing device 302, and/or the POS terminal device 110 can be configured to, and can, detect an attempt to move the latch 135 while the latch 135 is in a closed state (e.g., while the latch 135 is securing the mobile computing device 302 in the cradle 120). The POS terminal device 110 can be configured to, and can, transmit an alert to the mobile computing device 302 (e.g., conveyed over the connector 145) in response to the sensor detecting the attempt. The alert can indicate the attempt and can instruct the mobile computing device 302 to output (e.g., display) the alert and/or to disable certain functionalities of the mobile computing device 302 (e.g., facilitate transactions). The POS terminal device 110 can also put itself in an alert state indicative of the alert (e.g., lighting up red LEDs and/or buzzing and/or vibrating), for instance disabling certain functionalities of the POS terminal device 110 (e.g., to read payment information).

In a second illustrative example, one or more of these sensors of the second fastening mechanism 155, the mount 160, the mobile computing device 302, and/or the POS terminal device 110 can be configured to, and can, detect an attempt to separate the housing of the POS terminal device 110 from the mount 160 while the housing is secured to the mount 160 using the second fastening mechanism 155. The POS terminal device 110 can transmit an alert to the mobile computing device 302 (e.g., conveyed over the connector 145) in response to the sensor detecting the attempt. The alert can trigger any of the above- listed behaviors in the mobile computing device 302, and can cause the POS terminal device 110 to put itself in the alert state discussed above.

In some examples, the sensors described above can detect an angle and/or a height and/or orientation that the POS terminal 110 and/or mobile computing device 302 is mounted at using the mount 160 (e.g., angled mount 1120, non-angled (flat) mount 1110, landscape orientation 1210, portrait orientation 1220, or a combination thereof). The sensors can also detect a direction that the POS terminal 110 and/or mobile computing device 302 is facing (e.g., a direction facing a customer or a direction facing a merchant), for instance if the POS terminal 110 can swivel about the mount (e.g., as in the swivel 1710 about the axis 1715). In some examples, the POS terminal device 110 and/or mobile computing device 302 can cause a user interface (UI) of the touchscreen of the mobile computing device 302 to change or adapt based on the angle, height, orientation, and/or direction faced. In some examples, the UI can change to be a merchant UI or a customer UI depending on direction. In some examples, camera(s) of the POS terminal 110 and/or mobile computing device 302 can also be used to determine a relative position of the user relative to the POS terminal 110 and/or mobile computing device 302, and the POS terminal 110 and/or mobile computing device 302 can adapt and/or change the UI based on the position of the user. For instance, if the sensor data captured by the sensors indicate that the POS terminal 110 is mounted at a low height but the cameras indicate that the user is tall, the POS terminal 110 and/or mobile computing device 302 can adapt and/or change the UI to move certain interactive elements (e.g., buttons) upward to be more accessible to the user. On the other hand, if the sensor data captured by the sensors indicate that the POS terminal 110 is mounted at a high height but the cameras indicate that the user is short, the POS terminal 110 and/or mobile computing device 302 can adapt and/or change the UI to move certain interactive elements (e.g., buttons) downward to be more accessible to the user. In some examples, the POS terminal 110 and/or mobile computing device 302 can adapt and/or change the UI based on certain disabilities or the user or accessibility functions that the user indicates they need via the UI or that the sensor(s) detect that the user may need, such as modifications to colors for color blindness, increases in font size for users with poor vision (e.g., if the sensor data indicates that the user is squinting), and the like.

In some examples, the POS terminal 110 and/or the mount 160 can include one or more motorized actuators that can allow the POS terminal 110 and/or the mount 160 to automatically adjust the angle, height, orientation, and/or direction faced adaptively based on the sensor data. For instance, if the if the sensor data captured by the sensors indicate that the POS terminal 110 is mounted at a low height but the cameras indicate that the user is tall, the POS terminal 110 and/or the mount can move the POS terminal 110 to a higher mounting height and/or can swivel the angle (e.g., as in swivel 1710) of the POS terminal 110 toward the user's face and/or hands. Similarly, if the sensor data captured by the sensors indicate that the POS terminal 110 is mounted at a high height but the cameras indicate that the user is short, the POS terminal 110 and/or the mount can move the POS terminal 110 to a lower mounting height and/or can swivel the angle (e.g., as in swivel 1710) of the POS terminal 110 toward the user's face and/or hands.

In a first illustrative example, one or more of these sensors of the POS terminal device 110, the mount 160, and/or the mobile computing device 302 can capture sensor data indicative of a position of a user relative to the housing. An actuator of the POS terminal device 110 and/or the mount 160 can be configured to, and can, automatically swivel the housing of the POS terminal device 110 relative to the mount 160 and about an axis (e.g., axis 1715, axis associated with portrait/landscape rotation) from a first orientation to a second orientation. The second orientation is directed more toward the user than the first orientation.

In a second illustrative example, one or more of these sensors of the POS terminal device 110, the mount 160, and/or the mobile computing device 302 can capture sensor data indicative of a position of a user relative to the housing. An actuator of the POS terminal device 110 and/or the mount 160 can be configured to, and can, automatically adjust a height of the housing from a first height to a second height, wherein the second height is based on the position of the user relative to the housing.

In a third illustrative example, one or more of these sensors of the POS terminal device 110, the mount 160, and/or the mobile computing device 302 can capture sensor data indicative of a position of a user relative to the housing. The POS terminal device 110 can be configured to, and can, transmit a user interface adjustment request to the mobile computing device 305 (e.g., conveyed over the connector 145) in response to the sensor capturing the sensor data indicative of the position of the user and/or based on the position of the user relative to the housing. The user interface adjustment request is configured to request that the mobile computing device adjust a position of an interactive user interface element (e.g., a button, a field, a slider, a checkbox, a signature input, and the like) based on the position of the user relative to the housing. For instance, if the user is tall, the user interface adjustment request can be configured to request that the mobile computing device move the position of the interactive user interface element up to be more reachable by the user. If the user is short, the user interface adjustment request can be configured to request that the mobile computing device move the position of the interactive user interface element down to be more reachable by the user.

In some examples, the mobile computing device 302 and/or the POS terminal device 110 can include a hall effect sensor that determines magnetically whether the mobile computing device 302 is in the cradle 120 of the POS terminal device 110. In some examples, the mobile computing device 302 and/or the POS terminal device 110 can include a laser rangefinder, IR laser, time of flight (ToF) sensor, structured light sensor, depth sensor, pressure sensor (e.g., a button compressed by the mobile computing device 302 while in the cradle 120), or other sensor to determine based on depth sensing, laser-based sensing (e.g., is the path of the laser broken or not), and/or pressure-based sensing to determines whether the mobile computing device 302 is in the cradle 120 of the POS terminal device 110. In some examples, the POS terminal device 110 can include one or more near field communications (NFC) and/or radio frequency identification (RFID) transceivers configured to detect NFC and/or RFID transceivers of the mobile computing device 302, and/or vice versa. In some examples, the POS terminal device 110, the mobile computing device 302, and/or the mount 160 can use any of the above types of sensors and/or sensing techniques to determine whether the second fastening mechanism 155 is present or not (e.g., whether the shank 1010 is in the aperture or cavity of the POS terminal 110 and/or mount 160).In some examples, the POS terminal device 110 secures the mobile computing device 302 until a particular condition is satisfied to trigger release of the mobile computing device 302 (e.g., by allowing the latch 135 of the fastening mechanism 125 to move from the closed state and/or to the open state). In some examples, the second fastening mechanism 155 secures the POS terminal device 110 to the mount 160 until a particular condition is satisfied to trigger release of the second fastening mechanism 155 (e.g., by allowing the shank 1010 to move from the aperture or cavity of the POS terminal device 110 and/or mount 160). The respective conditions for release of the mobile computing device 302 and for release of the second fastening mechanism 155 can be the same, or can be different. The conditions can involve detection of presses of one or more physical buttons (e.g., in a predetermined pattern corresponding to a keycode or password), detection of presses of one or more physical buttons (e.g., in a predetermined pattern corresponding to a keycode or password), detection of presses of one or more virtual buttons of a touchscreen of the mobile computing device 302 or POS terminal 110 (e.g., in a predetermined pattern corresponding to a keycode or password), detection of a security keycard or device (e.g., via NFC and/or RFID transceiver(s) of the mobile computing device 302 or POS terminal 110), detection of a biometric signature of a user (e.g., fingerprint, face detection, and the like), or a combination thereof.

Figure 13:
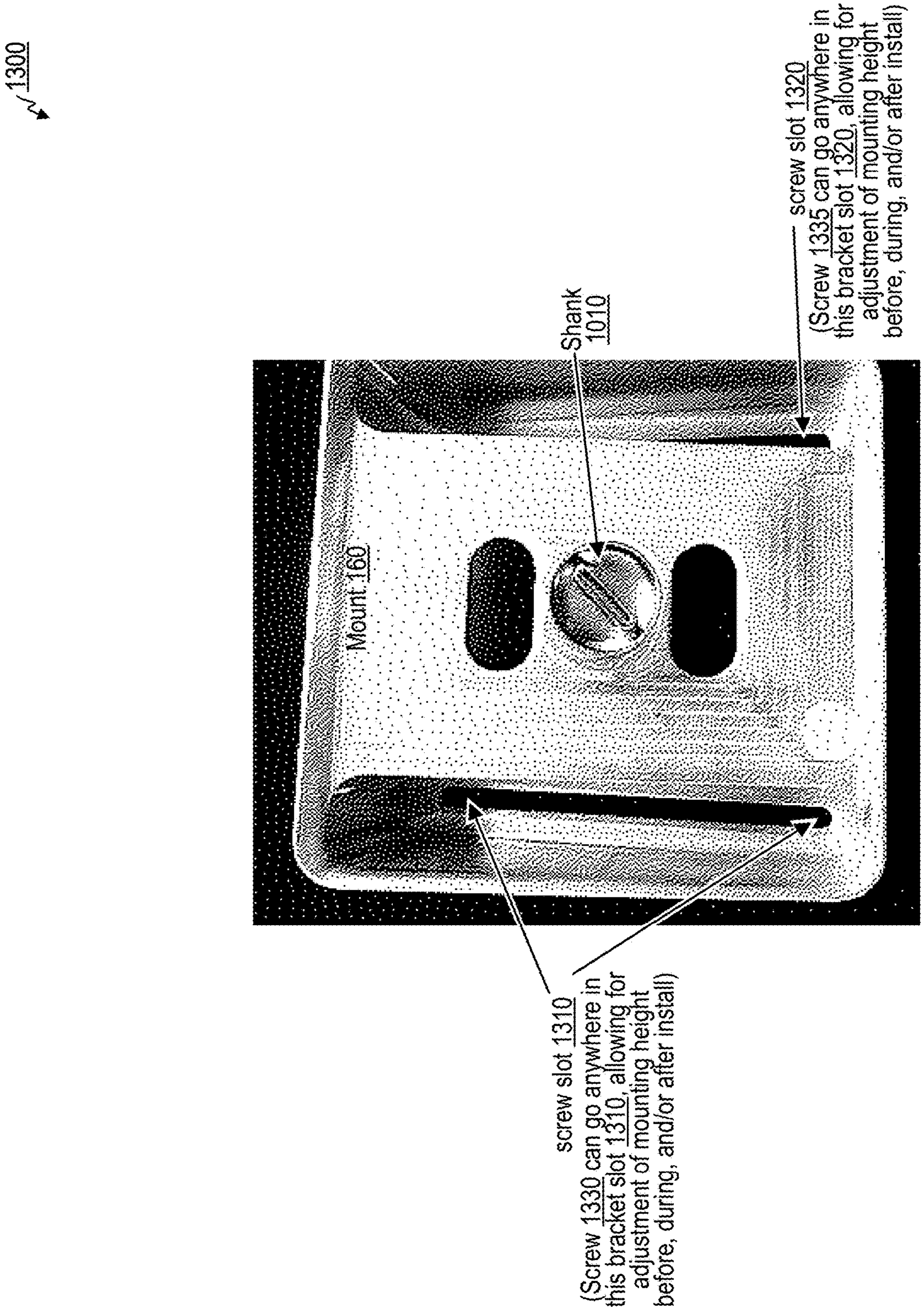
FIG. 13 illustrates a view of a mount with a screw slot and a screw slot for use with an exemplary point of sale (POS) terminal device that holds and interfaces with an exemplary mobile computing device, in accordance with some examples.

FIG. 13 illustrates a view 1300 of an exemplary mount 160 with a screw slot 1310 and a screw slot 1320 for use with an exemplary point of sale (POS) terminal device 110 that holds and interfaces with an exemplary mobile computing device 302. A screw 1330 can couple the mount 160 to a surface 515 by passing a shank of a screw 1330 through the screw slot 1310. The screw 1330 can couple the mount 160 to a surface 515 by passing a shank of a screw 1335 through the screw slot 1320. The screw 1330 can go anywhere in the screw slot 1310, allowing for adjustment of mounting height before, during, and/or after install. The screw 1335 can go anywhere in the screw slot 1320, allowing for adjustment of mounting height before, during, and/or after install. Sometimes, a user may accidentally insert the screw 1330 and/or the screw 1335 into the wall a little too high, a little too short, or at an angle. The screw slot 1310 and the screw slot 1320 illustrated in FIG. 13 permit the user to adjust the angle and/or height of the mount 160 after coupling the mount 160 it to the surface 515, rather than requiring the user to make additional holes in the surface 515 for the screw 1330 and/or the screw 1335 at different locations.

Figure 14:
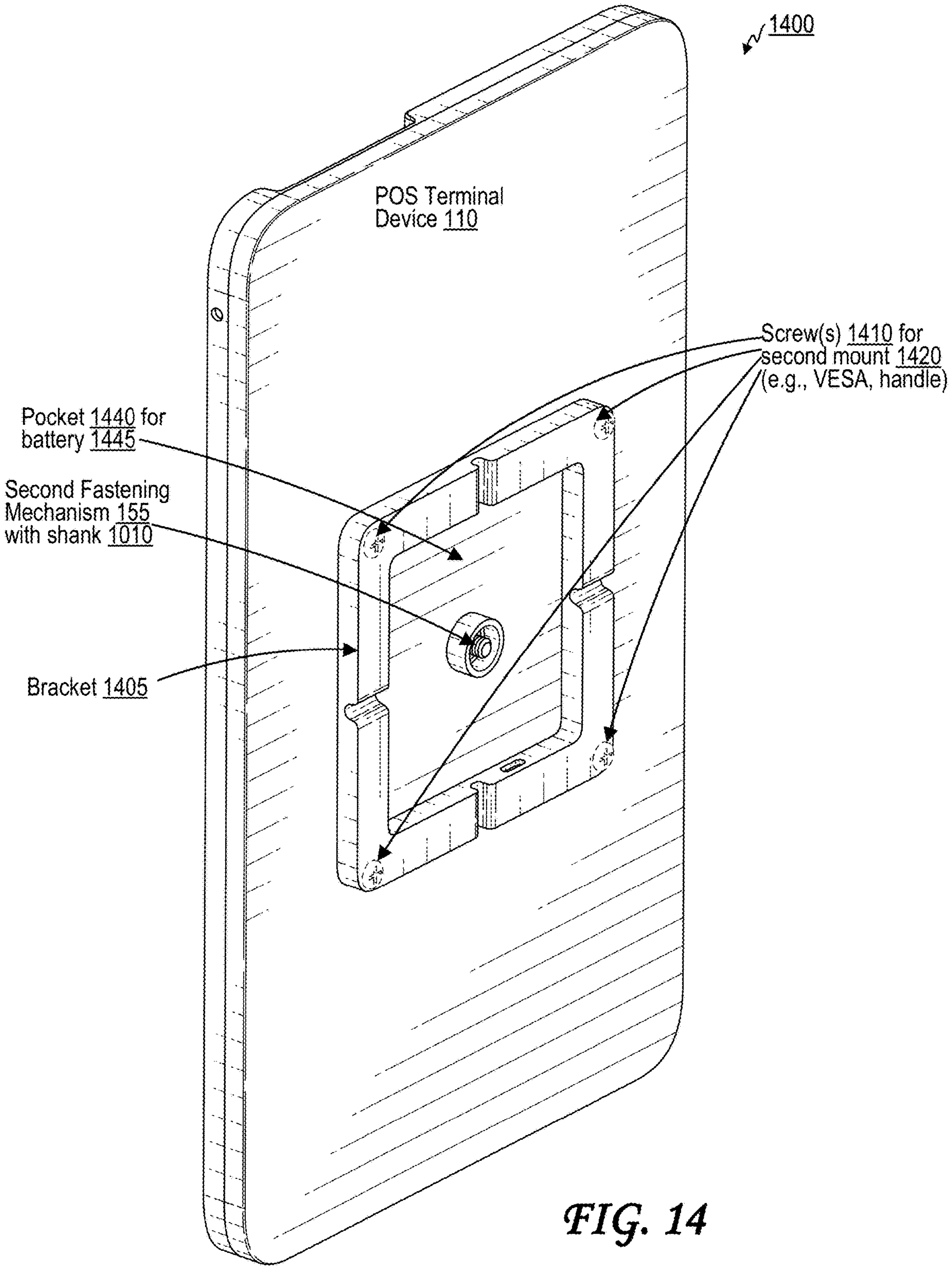
FIG. 14 illustrates a rear perspective view of a bracket on the back of an exemplary point of sale (POS) terminal device that includes the second fastening mechanism for a mount with the shank and four screws for a second mount, in accordance with some examples.

FIG. 14 illustrates a rear perspective view 1400 of an exemplary bracket 1405 on the back of the exemplary POS terminal device 110 that includes the second fastening mechanism 155 for a mount 160 with the shank 1010 as well as four screws 1410 for a second mount 1420.

Figure 15:
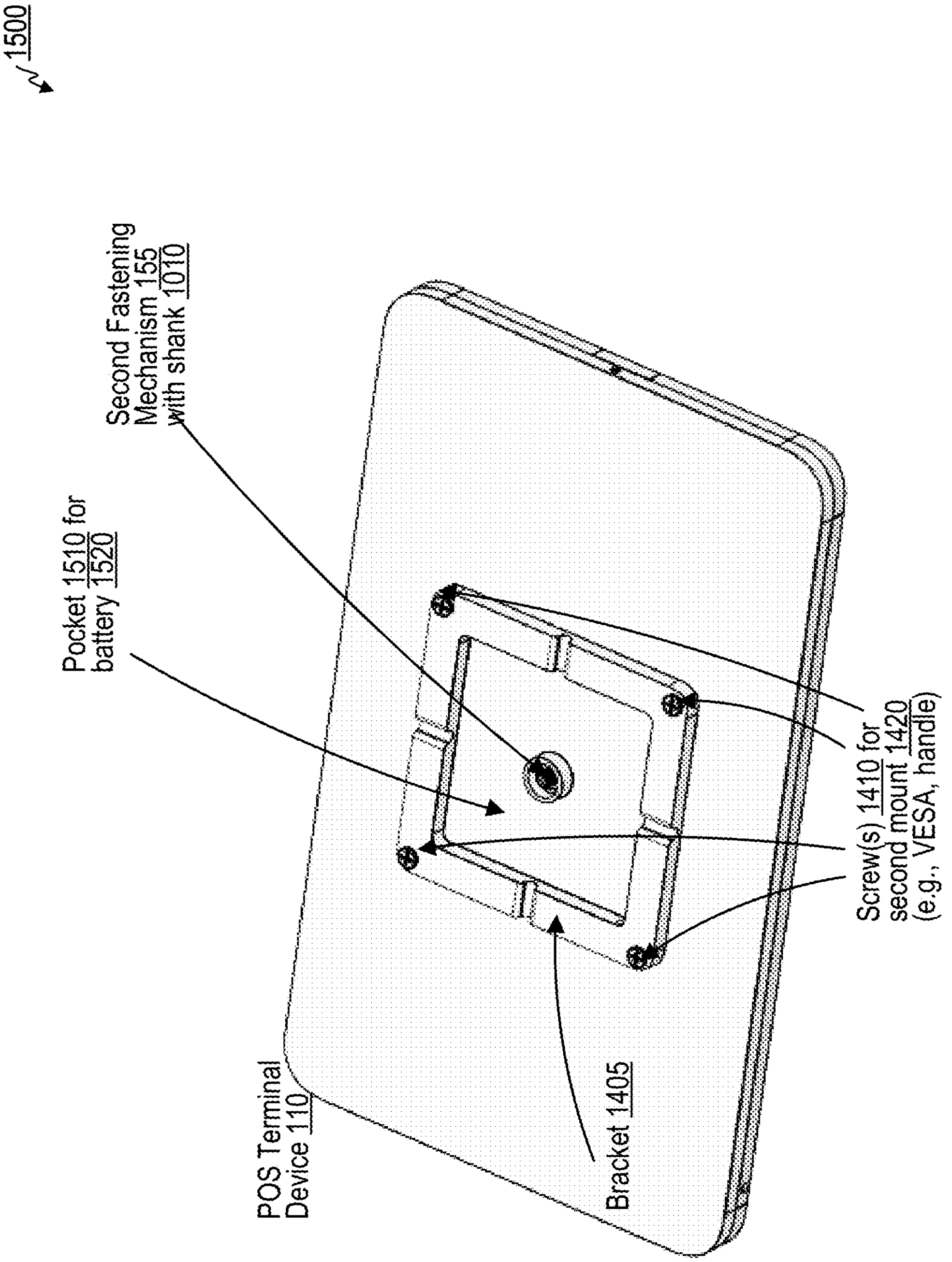
FIG. 15 illustrates a second rear perspective view of the bracket on the back of the exemplary POS terminal device that includes the second fastening mechanism for the mount with the shank as well as four screws for the second mount, in accordance with some examples.

FIG. 15 illustrates a second rear perspective view 1500 of the exemplary bracket 1405 on the back of the POS terminal device 110 that includes the second fastening mechanism 155 for the mount 160 with the shank 1010 as well as four screws 1410 for the second mount 1420. In some examples, the shank 1010 of the second fastening mechanism 155 is a screw that requires one or more twists to secure the POS terminal device 110 to the mount 160. The four screws 1410 located around the shank 1010 of the second fastening mechanism 155 on the bracket 1405 permits the POS terminal device to connect to a second mount 1420. In some examples, the second mount 1420 is compliant with Video Electronics Standards Association (VESA) standards for monitor mounts. The second mount 1420, in such examples, may be referred to as a VESA mount. In some examples, the second mount 1420 includes a handle that allows the POS terminal device 110 to be carried in a mobile fashion by the handle, for example by a restaurant server and/or a merchant in a store. The bracket 1405 includes a pocket 1440 between raised sections of the bracket 1405. In some examples, one or more batteries 1445 can be stored in the pocket 1440. The one or more batteries 1445 can be examples of the battery 390 of FIG. 3.

The housing of the POS terminal device, which includes the cradle and the nest, may be rotatably coupled to a base. That is, the base may rotate or swivel about the base so that the display of the mobile computing device faces different a direction depending on the rotation angle. In some cases, the housing may be able to rotate endlessly about the base, 360 degrees or more. In other cases, the rotation of the housing about the base may be limited, for example from one angle corresponding to a merchant being able to see and use the display of the mobile computing device (a merchant rotation position or a merchant rotation orientation) to another angle corresponding to the customer being able to see and use the display of the mobile computing device (a customer rotation position or a customer rotation orientation), with these angles for example being 180 degrees apart. In some cases, the base may include one or more dampeners that slow or lock movement at certain positions, such as the merchant and customer positions, and thus require additional force to rotate the housing about the base out of those positions. The dampeners may include, for example, springs, ramps, or magnets.

Figure 16:
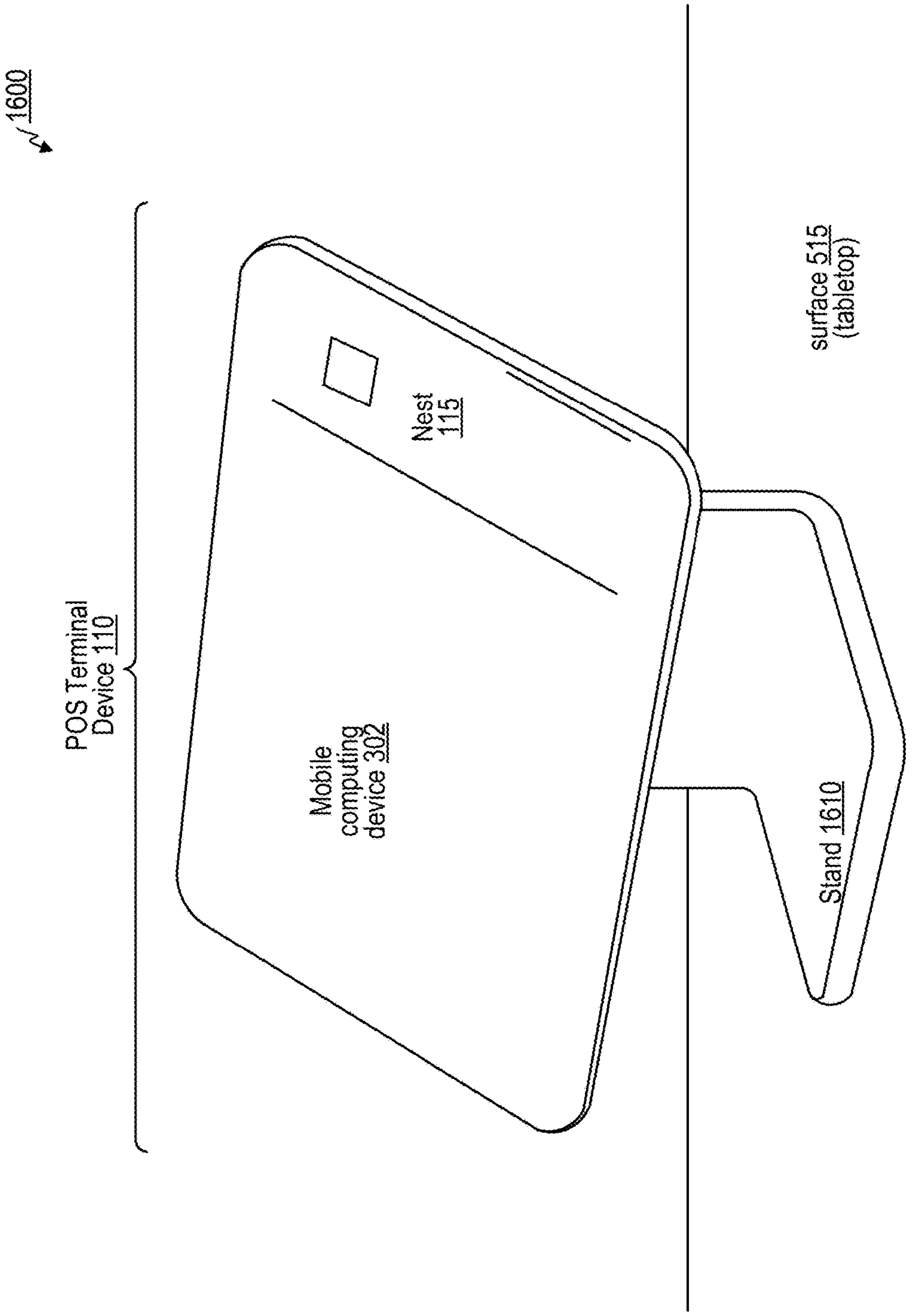
FIG. 16 illustrates a perspective view of a stand that the exemplary point of sale (POS) terminal device can couple to via the second fastening mechanism, in accordance with some examples.

FIG. 16 illustrates a perspective view 1600 of an exemplary stand 1610 that the exemplary point of sale (POS) terminal device 110 can couple to via the second fastening mechanism 155. The stand 1610 can rest atop, and/or be coupled to, a surface 515. In some examples, the stand 1610 may be a type of mount 160. The stand 1610 can include an aperture that receives at least a portion of the shank 1010 of the second fastening mechanism 155 to couple the POS terminal device 110 to the stand 1610. The stand 1610 can include one or more apertures that receive one or more of the screws 1410 to couple the POS terminal device 110 to the stand 1610. In some examples, a stand 1610 or mount 160 can include an accessory device 389, such as a printer, a scale, a barcode scanner, another accessory device 389 described herein, or a combination thereof. and the like. In some examples, the second fastening mechanism 155 can be used to couple the POS terminal to an accessory device 389, such as a printer, a scale, a barcode scanner, another accessory device 389 described herein, or a combination thereof.

Figure 17:
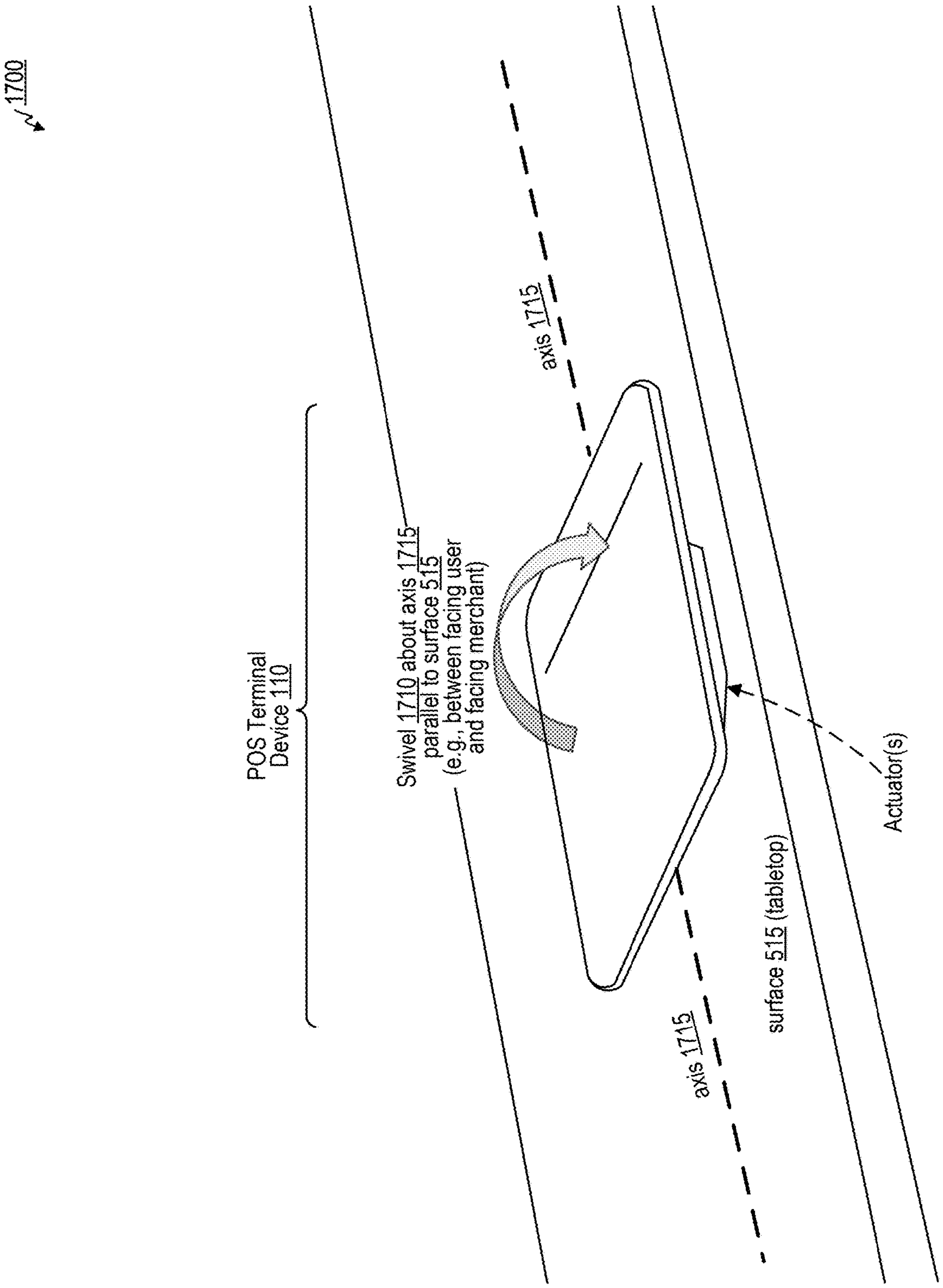
FIG. 17 illustrates a perspective view of a swivel of the exemplary point of sale (POS) terminal device about an axis that is parallel to the surface to which the POS terminal device is coupled and/or rests atop to via the mount and/or the stand, in accordance with some examples.

FIG. 17 illustrates a perspective view 1700 of an exemplary swivel 1710 of the exemplary point of sale (POS) terminal device 110 about an axis 1715 that is parallel to the surface 515 (e.g., tabletop) to which the POS terminal device 110 is coupled and/or rests atop to via the mount 160 and/or the stand 1610. The mount 160 and/or the stand 1610 and/or the second fastening mechanism 155 can include a swiveling mechanism that performs the swivel 1710, such as a hinge, a swivel, a swivel rocker, a detent mechanism, or a combination thereof. The axis 1715 is illustrated as a dashed line in FIG. 17, and is parallel to the surface 515. The swivel 1710 modifies the orientation of the POS terminal device from facing a first direction (e.g. facing a customer at one end of a table) to facing a second direction (e.g. facing a merchant at the opposite end of the table). The first direction and the second direction can be diagonal directions with horizontal components parallel to the surface and vertical components perpendicular to the surface. The horizontal components of the first direction and the second direction can be parallel to, and opposite of, one another. The vertical components of the first direction and the second direction can match.

In some examples, the mount 160 and/or the stand 1610 and/or the second fastening mechanism 155 can include a second swiveling mechanism that allows the POS terminal device 110 to swivel about a second axis (not pictured) that is perpendicular to the surface 515, in addition to or instead of the swivel 1710 pictured in FIG. 17. The second swiveling mechanism can also allow the POS terminal device 110 from facing a first direction (e.g. facing a customer at one end of a table) to facing a second direction (e.g. facing a merchant at the opposite end of the table). The first direction and the second direction can be diagonal directions with horizontal components parallel to the surface and vertical components perpendicular to the surface. The horizontal components of the first direction and the second direction can be parallel to, and opposite of, one another. The vertical components of the first direction and the second direction can match.

Figure 18:
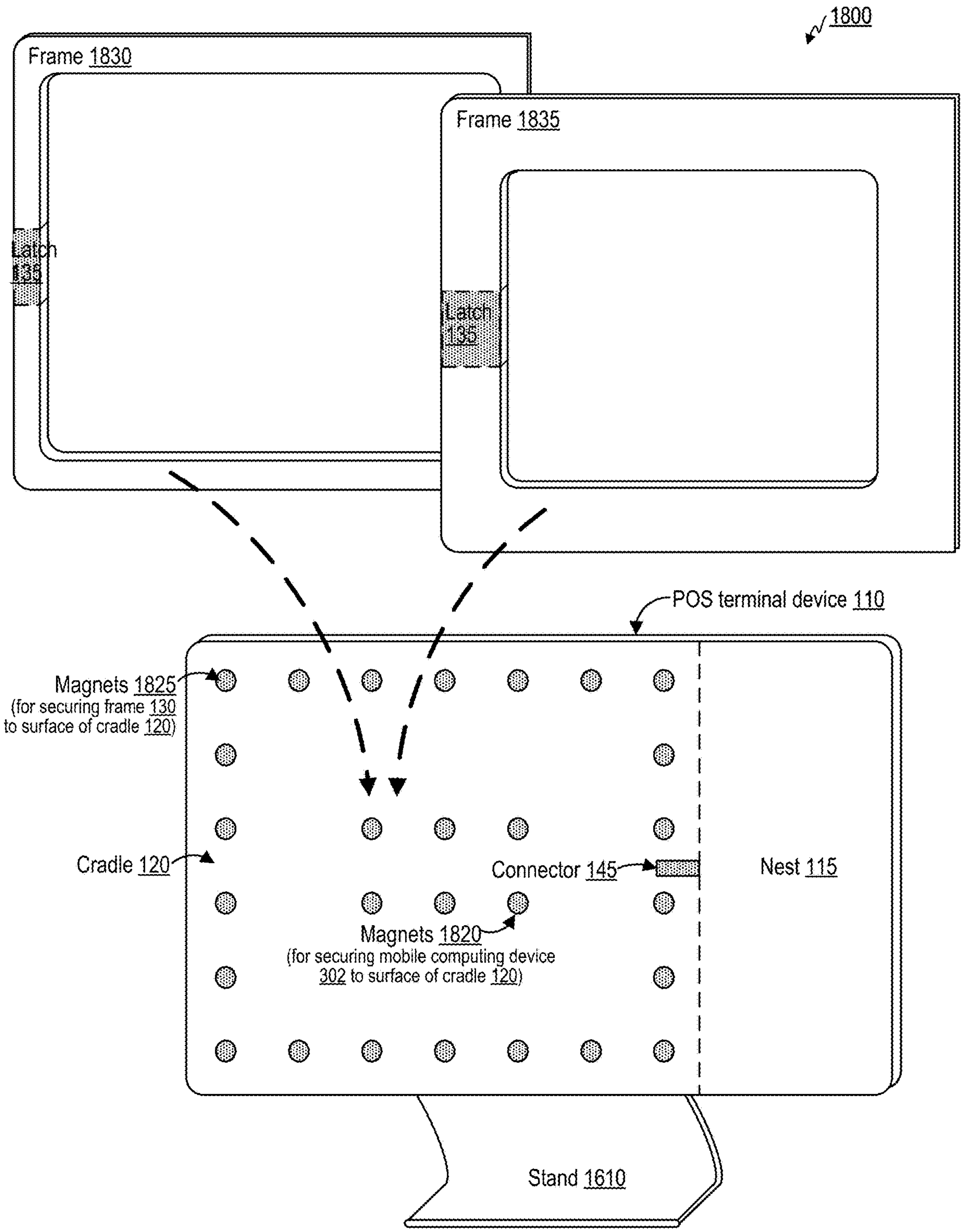
FIG. 18 illustrates a front view of an exemplary point of sale (POS) terminal device with interchangeable frames for securing different mobile computing devices with different form factors, in accordance with some examples.

FIG. 18 illustrates a front view 1800 of an exemplary POS terminal device 110 with interchangeable frames 130 for securing different mobile computing devices with different form factors. The POS terminal device 110 is coupled to the stand 1610. The cradle 120 of the POS terminal device 110 can include magnets 1820, which can couple the mobile computing device 302 to a surface of the cradle 120. The cradle 120 of the POS terminal device 110 can include magnets 1825, which can couple a frame 130, such as the frame 1830 or the frame 1835, to the surface of the cradle 120. The frame 130 (e.g., the frame 1830 or the frame 1835) can prevent the mobile computing device 302 from moving in a direction parallel to the surface of the cradle 120, securing the mobile computing device 302 in place one the mobile computing device 302 is received into the cradle 120. The frame 1830 and/or the frame 1835 can include the fastening mechanism 125, for instance including the latch 135 and/or the shank 170.

The frames 130 (e.g., the frame 1830 and the frame 1830) can be different sizes and/or form factors. The frames 130 can each include a supportive border barrier structure that extends from a surface of the cradle 120, forming a cavity in a central area around which the supportive border barrier structure of the frame 130 extends. The size of the cavity depends on the thickness of the frame 130. The thickness along each of the sides of the frame 130 may be designed so that the cavity is sized to secure the mobile computing device in place. For instance, the boundaries of the frame 1830 are thicker than the boundaries of the frame 1835. Because of this, a cavity within the frame 1830 is larger than a cavity within the frame 1835, allowing a larger mobile computing device 302 to fit within the frame 1830 than fits within the frame 1835. Thus, the frame 1830 can be good to use with a larger mobile computing device 302, while the frame 1835 can be good to use with a smaller mobile computing device 302. As a result, interfacing a mobile computing device with the POS device is simplified, and multiple different mobile computing devices with different form factors and/or sizes can be interfaced with the POS device. The POS device has increase compatibility with various different mobile computing devices.

The frame 130 itself may be removable. Thus, when in a secured state, the frame 130 is secured to a surface of the cradle. When in an unsecured state, the frame 130 is separate from the surface of the cradle, as visible in FIG. 19 above. The frame 130 may be one of many interchangeable frames 130, with each frame having different border thicknesses that accommodate different sizes and form factors of mobile computing devices. In particular, the cradle includes a first interchangeable frame 130 with a cavity sized to fit the mobile computing device 302. In some cases, at least part of the mobile computing device fits snugly within at least part of the cavity, so that the supportive border barrier structure of the frame 130 holds the mobile computing device securely in place even when a user applies forwards or sideways pressure by using a touchscreen interface, button interface, or other interface of the mobile computing device, or when a user is swiping or inserting a payment card into a payment card reader of the nest.

Figure 19:
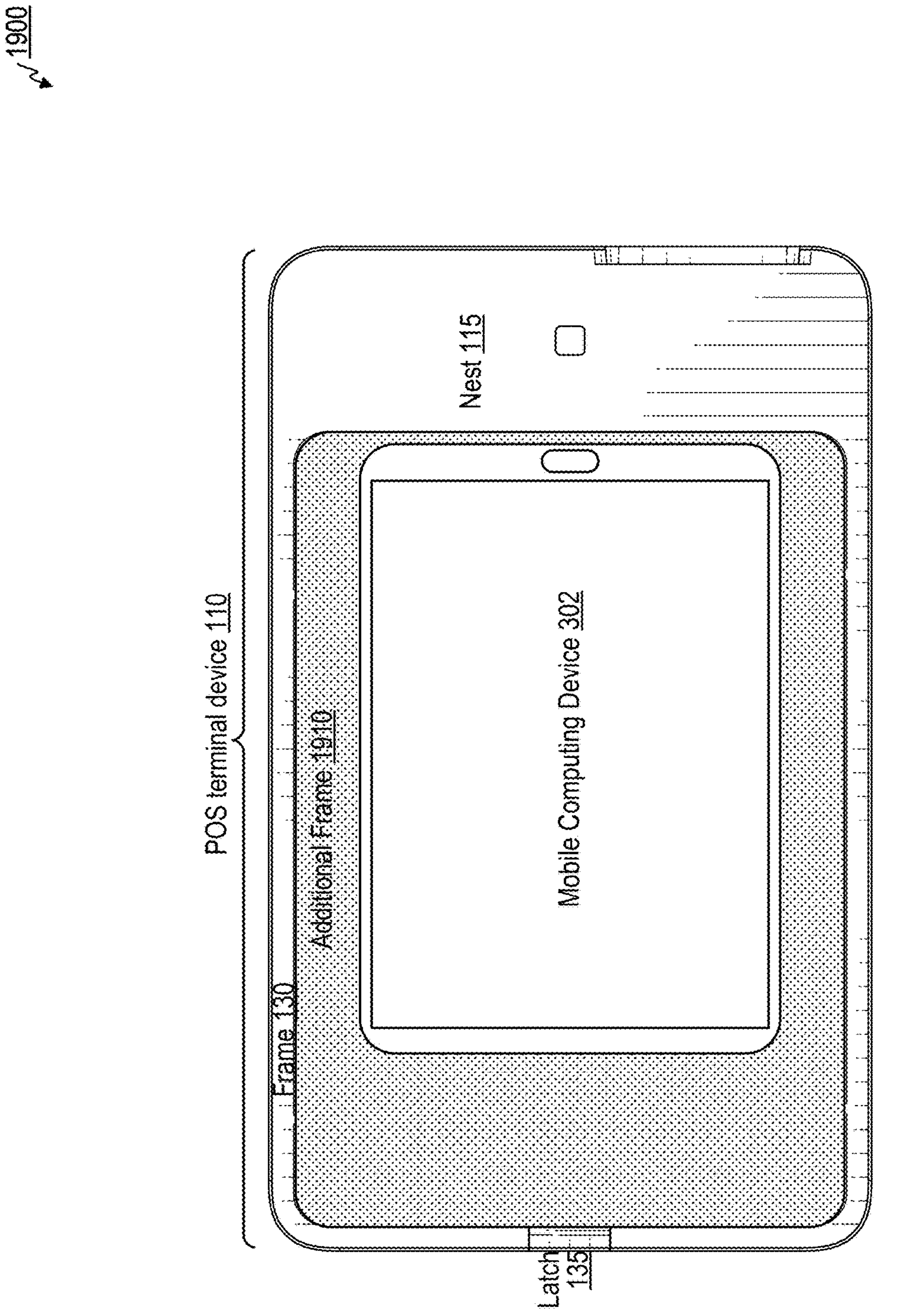
FIG. 19 illustrates a front view of an additional frame received within the cradle around the mobile computing device and within the frame, permitting an exemplary point of sale (POS) terminal device to receive the mobile computing device securely into the cradle regardless of the form factor of the mobile computing device, in accordance with some examples.

FIG. 19 illustrates a front view 1900 of an exemplary additional frame 1910 received within the cradle 120 around the mobile computing device 302 and within the frame 130, permitting an exemplary point of sale (POS) terminal device 110 to receive the mobile computing device 302 securely into the cradle 120 regardless of the form factor of the mobile computing device 302. The additional frame 1910 is illustrated in FIG. 19 as a rounded rectangular frame around the mobile computing device 302 that is shaded grey. The frame 130 may be a portion of the housing 105 of the POS terminal device 110 of FIG. 19, while the additional frame 1910 may be a separate frame that is received into the cradle 120 around the mobile computing device 302 and within the cradle 120. The fastening mechanism 125 (e.g., the latch 135 and/or shank 170) can secure the additional frame 1910 in place in the cradle 120 after receipt of the additional frame 1910 and the mobile computing device 302 into the cradle 120, thus securing the mobile computing device 302 in place in the cradle 120.

Figure 20:
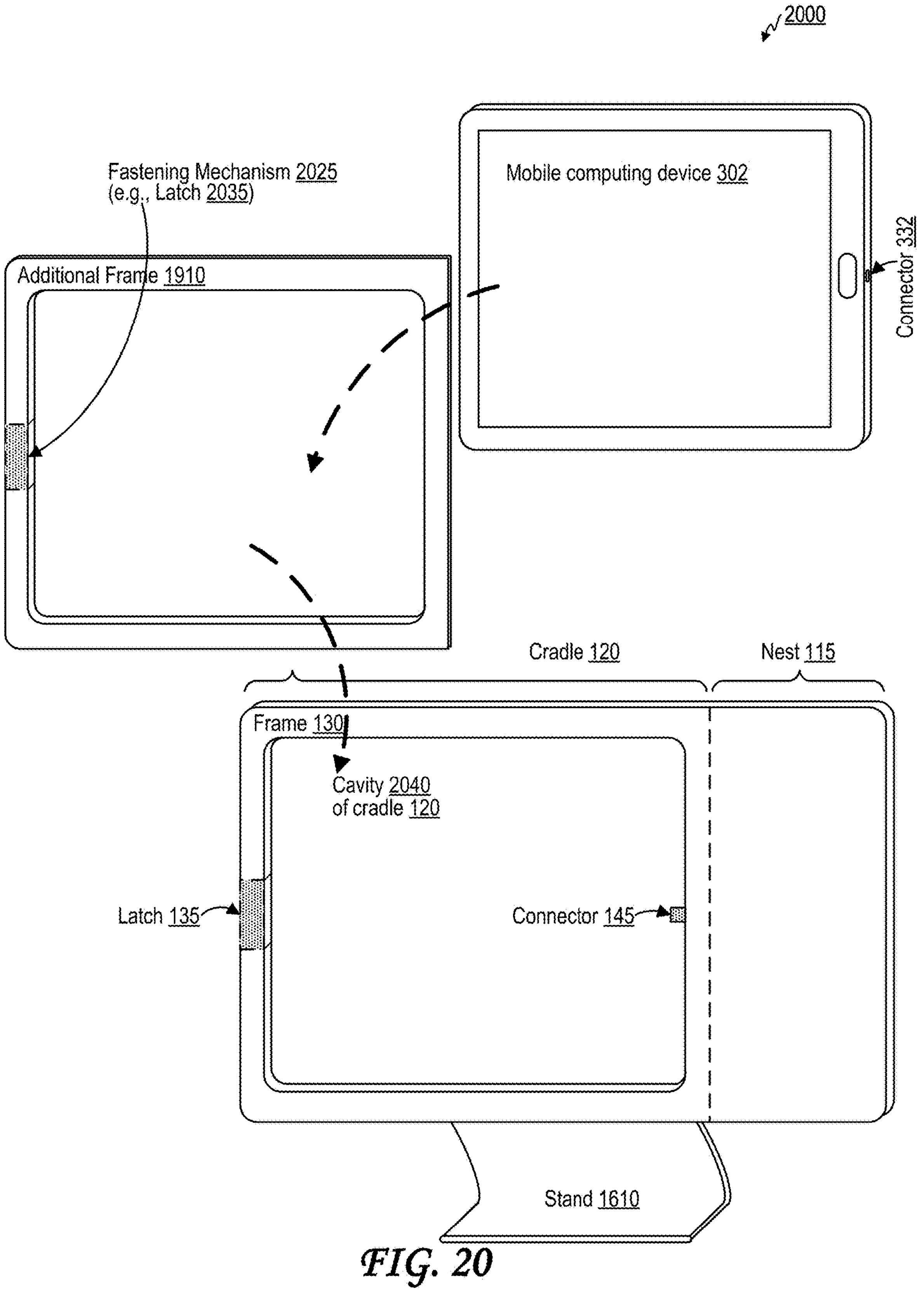
FIG. 20 illustrates an exploded view of an additional frame received within the cradle around the mobile computing device and within the frame, permitting an exemplary point of sale (POS) terminal device to receive the mobile computing device securely into the cradle regardless of the form factor of the mobile computing device, in accordance with some examples.

FIG. 20 illustrates an exploded view 2000 of an exemplary additional frame 1910 received within the cradle 120 around the exemplary mobile computing device 302 and within the frame, permitting an exemplary point of sale (POS) terminal device 110 to receive the mobile computing device 302 securely into the cradle regardless of the form factor of the mobile computing device 302. The POS terminal device 110 is coupled to the stand 1610. The additional frame 1910 is illustrated in FIG. 20 as a rounded rectangular frame around the mobile computing device 302 that is white. The frame 130 may be a portion of the housing 105 of the POS terminal device 110 of FIG. 20, while the additional frame 1910 may be a separate frame that is received into a cavity 2040 of the cradle 120 around the mobile computing device 302 and within the cradle 120 before, after, or while the mobile computing device 302 is received into the cavity 2040 of the cradle 120. The fastening mechanism 125 (e.g., the latch 135 and/or shank 170) can secure the additional frame 1910 in place in the cavity 2040 of the cradle 120 after receipt of the additional frame 1910 and the mobile computing device 302 into the cradle 120, thus securing the mobile computing device 302 in place in the cradle 120.

The additional frame 1910 of FIG. 20 can be include a fastening mechanism 2025 of its own, such as a latch 2035. The fastening mechanism 2025 can function similarly to the fastening mechanism 125 of the POS terminal device 110, securing the mobile computing device 302 in the additional frame 1910. The latch 2035 of the fastening mechanism 2025 can functions similarly to the latch 135, securing the mobile computing device 302 in the additional frame 1910. The fastening mechanism 2025 can in some examples include a shank similar to the shank 170, securing the mobile computing device 302 in the additional frame 1910.

The additional frame 1910 of FIGS. 19-20 can be useful to allow the POS terminal device 110 to securely receive mobile computing devices 302 of different form factors. In some examples, the additional frame 1910 of FIGS. 19-20 can be useful to allow the POS terminal device 110 to securely receive mobile computing devices 302 of different sizes. A large mobile computing device 302 may be able to be received into the cradle 120 without any additional frame 1910. A medium-sized mobile computing device 302 may be able to be received into the cradle 120 without a thin additional frame 1910 with a large cavity therein. A small-sized mobile computing device 302 may be able to be received into the cradle 120 without a thick additional frame 1910 with a small cavity therein. In some examples, the additional frame 1910 of FIGS. 19-20 can be useful to allow the POS terminal device 110 to securely receive mobile computing devices 302 of different shapes. For examples, some mobile computing devices 302 can be shaped like rounded rectangles, while other mobile computing devices 302 can be shaped like non-rounded rectangles. The cavity in the additional frame 1910 can be shaped like a rounded rectangle or a non-rounded rectangle to accommodate either of these shapes of mobile computing device 302. As a result, interfacing a mobile computing device with the POS device is simplified, and multiple different mobile computing devices with different form factors and/or sizes can be interfaced with the POS device. The POS device has increase compatibility with various different mobile computing devices.

FIG. 21 is a diagram illustrating an example of an exemplary system for implementing certain aspects of the present technology. In particular, FIG. 21 illustrates an example of computing system 2100, which can be for example any computing device making up internal computing system, a remote computing system, a camera, or any component thereof in which the components of the system are in communication with each other using connection 2105. Connection 2105 can be a physical connection using a bus, or a direct connection into processor 2110, such as in a chipset architecture. Connection 2105 can also be a virtual connection, networked connection, or logical connection.

In some embodiments, computing system 2100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 2100 includes at least one processing unit (CPU or processor) 2110 and connection 2105 that couples various system components including system memory 2115, such as read-only memory (ROM) 2120 and random access memory (RAM) 2125 to processor 2110. Computing system 2100 can include a cache 2112 of high-speed memory connected directly with, in close proximity to, or integrated as part of processor 2110.

Processor 2110 can include any general purpose processor and a hardware service or software service, such as services 2132, 2134, and 2136 stored in storage device 2130, configured to control processor 2110 as well as a special-purpose processor where software instructions are incorporated into the actual processor design. Processor 2110 may essentially be a completely self-contained computing system, containing multiple cores or processors, a bus, memory controller, cache, etc. A multi-core processor may be symmetric or asymmetric.

To enable user interaction, computing system 2100 includes an input device 2145, which can represent any number of input mechanisms, such as a microphone for speech, a touch-sensitive screen for gesture or graphical input, keyboard, mouse, motion input, speech, etc. Computing system 2100 can also include output device 2135, which can be one or more of a number of output mechanisms. In some instances, multimodal systems can enable a user to provide multiple types of input/output to communicate with computing system 2100. Computing system 2100 can include communication interface 2140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (Wi-MAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communication interface 2140 may also include one or more Global Navigation Satellite System (GNSS) receivers or transceivers that are used to determine a location of the computing system 2100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 2130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/etc.), resistive random-access memory (RRAM/ReRAM), phase change memory (PCM), spin transfer torque RAM (STT-RAM), another memory chip or cartridge, and/or a combination thereof.

The storage device 2130 can include software services, servers, services, etc., that when the code that defines such software is executed by the processor 2110, it causes the system to perform a function. In some embodiments, a hardware service that performs a particular function can include the software component stored in a computer-readable medium in connection with the necessary hardware components, such as processor 2110, connection 2105, output device 2135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a sub-program, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or other-wise configure. a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than (“<”) and greater than (“>”) symbols or terminology used herein can be replaced with less than or equal to (“≤”) and greater than or equal to (“≥”) symbols, respectively, without departing from the scope of this description.

Where components are described as being “configured to” perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting “at least one of” a set and/or “one or more” of a set indicates that one member of the set or multiple members of the set (in any combination) satisfy the claim. For example, claim language reciting “at least one of A and B” means A, B, or A and B. In another example, claim language reciting “at least one of A, B, and C” means A, B, C, or A and B, or A and C, or B and C, or A and B and C. The language “at least one of” a set and/or “one or more” of a set does not limit the set to the items listed in the set. For example, claim language reciting “at least one of A and B” can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Point of sale (POS) systems and methods are described. A POS device includes a housing with a payment instrument reader. The payment instrument reader reads payment instrument information from a payment instrument in response to receipt of the payment instrument at a read area of the housing. The POS device includes a first fastening mechanism that secures the housing to a mount that is coupled to a surface of the environment. The POS device includes a cradle of the housing that receives a mobile computing device. The POS device includes a second fastening mechanism that secures the mobile computing device within the cradle. The POS device includes a connector coupled to the payment instrument reader and extending into the cradle. The connector is configured to couple to the mobile computing device in the cradle, to convey the payment instrument information from the payment instrument reader to the mobile computing device.

Point of sale (POS) systems and methods are described. An example POS device includes a housing and a payment instrument reader at least partially within the housing. The payment instrument reader reads payment instrument information from a payment instrument in response to receipt of the payment instrument at a read area of the housing. The POS device includes a cradle of the housing. The cradle receives a mobile computing device. The POS device includes a fastening mechanism of the housing. The fastening mechanism secures the mobile computing device within the cradle. The POS device includes a connector coupled to the payment instrument reader and extending into the cradle. The connector is configured to couple to the mobile computing device in response to receipt of the mobile computing device into the cradle. The connector is configured to convey the payment instrument information from the payment instrument reader to the mobile computing device.

Illustrative aspects and clauses of the disclosure include:

Aspect 1. A point of sale (POS) device, the POS device comprising: a housing; a payment instrument reader at least partially within the housing, wherein the payment instrument reader is configured to read payment instrument information from a payment instrument in response to receipt of the payment instrument at a read area of the housing; a first fastening mechanism of the housing, wherein the first fastening mechanism is configured to secure the housing to a mount, wherein the mount is configured to couple to a surface of an environment; a cradle of the housing, wherein the cradle is configured to receive a mobile computing device while the housing is secured to the mount using the first fastening mechanism; a second fastening mechanism of the housing, wherein the second fastening mechanism is configured to secure the mobile computing device within the cradle while the housing is secured to the mount using the first fastening mechanism; and a connector coupled to the payment instrument reader and extending into the cradle, wherein the connector is configured to couple to the mobile computing device in response to receipt of the mobile computing device into the cradle while the housing is secured to the mount using the second fastening mechanism, wherein the connector is configured to convey the payment instrument information from the payment instrument reader to the mobile computing device.

Aspect 2. The POS device of Aspect 1, wherein the second fastening mechanism includes a latch that is configured to transition between an open state and a closed state, wherein the cradle is configured to receive the mobile computing device while the latch is in the open state, and wherein the latch is configured to transition from the open state to the closed state to secure the mobile computing device within the cradle.

Aspect 3. The POS device of any of Aspects 1 to 2, further comprising: a sensor configured to capture sensor data indicative of a position of a user relative to the housing; and an actuator configured to automatically swivel the housing relative to the mount and about an axis from a first orientation to a second orientation, wherein the second orientation is directed more toward the user than the first orientation.

Aspect 4. A point of sale (POS) device, the POS device comprising: a payment instrument reader at least partially within a housing, wherein the payment instrument reader is configured to read payment instrument information from a payment instrument in response to receipt of the payment instrument at a read area of the housing; a fastening mechanism of the housing, wherein the fastening mechanism is configured to secure the housing to a mount, wherein the mount is configured to couple to a surface of an environment; a cradle of the housing, wherein the cradle is configured to receive a mobile computing device while the housing is secured to the mount using the fastening mechanism; and a connector coupled to the payment instrument reader and extending into the cradle, wherein the connector is configured to couple to the mobile computing device in response to receipt of the mobile computing device into the cradle while the housing is secured to the mount using the fastening mechanism, wherein the connector is configured to convey the payment instrument information from the payment instrument reader to the mobile computing device.

Aspect 5. The POS device of Aspect 4, further comprising: a second fastening mechanism of the housing, wherein the second fastening mechanism is configured to secure the mobile computing device within the cradle.

Aspect 6. The POS device of Aspect 5, wherein the second fastening mechanism includes a latch that is configured to transition between an open state and a closed state, wherein the cradle is configured to receive the mobile computing device while the latch is in the open state, and wherein the latch is configured to transition from the open state to the closed state to secure the mobile computing device within the cradle.

Aspect 7. The POS device of Aspect 6, wherein the second fastening mechanism includes a shank, wherein the latch includes an aperture, and wherein the aperture in the latch is configured to receive the shank while the latch is in the closed state to secure the mobile computing device within the cradle and to secure the latch in the closed state.

Aspect 8. The POS device of any of Aspects 6 to 7, wherein the second fastening mechanism includes a sensor configured to detect an attempt to move the latch while the latch is in a closed state, wherein to connector is configured to convey an alert to the mobile computing device in response to the sensor detecting the attempt.

Aspect 9. The POS device of any of Aspects 6 to 8, further comprising: the mount, wherein the mount includes an angled shape associated with an angle, wherein the housing is arranged at the angle compared to the surface of the environment while the housing is coupled to the mount using the fastening mechanism and while the mount is coupled to the surface of the environment.

Aspect 10. The POS device of any of Aspects 4 to 9, further comprising: a sensor configured to detect an attempt to separate the housing from the mount while the housing is secured to the mount using the fastening mechanism, wherein the connector is configured to convey an alert to the mobile computing device in response to the sensor detecting the attempt.

Aspect 11. The POS device of any of Aspects 4 to 10, wherein the housing includes an aperture, wherein the fastening mechanism includes a shank, and wherein the aperture is configured to receive the shank to secure the housing to the mount using the fastening mechanism.

Aspect 12. The POS device of Aspect 11, wherein the shank includes at least one of a pin, a screw, and a bolt.

Aspect 13. The POS device of any of Aspects 11 to 12, wherein a side of the shank includes a color, wherein the color is configured to be hidden within the aperture in response to the aperture receiving the shank, and wherein the color is configured to be discernable while at least a portion of the shank is outside of the aperture.

Aspect 14. The POS device of any of Aspects 4 to 13, further comprising: a sensor configured to capture sensor data indicative of a position of a user relative to the housing; and an actuator configured to automatically swivel the housing relative to the mount and about an axis from a first orientation to a second orientation, wherein the second orientation is directed more toward the user than the first orientation.

Aspect 15. The POS device of any of Aspects 4 to 14, further comprising: a sensor configured to capture sensor data indicative of a position of a user relative to the housing; and an actuator configured to automatically adjust a height of the housing from a first height to a second height, wherein the second height is based on the position of the user relative to the housing.

Aspect 16. The POS device of any of Aspects 4 to 15, further comprising: a sensor configured to capture sensor data indicative of a position of a user relative to the housing, wherein the connector is configured to convey a user interface adjustment request to the mobile computing device based on the position of the user relative to the housing, wherein the user interface adjustment request is configured to request that the mobile computing device adjust a position of an interactive user interface element based on the position of the user relative to the housing.

Aspect 17. The POS device of any of Aspects 4 to 16, further comprising: a flexible member with one or more conductive traces, wherein the flexible member is at least partially wrapped around at least a portion of a secure component; and tamper detection circuitry configured to detect an attempt to tamper with the flexible member at least in part by monitoring a voltage associated with the one or more conductive traces.

Aspect 18. The POS device of any of Aspects 4 to 17, further comprising: a frame, wherein the frame is separate from a surface of the cradle while the frame is in an unsecured state, and wherein the frame is secured to the surface of the cradle while the frame is in a secured state, wherein the frame is configured to receive a mobile computing device into an aperture within the frame while the frame is in the secured state.

Aspect 19. The POS device of any of Aspects 4 to 18, wherein the payment instrument is a payment card, wherein the read area is a slot in the housing, and wherein receipt of the payment instrument at the read area includes receipt of the payment card into the slot.

Aspect 20. The POS device of any of Aspects 4 to 19, wherein the payment instrument includes a near field communication (NFC) device, wherein the payment instrument reader includes an NFC reader, wherein receipt of the payment instrument at the read area includes receipt of the NFC device of the payment instrument into a wireless communication range of the NFC reader of the payment instrument reader.

Clause 1. A point of sale (POS) device, the POS device comprising: a housing; a payment instrument reader at least partially within the housing, wherein the payment instrument reader reads payment instrument information from a payment instrument in response to receipt of the payment instrument at a read area of the housing; a cradle of the housing, wherein the cradle receives a mobile computing device; a fastening mechanism of the housing, wherein the fastening mechanism secures the mobile computing device within the cradle; and a connector coupled to the payment instrument reader and extending into the cradle, wherein the connector is configured to couple to the mobilea computing device in response to receipt of the mobile computing device into the cradle, wherein the connector is configured to convey the payment instrument information from the payment instrument reader to the mobile computing device.

Clause 2. The POS device of clause 1, wherein the fastening mechanism includes a latch that transitions between an open state and a closed state, wherein the cradle receives the mobile computing device while the latch is in the open state, wherein, to secure the mobile computing device within the cradle, the latch transitions from the open state to the closed state.

Clause 3. The POS device of clause 2, wherein the fastening mechanism includes a shank, wherein the latch includes an aperture, wherein, to secure the mobile computing device within the cradle, the aperture in the latch receives the shank while the latch is in the closed state to prevent the latch from transitioning from the closed state to the open state, wherein the shank includes at least one of a pin, a screw, and a bolt.

Clause 4. The POS device of clause 3, wherein a side of the shank includes a color, wherein the color along the side of the shank is hidden by the aperture after the aperture has received the shank, wherein the color along the side of the shank is visible before the aperture has received the shank.

Clause 5. The POS device of clause 1, wherein the fastening mechanism includes a shank and an aperture, wherein, to secure the mobile computing device within the cradle, the aperture receives the shank to prevent the fastening mechanism from releasing the mobile computing device from the cradle, wherein the shank includes at least one of a pin, a screw, and a bolt.

Clause 6. The POS device of clause 1, further comprising: a flexible member with one or more conductive traces, wherein the flexible member is at least partially wrapped around at least a portion of a secure component; and tamper detection circuitry configured to detect an attempt to tamper with the flexible member at least in part by monitoring a voltage associated with the one or more conductive traces.

Clause 7. The POS device of claim 1, further comprising: a second fastening mechanism of the housing, wherein the second fastening mechanism secures the housing to a mount, wherein the mount is configured to couple to a surface in an environment.

Clause 8. The POS device of clause 7, further comprising: the mount, wherein the mount includes an angled shape associated with an angle, wherein the housing is arranged at the angle compared to the surface while the housing is coupled to the mount using the second fastening mechanism and while the mount is coupled to the surface.

Clause 9. The POS device of clause 7, wherein the housing includes an aperture, wherein the second fastening mechanism includes a shank, wherein, to secures the housing to the mount using the second fastening mechanism, the aperture receives the shank, wherein the shank includes at least one of a pin, a screw, and a bolt.

Clause 10. The POS device of clause 9, wherein a side of the shank includes a color, wherein the color along the side of the shank is hidden by the aperture after the aperture has received the shank, wherein the color along the side of the shank is visible before the aperture has received the shank.

Clause 11. The POS device of clause 1, further comprising: a frame, wherein the frame is separate from a surface of the cradle while the frame is in an unsecured state, wherein the frame is secured to the surface of the cradle while the frame is in a secured state, wherein the frame receives a mobile computing device into an aperture within the frame while the frame is in the secured state.

Clause 12. The POS device of clause 1, wherein the payment instrument is a payment card, wherein the read area is a slot in the housing, wherein receipt of the payment instrument at the read area includes receipt of the payment card into the slot.

Clause 13. The POS device of clause 1, wherein the payment instrument includes a near field communication (NFC) device, wherein the payment instrument reader includes an NFC reader, wherein receipt of the payment instrument at the read area includes receipt of the NFC device of the payment instrument into a wireless communication range of the NFC reader of the payment instrument reader.

What is claimed is:

1. A computer-implemented method comprising:

detecting, based on sensor data captured using a sensor of a point of sale (POS) device, a first position of a first user and a height of the first user, wherein the POS device includes at least a housing and a base;

determining, based on the first position of the first user and the height of the first user, an adjustment to an orientation of the housing of the POS device relative to the base of the POS device through a rotation of the housing about an axis, wherein the axis is parallel to a surface of the housing and to a base surface of the base, wherein the base surface is adjacent to and parallel to an environment surface of an external environment that the POS device is in, and wherein the adjustment rotates the housing relative to the base from facing a second user to facing the first user; and actuating at least one actuator of the POS device to perform the adjustment to the orientation of the housing relative to the base, wherein, after the at least one actuator is actuated to perform the adjustment, the POS device faces the first position of the first user.

2. The computer-implemented method of claim 1, further comprising:

determining, based on the first position of the first user and the height of the first user, an additional adjustment to the orientation that includes a change in a height of the housing of the POS device relative to a height of the base of the POS device.

3. The computer-implemented method of claim 1, wherein the POS device further includes a computing device with a user interface.

4. The computer-implemented method of claim 3, further comprising:

determining, based on the adjustment, an update to a layout of one or more elements of the user interface of the computing device; and modifying the layout of the user interface of the computing device based on the update.

5. A computer-implemented method comprising:

detecting, based on sensor data captured using a sensor of a device, a first position of a first user and a height of the first user, wherein the device includes at least a housing and a base;

determining, based on the first position of the first user and the height of the first user, an adjustment to an orientation of the housing of the device relative to the base of the device through a rotation of the housing about an axis, wherein the axis is parallel to a surface of the housing and to a base surface of the base, wherein the base surface is adjacent to and parallel to an environment surface of an external environment that the device is in, and wherein the adjustment rotates the housing relative to the base from facing a second user to facing the first user; and actuating at least one actuator of the device to perform the adjustment to the orientation of the housing relative to the base, wherein, after the at least one actuator is actuated to perform the adjustment, the device faces the first position of the first user.

6. The computer-implemented method of claim 5, further comprising:

determining, based on the first position of the first user and the height of the first user, an additional adjustment that includes a change in a height of the housing of the device relative to a height of the base of the device.

7. The computer-implemented method of claim 5, wherein the first position indicates a location of a portion of the first user relative to a position of the device.

8. The computer-implemented method of claim 7, wherein the portion of the first user includes a face of the first user.

9. The computer-implemented method of claim 7, wherein the portion of the first user includes at least one hand of the first user.

10. The computer-implemented method of claim 5, further comprising:

moving a user interface element on a display based on the first position of the first user.

11. The computer-implemented method of claim 5, further comprising:

reading payment instrument data from a payment instrument using a payment instrument reader of the device; and facilitating a transaction based on the payment instrument data.

12. The computer-implemented method of claim 5, wherein the device further includes a computing device with a user interface.

13. The computer-implemented method of claim 12, further comprising:

determining, based on the adjustment, an update to a layout of one or more elements of the user interface of the computing device; and modifying the layout of the user interface of the computing device based on the update.

14. An apparatus comprising:

a housing;

a base;

a sensor that captures sensor data;

a processor that executes instructions in a memory to:

detect, based on the sensor data, a first position of a first user and a height of the first user, determine, based on the first position of the first user and the height of the first user, an adjustment to an orientation of the housing relative to the base through a rotation of the housing about an axis, wherein the axis is parallel to a surface of the housing and to a base surface of the base, wherein the base surface is adjacent to and parallel to an environment surface of an external environment, and wherein the adjustment rotates the housing relative to the base from facing a second user to facing the first user, and actuate an actuator; and the actuator, wherein actuating the actuator causes the adjustment to the orientation of the housing relative to the base, wherein, after the actuator is actuated to perform the adjustment, the housing faces the first position of the first user.

15. The apparatus of claim 14, further comprising:

determine, based on the first position of the first user and the height of the first user, an additional adjustment to the orientation that includes a change in a height of the housing relative to a height of the base.

16. The apparatus of claim 14, wherein the adjustment to the orientation includes a change in the orientation of the housing relative to an orientation of the base.

17. The apparatus of claim 14, wherein the adjustment to the orientation includes a change in a direction that the housing faces relative to a direction that the base faces.

18. The apparatus of claim 14, wherein the first position indicates a location of a portion of the first user, and wherein the portion of the first user includes a face of the first user.

19. The apparatus of claim 14, wherein the first position indicates a location of a portion of the first user, and wherein the portion of the first user includes at least one hand of the first user.

* * * * *